United States Patent
Qu et al.

(10) Patent No.: US 12,206,087 B2
(45) Date of Patent: Jan. 21, 2025

(54) CHEMICAL PREALKALIATION OF ELECTRODES

(71) Applicant: UWM Research Foundation, Inc., Milwakee, WI (US)

(72) Inventors: Deyang Qu, Mequon, WI (US); Gong Wei Wang, Wuhan (CN); Xiaoxiao Zhang, Milwaukee, WI (US); Huainan Qu, Milwaukee, WI (US)

(73) Assignee: UWM Research Foundation, Inc., Milwaukee, WI (US)

( * ) Notice: Subject to any disclaimer, the term of this patent is extended or adjusted under 35 U.S.C. 154(b) by 942 days.

(21) Appl. No.: 17/276,890

(22) PCT Filed: Sep. 24, 2019

(86) PCT No.: PCT/US2019/052787
§ 371 (c)(1),
(2) Date: Mar. 17, 2021

(87) PCT Pub. No.: WO2020/068870
PCT Pub. Date: Apr. 2, 2020

(65) Prior Publication Data
US 2022/0037635 A1    Feb. 3, 2022

Related U.S. Application Data

(60) Provisional application No. 62/735,831, filed on Sep. 24, 2018.

(51) Int. Cl.
H01M 4/04    (2006.01)
H01M 4/1391    (2010.01)
(Continued)

(52) U.S. Cl.
CPC ......... *H01M 4/0459* (2013.01); *H01M 4/049* (2013.01); *H01M 4/1391* (2013.01);
(Continued)

(58) Field of Classification Search
CPC ........ H01M 4/583; H01G 11/32; H01G 11/40
See application file for complete search history.

(56) References Cited

U.S. PATENT DOCUMENTS 5,543,021 A      8/1996  Yazami et al.
11,211,595 B2 *  12/2021 Chae ..................... H01M 4/134
(Continued)

FOREIGN PATENT DOCUMENTS

CN    104766947 A    7/2015
JP    2008257888 A   10/2008
KR    101953228 B1    2/2019

OTHER PUBLICATIONS

Al, G.; et al., "Scalable process for application of stabilized lithium metal powder in Li-ion batteries," Journal of power sources, 2016, vol. 309, p. 33-41.
(Continued)

*Primary Examiner* — Amanda C. Walke
(74) *Attorney, Agent, or Firm* — Michael Best & Friedrich LLP

(57) ABSTRACT

Disclosed herein are methods of making an electrode. The method includes contacting an electrode material with a mixture that includes an alkali metal, an organic solvent, and an aromatic compound. Also disclosed herein are methods of making a battery that includes an electrode provided by the disclosed methods.

20 Claims, 61 Drawing Sheets

(51) Int. Cl.
| | |
|---|---|
| H01M 4/1393 | (2010.01) |
| H01M 4/1395 | (2010.01) |
| H01M 4/38 | (2006.01) |
| H01M 4/48 | (2010.01) |
| H01M 4/587 | (2010.01) |
| H01M 10/0525 | (2010.01) |

(52) U.S. Cl.
CPC ....... *H01M 4/1393* (2013.01); *H01M 4/1395* (2013.01); *H01M 4/386* (2013.01); *H01M 4/387* (2013.01); *H01M 4/483* (2013.01); *H01M 4/587* (2013.01); *H01M 10/0525* (2013.01)

(56) References Cited

U.S. PATENT DOCUMENTS

| | | |
|---|---|---|
| 2013/0327648 A1 | 12/2013 | Grant et al. |
| 2018/0062168 A1 | 3/2018 | Gonser |

OTHER PUBLICATIONS

Cao, et a;. , "Ambient-Air Stable Lithiated Anode for Rechargeable Li-Ion Batteries with High Energy Density," Nano letters, 2016, vol. 16, p. 7235-7240.
Cao, R.; et al., "Anodes for Rechargeable Lithium-Sulfur Batteries," Advanced energy materials, 2015, vol. 5, p. 1402273.
Chu, et al., "Conductivity and applications of Li-biphenylbiphenyl-1, 2 2-dimethoxyethane solution for lithium ion batteries," 2017 Chinese Phys. B, 26(7): 078201.
Du, S. et al., "Preparation and characterization of three-dimensional tin thin-film anode with good cycle performance," Electrochimica acta, 2010, vol. 55, p. 3537-3541.
Etacheri, V.; et al., "Challenges in the development of advanced Li-ion batteries: a review," Energy & environmental science, 2011, vol. 4, p. 3243.
Fauteux, D.; et al., "Rechargeable lithium battery anodes: alternatives to metallic lithium," Journal of applied electrochemistry, 1993, vol. 23, p. 1-10.
Forney et al., "Prelithiation of Silicon-Carbon Nanotube Anodes for Lithium Ion Batteries by Stabilized Lithium Metal Powder (SLMP)," Nano letters, 2013, vol. 13, p. 4158-4163.
Goodenough, et al. "The Li-ion rechargeable battery: a perspective," Journal of the American Chemical Society, 2013, vol. 135, p. 1167-1176.
Goriparti, et al., "Review on recent progress of nanostructured anode materials for Li-ion batteries," Journal of power sources, 2014, vol. 257, p. 421-443.
Hassoun, J.; et al., "An advanced lithium ion battery based on high performance electrode materials," Journal of the American Chemical Society, 2011, vol. 133, p. 3139-3143.
Holtstiege, F.; et al. "Pre-Lithiation Strategies for Rechargeable Energy Storage Technologies: Concepts, Promises and Challenges," Batteries (Basel), 2018, 4, 4.
International Preliminary Report on Patentability for Application No. PCT/US2019/052787 dated Apr. 1, 2021 (7 pages).
International Search Report and Written Opinion for Application No. PCT/US2019/052787 dated Dec. 11, 2019 (12 pages).
Iwamura, S.; et al., "Li-rich Li-Si alloy as a lithium-containing negative electrode material towards high energy lithium-ion batteries," Scientific reports, 2015, vol. 5:8085. p. 1-8.
Jin, Y.; et al., "Challenges and Recent Progress in the Development of Si Anodes for Lithium-Ion Battery," Advanced energy materials, 2017, vol. 7, p. 1700715.
Kafle, J. et al., "Development of wide temperature electrolyte for graphite/LiNiMnCoO2 Li-ion cells: high throughput screening," Journal of power sources, 2018, vol. 392, p. 60-68.
Kim, H. J.; et al., "Controlled Prelithiation of Silicon Monoxide for High Performance Lithium-Ion Rechargeable Full Cells," Nano letters, 2016, vol. 16, p. 282-288.
Li, X.; et al., "Study of Lithium Silicide Nanoparticles as Anode Materials for Advanced Lithium Ion Batteries," ACS applied materials & interfaces, 2017, vol. 9, p. 16071-16080.
Liu, D.; et al., "Confined phosphorus in carbon nanotube-backboned mesoporous carbon as superior anode material for sodium/potassium-ion batteries," Nano energy, 2018, vol. 52, p. 1-10.
Liu, N.; Hu, L.; McDowell, M. T.; Jackson, A.; Cui, Y. "Prelithiated silicon nanowires as an anode for lithium ion batteries," ACS nano, 2011, vol. 5 (8), p. 6487-6493.
Manthiram, Y. et al., "Rechargeable Lithium-Sulfur Batteries," Chemical reviews, ACS Publications, (2014), 114, 11751-11787.
Marino, M. et al., "Interface and Safety Properties of Phosphorus-Based Negative Electrodes in Li-Ion Batteries," Chem. Mater. 29 (2017) 7151-7158.
Park, et al., "Li3N as a Cathode Additive for High-Energy-Density Lithium-Ion Batteries," Advanced energy materials, 2016, vol. 6, p. 1502534.
Park, et al., "Li-alloy based anode materials for Li secondary batteries," Chemical Society reviews, 2010, vol. 39, p. 3115-3141.
Peng, C.- J.; et al., "Lithium tin phosphate anode partially reduced through prelithiation for hybrid capacitor application," Journal of alloys and compounds, 2015, vol. 627, p. 186-191.
Qian, et al., "High Capacity and Rate Capability of Amorphous Phosphorus for Sodium Ion Batteries," Angew. Angewandte Chemie (International ed.), 2013, vol. 52, p. 4633-4636.
Scott, M. G.; et al., "Chemical Formation of a Solid Electrolyte Interface on the Carbon Electrode of a Li-Ion Cell," Journal of the Electrochemical Society, 1998, vol. 145 (5), p. 1506-1510.
Scrosati, B.; et al., "Lithium-ion batteries. A look into the future," Energy & environmental science, 2011, vol. 4, 3287-3295.
Scrosati, et al., "Lithium batteries: Status, prospects and future," J. Power Sources 2010, 195, 2419-2430.
Seh, Y. et al., "Designing high-energy lithium-sulfur batteries," Chemical Society reviews, 2016, vol. 45, p. 5605-5634.
Shen, C. et al., "Silicon(lithiated)-sulfur full cells with porous silicon anode shielded by Nafion against polysulfides to achieve high capacity and energy density" Nano energy, 2016, vol. 19, p. 68-77.
Sun, et al., "High-capacity battery cathode prelithiation to offset initial lithium loss," Nature Energy, 2016, vol. 1, 15008.
Sun, et al., "In Situ Chemical Synthesis of Lithium Fluoride/Metal Nanocomposite for High Capacity Prelithiation of Cathodes," Nano letters, 2016, vol. 16, p. 1497-1501.
Tabuchi, T.; et al., "Li-doping process for LixSiO-negative active material synthesized by chemical method for lithium-ion cells," Journal of power sources, 2005, vol. 146, p. 507-509.
Tabuchi, T.; et al., "Mechanism of Li-doping into Li4Ti5O12 negative active material for Li-ion cells by new chemical method," Journal of power sources, 2006, vol. 162, p. 813-817.
Wu, F.; et al., "Conversion cathodes for rechargeable lithium and lithium-ion Batteries," Energy & environmental science, 2017, vol. 10, p. 435-459.
Wu, S.; et al., "A long-life lithium ion oxygen battery based on commercial silicon particles as the anode," Energy & environmental science, 2016, vol. 9, p. 3262-3271.
Xu, et al., "Electrochemical Performance of Porous Carbon/Tin Composite Anodes for Sodium-Ion and Lithium-Ion Batteries," Advanced energy materials, 2013, vol. 3, p. 128-133.
Xu, N.; et al., "Stationary Full Li-Ion Batteries with Interlayer-Expanded V6O13 Cathodes and Lithiated Graphite Anodes," Electrochimica acta, 2016, vol. 203, p. 171-177.
Yan, J.; et al., "Constructing High Energy and Power Densities Li-Ion Capacitors Using Li Thin Film for Pre-Lithiation," Journal of the Electrochemical Society, 2017, vol. 164 (9), p.A2164-A2170.
Ye, R.; et al., "Advanced Sulfur-Silicon Full Cell Architecture for Lithium Ion Batteries," Sci. Rep. 2017, 7, 17264.
Zhang, S.; et al., "High Performance Lithium-Ion Hybrid Capacitors Employing Fe3O4-Graphene Composite Anode and Activated Carbon Cathode," ACS applied materials & interfaces, 2017, vol. 9, p. 17136-17144.
Zhao et al., "Dry-air-stable lithium silicide-lithium oxide core-shell nanoparticles as high-capacity prelithiation reagents," Nature communications, 2014, vol. 5, 5088.

(56) References Cited

OTHER PUBLICATIONS

Zhao, H.; et al., "Toward practical application of functional conductive polymer binder for a high-energy lithium-ion battery design," Nano letters, 2014, vol. 14, p. 6704-6710.

Zhao, J.; et al., A general prelithiation approach for group IV elements and corresponding oxides. Energy Storage Materials, 2018, vol. 10, p. 275-281.

Zhao, J.; et al., "Air-stable and freestanding lithium alloy/graphene foil as an alternative to lithium metal anodes," Nature nanotechnology, 2017, vol. 12, p. 993-999.

Zhao, J.; et al., "Artificial Solid Electrolyte Interphase-Protected LixSi Nanoparticles: An Efficient and Stable Prelithiation Reagent for Lithium-Ion Batteries," J. Am. Chem. Soc. 2015, 137, 8372-5.

Extended European Search Report for application 19864375.1, dated Jun. 6, 2022, 6 pages.

Chinese National Intellectual Property Administration Notification of First Office Action for Application No. 201980075168.X, dated Mar. 19, 2024 (16 pages with translation).

\* cited by examiner

CHEMICAL PREALKALIATION OF ELECTRODES

CROSS-REFERENCE TO RELATED APPLICATIONS

This patent application is the U.S. national stage entry, under 35 U.S.C. § 371, of International Application Number PCT/US2019/052787, filed Sep. 24, 2019, which claims priority to U.S. Provisional Application No. 62/735,831, filed Sep. 24, 2018, the entire contents of each of which are hereby incorporated by reference.

BACKGROUND

The prealkaliation of negative electrodes (NE) is an appealing strategy to increase the available energy densities of alkali metal-ion batteries (e.g., lithium-ion batteries—LIBs) because it enables the compensation for initial capacity loss and the pairing with high-capacity positive electrode (PE). However, existing prealkaliation methods involve complicated manipulation or are restricted to inert gas conditions. Accordingly, more effective methods of prealkaliation are needed for alkali metal-ion batteries to achieve their full potential.

SUMMARY

In one aspect, disclosed are methods of making an electrode, the method comprising contacting an electrode material with a mixture comprising an aromatic compound, an alkali metal, and an organic solvent to provide the electrode.

In another aspect, disclosed are methods of making a battery, the method comprising making an electrode as disclosed herein; arranging a separator such that it is between the electrode and a second electrode to provide a cell; and adding a non-aqueous electrolyte to the cell to provide the battery.

BRIEF DESCRIPTION OF THE DRAWINGS

FIG. 2 shows characterization of red P and Sn powder samples before and after prelithiation.

FIG. 4 describes an embodiment of the disclosed methods in ambient air.

FIG. 5 is a series of plots showing electrochemical performances of NMC(111)/graphite, NMC(111)/pristine P/C and NMC(111)/part-prelithiated P/C full LIBs.

FIG. 10 is a series of plots showing voltage profiles of mesoporous C electrode (C:super C65:CMC=75:10:15 by weight) at 0.1 A/g.

DETAILED DESCRIPTION

Lithium-ion batteries (LIBs) with high energy densities and good cycling performance are highly desired for the widespread usage of portable electronic devices and the emerging market of electric vehicles. Conventional LIBs are primarily based on graphite negative electrodes (NE) and lithium metal oxide (LMO) positive electrodes (PE), and their energy densities are typically 150~200 Wh kg$^{-1}$, which struggle to fulfil the increasing demand.

Considerable efforts have been devoted to developing high-capacity NE and PE materials for next-generation LIBs with improved energy densities. Various Li-free NEs (e.g. P, Sn, Si, metal oxides) have been considered as promising alternatives. However, most of them suffer from low initial coulombic efficiencies (CE, 50%-85%) because of the solid-electrolyte interphase (SEI) formation and irreversible parasitic reactions (such as Li$_2$O formation for some metal oxides). This is especially found when nanostructured designs are utilized for improving the power capability and cycling performance. A large amount of active Li from PE is consumed and permanently trapped in NE at the first charge, causing an appreciable capacity loss of full cell. Moreover, the optional Li-rich PEs are usually limited to LMO with low specific capacities (<200 mAh g-1), which hinders further improvement in energy densities of full cells.

Figure 7:
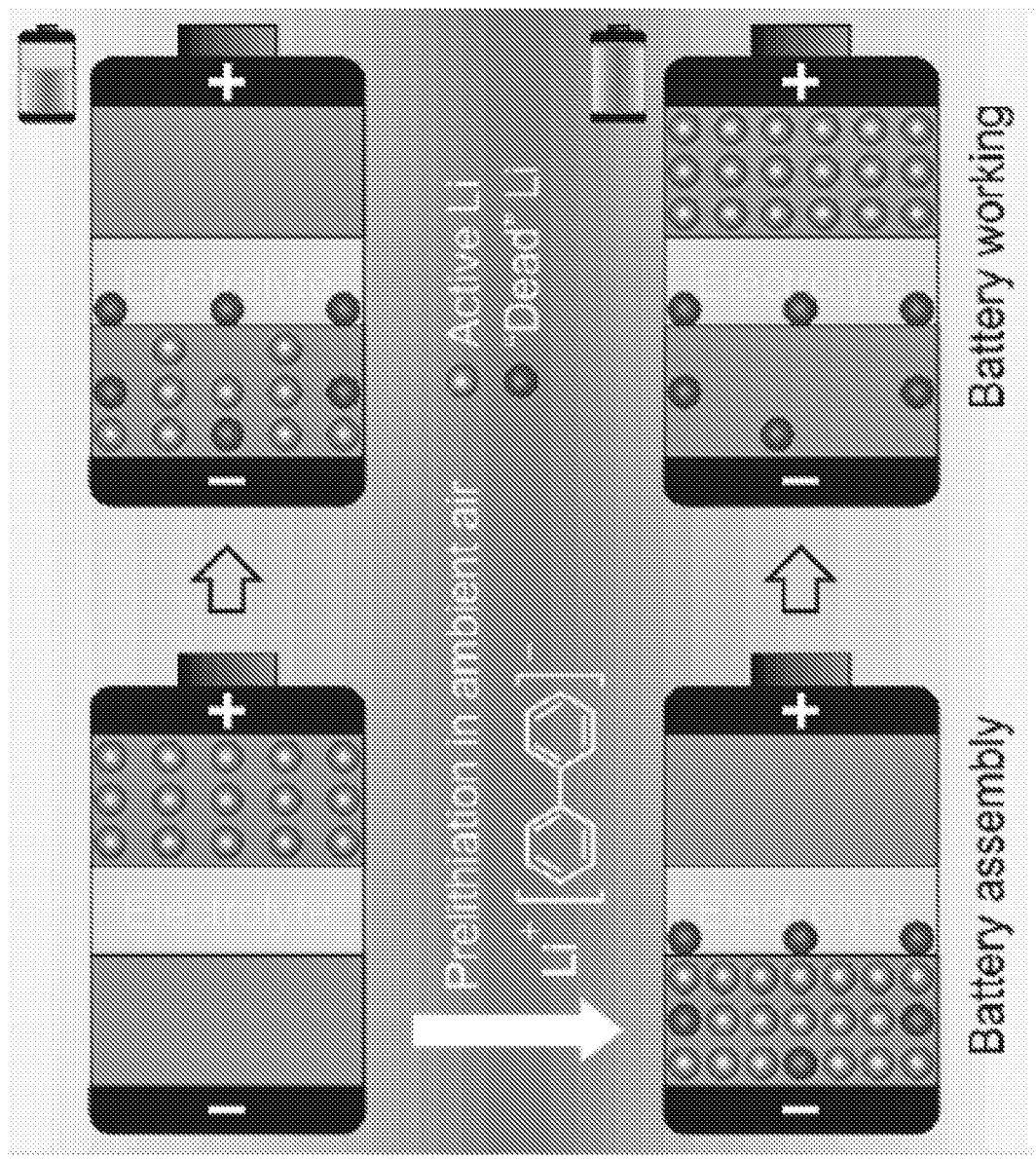
FIG. 7 is schematic of a battery including electrode(s) prepared by the disclosed methods relative to a battery including electrodes(s) not prepared by the disclosed methods.
Figure 20:
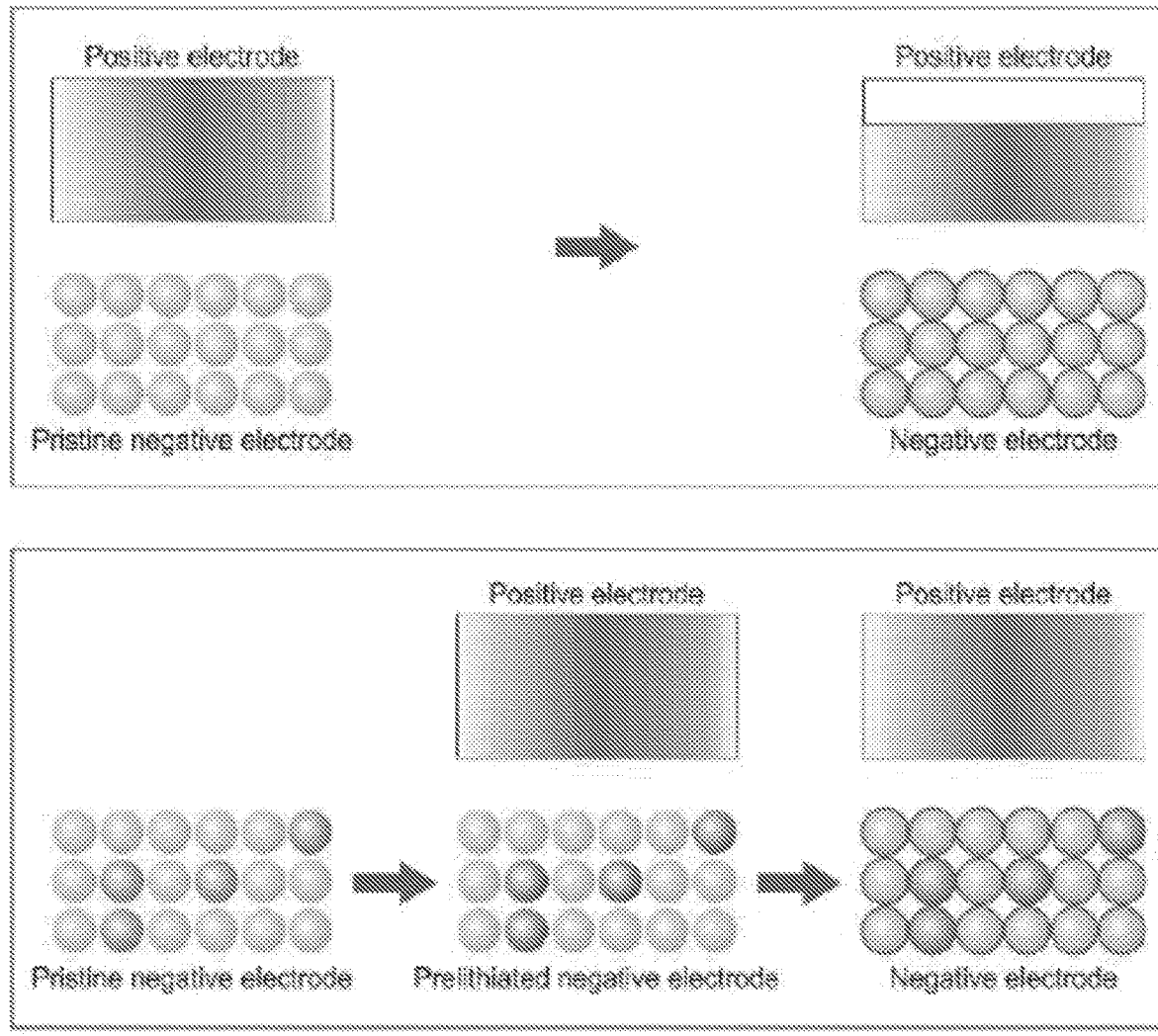
FIG. 20 is a schematic showing compensation of initial capacity loss of an electrode within a battery.

The prelithiation of NE can be an appealing approach to overcome these shortcomings (FIG. 7 & FIG. 20). It can compensate for the initial active Li loss, and can enable the pairing with high-capacity Li-free PEs (e.g. sulfur, oxygen, V$_2$O$_5$). Nonetheless, electrode materials are generally difficult to prelithiate due to their low potentials. In addition, it is also difficult to control the amount of prelithiation. Various strategies have been developed to prepare prelithiated electrodes. However, these strategies can be complex, time-consuming, technically challenging, and burdensome by having to be performed in strict environments, such as inert environments. Similar issues arise with other alkali metal-based electrodes (e.g., sodium ion batteries). Disclosed herein are methods that overcome the aforementioned barriers to efficient and effective prealkaliation of electrode materials.

1. Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

Definitions of specific functional groups and chemical terms are described in more detail below. For purposes of this disclosure, the chemical elements are identified in accordance with the Periodic Table of the Elements, CAS version, Handbook of Chemistry and Physics, 75*$^{th}$Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

The term "alkyl," as used herein, refers to a straight or branched, saturated hydrocarbon chain containing from 1 to 30 carbon atoms. The term "$C_y$-$C_z$ alkyl" means a straight or branched chain hydrocarbon from y to z carbon atoms. Representative examples of alkyl include, but are not limited to, methyl, ethyl, n-propyl, iso-propyl, n-butyl, sec-butyl, iso-butyl, tert-butyl, n-pentyl, isopentyl, neopentyl, n-hexyl, 3-methylhexyl, 2,2-dimethylpentyl, 2,3-dimethylpentyl, n-heptyl, n-octyl, n-nonyl, n-decyl and n-dodecyl.

The term "alkenyl," as used herein, means a straight or branched, unsaturated hydrocarbon chain containing at least one carbon-carbon double bond and from 2 to 30 carbon atoms. The alkenyl groups, as used herein, may have 1, 2, 3, 4, or 5 carbon-carbon double bonds. The carbon-carbon double bonds may be cis or trans isomers.

The term "alkylene," as used herein, refers to a divalent group derived from a straight or branched chain hydrocarbon of 1 to 50 carbon atoms, for example, of 2 to 5 carbon atoms. Representative examples of alkylene include, but are not limited to, —$CH_2CH_2$—, —$CH_2CH_2CH_2$—, —$CH_2CH_2CH_2CH_2$—, and —$CH_2CH_2CH_2CH_2CH_2$—. The term "$C_y$-$C_z$ alkylene" means a straight or branched chain hydrocarbon from y to z carbon atoms.

The term "alkynyl," as used herein, means a straight or branched chain hydrocarbon group containing from 2 to 10 carbon atoms and containing at least one carbon-carbon triple bond. Representative examples of alkynyl include, but are not limited to, acetylenyl, 1-propynyl, 2-propynyl, 3-butynyl, 2-pentynyl, and 1-butynyl.

The term "aromatic compound," as used herein, refers to a compound having at least one aromatic ring in its structure.

The term "aryl," as used herein, refers to a phenyl group.

The term "cycloalkyl," as used herein, refers to a saturated ring system containing all carbon atoms as ring members and zero double bonds. Representative examples of cycloalkyl include, but are not limited to, cyclopropyl, cyclobutyl, cyclopentyl, cyclohexyl, cycloheptyl, cyclooctyl, cyclononyl, and cyclodecyl.

The term "cycloalkenyl," as used herein, refers to a non-aromatic ring system containing all carbon atoms as ring members and at least one carbon-carbon double bond and preferably having from 5-10 carbon atoms per ring. Representative cycloalkenyls include, but are not limited to, cyclopentenyl, cyclohexenyl and cycloheptenyl.

The term "carbocycle" includes both a "cycloalkyl" and a "cycloalkenyl."

2. Methods of Making Electrodes

Disclosed herein are methods of making electrodes. The electrode can be a negative electrode (e.g., anode) or a positive electrode (e.g., cathode). The method includes contacting an electrode material with a mixture that includes an aromatic compound, an alkali metal, and an organic solvent to provide the electrode. The methods are directed to the prealkaliation of the electrode material, and thus providing the electrode. Prealkaliation refers to the incorporation of an alkali metal in the electrode material to provide the electrode. Accordingly, the disclosed methods can increase the amount of alkali metal present in the electrode compared to the amount of alkali metal present in the electrode material. By introducing alkali metal in the electrode material and electrode thereof, the methods can reduce the consequences of solid electrolyte interphase formation. Examples of prealkaliation include, but are not limited to, prelithiation, presodiation, and prepotassiation.

In addition, due to using the mixture, the method can advantageously be performed in ambient air. Accordingly, in some embodiments, the methods are not performed in an inert gas environment. Inert gas environment, as used herein, refers to a gas environment that includes unreactive gases known within the art. Examples of unreactive gases that can be used to provide an inert gas environment include, but are not limited to, nitrogen, argon, and other noble gases (as well as combinations thereof). Accordingly, in some embodiments, the method is performed in an environment that does not include nitrogen, argon, or a combination thereof. Inert gas environments may have trace amounts of reactive gases (e.g., less than or equal to 5 ppm of water and/or less than or equal to 10 ppm oxygen). Yet, the disclosed methods offer a robust process for providing electrodes—which also can allow the method to be performed in an inert environment. Accordingly, in some embodiments, the methods are performed in an inert environment. In some embodiments, the methods are performed in an ambient air environment or an inert environment.

The electrode material can be contacted with the mixture for varying amounts of time. Varying the time can achieve a different amount of alkali metal present in the electrode. Thus, varying the time can achieve desired properties including, but not limited to, irreversible capacity and efficiency. The electrode material can be contacted with the mixture for about 1 minute to about 2 days, such as about 5 minutes to about 2 days, about 30 minutes to about 2 days, about 1 hour to about 2 days, about 5 hours to about 2 days, about 30 minutes to about 1.5 days, about 1 hour to about 1.5 days, about 5 hours to about 1.5 days, about 10 hours to about 2 days, or about 12 hours to about 2 days. In some embodiments, the electrode material is contacted with the mixture for greater than 1 minute, greater than 10 minutes, greater than 1 hour, greater than 5 hours, greater than 10 hours, greater than 16 hours, or greater than 1 day. In some embodiments, the electrode material is contacted with the mixture for less than 2 days, less than 1.5 days, less than 1 day, less than 16 hours, or less than 10 hours.

The provided electrode can be washed with, e.g., a non-aqueous solvent. In some embodiments, the electrode is washed with a non-aqueous solvent in 1 to 5 individual wash steps. In some embodiments, the provided electrode may include residual components of the mixture (e.g., alkali metal, aromatic compound, solvent, or a combination thereof).

A. Electrode Materials

As mentioned above, the provided electrode can be either a positive electrode or a negative electrode. Accordingly, the electrode material can be a positive electrode material or a negative electrode material, where the positive electrode material is used to provide the positive electrode and the negative electrode material is used to provide the negative electrode. In some embodiments, the electrode material can itself be used as an electrode, however, with decreased capabilities compared to the provided electrode of the disclosed methods. In a preferred embodiment, the electrode material is a negative electrode material.

The electrode material can include C, Si, Sn, Sb, P. S, or a combination thereof. Elements as recited herein can be referred to as their full name (e.g., carbon) or by their abbreviation (e.g., C). In some embodiments, the electrode material includes C, SiO, SnO, or a combination thereof. In some embodiments, the electrode material includes C, SiO, SnO, $Li_3P$, $Li_{22}Sn_5$, SiO/C composite, or a combination thereof. In some embodiments, the electrode material is selected from the group consisting of C, SiO, SnO, $Li_3P$, $Li_{22}Sn_5$, and SiO/C composite. These elements and combinations thereof are also referred to as an active material of the electrode material (and electrode thereof). For example, the electrode material can include an active material, where the active material can include C, Si, Sn, Sb, P, S, or a combination thereof.

Examples of carbon include, but are not limited to, graphite, disordered carbon (also referred to amorphous carbon), carbon black, expanded graphite, graphene, carbon nanotubes, mesoporous carbon, and combinations thereof. Examples of disordered carbon include, but are not limited to, hard carbon and soft carbon. In some embodiments, carbon is selected from the group consisting of graphite, disordered carbon, carbon black, expanded graphite, graphene, carbon nanotubes, and mesoporous carbon. In some embodiments, carbon is selected from the group consisting of graphite, mesoporous carbon, and disordered carbon. Discussion on the different types of carbon can be found in Fitzer et al., Pure & Applied Chem. Vol 67, No. 3 pp. 473-506, 1995, which is incorporated by reference herein in its entirety.

The electrode material can further include a conductive material and a binder, in addition to the active material. Examples of the conductive material include, but are not limited to, carbon black (e.g., Ketjenblack, Acetylene black, Vulcan, Furnace black, Ensaco, and/or Super), activated carbon, carbon nanotube, carbon nanofiber, and graphene. Examples of the binder include, but are not limited to, polyvinylidene fluoride, carboxymethyl cellulose, styrene-butadiene rubber, poly(carboxylic acid), and alginate. In some embodiments, the electrode material includes about 50% to about 100% active material, such as about 60% to about 99% active material, about 70% to about 99% active material, about 60% to about 100% active material, or about 75% to about 100% active material.

The electrode material can be made in a variety of different ways known within the art. For example, the electrode material can be made by coating a slurry of the active material and optionally the binder and/or conductive material on a metal (e.g., copper foil). The electrode material can then be dried. In some embodiments, the electrode material is dried at about 20° C. to about 100° C. prior to being used in the disclosed methods. In addition, the electrode material can be dried under a pressure of about 1 t per $cm^2$ to about 8 t per $cm^2$.

B. Mixtures

The mixture includes an aromatic compound, an alkali metal, and an organic solvent. The components of the mixture can offer advantageous properties, such as allowing the method to be performed in ambient air conditions. It is hypothesized, without being bound to a particular theory, that a film can be formed on a surface of the mixture by the alkali metal and the aromatic compound. The film can limit and/or prevent the reaction of the mixture components and electrode material with reactive gases (e.g., ambient air/oxygen), and can limit and/or prevent evaporation of the organic solvent. Accordingly, the method may include the mixture having a film on a surface of the mixture.

The alkali metal and aromatic compound can be added to the organic solvent together or one before the other. In some embodiments, the aromatic compound is added (e.g., dissolved) to the organic solvent prior to the alkali metal. The alkali metal can then be added to the organic solvent to provide the mixture. The mixture can then be allowed to equilibrate for a time of about 2 minutes to about 24 hours prior to being used in the disclosed methods.

The mixture can also have an advantageous redox potential that allows it to be used for a wide range of electrode materials. For example, the mixture can have a redox potential of less than 1.2 V, less than 500 mV, less than 200 mV, less than 20 mV, or less than 10 mV. In some embodiments, the mixture has a redox potential of greater than 0.1 mV, greater than 1 mV, greater than 5 mV, or greater than 10 mV. The redox potential of the mixture can be measured against the electrode material or the electrode.

The mixture can include varying combinations of the alkali metal, the organic solvent, and the aromatic compound. In some embodiments, the mixture includes an alkali metal selected from the group consisting of Li, Na, K, and a combination thereof; an organic solvent; and an aromatic compound. In some embodiments, the mixture includes an alkali metal; an ether; and an aromatic compound. In some embodiments, the mixture includes an alkali metal; an ether; and an aromatic compound having 1 to 5 rings. In some embodiments, the mixture includes an alkali metal selected from the group consisting of Li, Na, and K; an ether; and an aromatic compound having 1 to 5 rings. In some embodiments, the mixture includes Li, an ether; and an aromatic compound having 1 to 3 rings.

1. Aromatic Compounds

The aromatic compound can be a monocyclic aromatic compound or a multicyclic aromatic compound. The aromatic compound can include 1 to 5 rings. In some embodiments, the aromatic compound includes 1 to 3 rings. The number of rings that the aromatic compound includes refers to both individual rings and rings within a fused ring system. For example, biphenyl is an aromatic compound having 2 rings. In addition, isoindene is an aromatic compound having two rings.

In some embodiments, the aromatic compound is of formula (I)

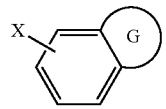

(I)

or a salt thereof, wherein: X is $C_1$-$C_{10}$ alkyl, $C_1$-$C_{10}$ alkylene-$G^1$, $G^2$, or H; $G^1$ is an aryl, or a $C_3$-$C_{12}$ carbocycle; $G^2$ is an aryl, or a $C_3$-$C_{12}$ carbocycle; and G is an optional monocyclic, bicyclic, tricyclic, or tetracyclic ring system.

In some embodiments, X is $C_1$-$C_5$ alkyl, $C_1$-$C_5$ alkylene-$G^1$, $G^2$, or H; $G^1$ is an aryl; $G^2$ is an aryl, or a $C_3$-$C_{12}$ carbocycle; and G is an optional monocyclic, bicyclic, or tricyclic ring system.

In some embodiments, X is $C_1$-$C_3$ alkylene-$G^1$, $G^2$, or H; $G^1$ is an aryl; $G^2$ is an aryl, or a $C_3$-$C_{12}$ carbocycle; and G is an optional monocyclic or bicyclic ring system.

In some embodiments, the aromatic compound is of formula (I-a)

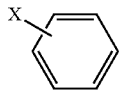

(I-a)

or a salt thereof, wherein: X is $C_1$-$C_{10}$ alkyl, $C_1$-$C_{10}$ alkylene-$G^1$, or $G^2$; $G^1$ is an aryl, or a $C_3$-$C_{12}$ carbocycle; and $G^2$ is an aryl, or a $C_3$-$C_{12}$ carbocycle.

In some embodiments, G is present, and X is H. In some embodiments, G is present and is a 5 or 6 membered ring, and X is H.

Alkyl, alkylene, aryl, and carbocycle can each independently be optionally substituted. For example, alkyl, alkylene, aryl, and carbocycle can each independently be optionally substituted with alkyl, alkenyl, alkynyl, aryl, or a combination thereof. In some embodiments, alkyl and/or alkylene are optionally substituted with $C_1$-$C_5$ alkyl. In some embodiments, aryl is optionally substituted with aryl. In addition, G can be optionally substituted. For example, in some embodiments, G is optionally substituted with alkyl or aryl. In some embodiments, G is optionally substituted with $C_1$-$C_5$ alkyl.

Representative examples of aromatic compounds that include a ring system fused to the parent phenyl moiety include, but are not limited to, naphthalene (e.g., monocyclic ring system fused to the parent moiety), azulene (e.g., monocyclic ring system fused to the parent moiety), anthracene (e.g., bicyclic ring system fused to the parent moiety), triphenylene (e.g., tricyclic ring system fused to the parent moiety), and perylene (e.g., tetracyclic ring system fused to the parent moiety). The fused ring system can be connected to the parent phenyl moiety through any carbon atom contained within the rings.

In some embodiments, the aromatic compound is selected from the group consisting of tert-amylbenzene; biphenyl; phenylcyclohexane; 1-phenyl-1-cyclohexene; 4-phenylcyclohexene; naphthalene; 1-methylnaphthalene; 2-methylnaphthalene; azulene; indane; indene; isoindene; diphenylmethane; 2,2-diphenylpropane; anthracene; fluorene; 9,9-dimethylfluorene; acenaphthene; acenaphthylene; phenanthrene; phenalene; para-terphenyl; meta-terphenyl ortho-terphenyl; tetracene; chrysene; triphenylene; pyrene; fluoranthene; benzo[a]fluorene; benzo[c]fluorene; benz[a]anthracene; benzo[c]phenanthrene; pentacene; perylene; picene; olympicene; tetraphenylene; benzo[a]pyrene; benzo[e]pyrene; benz[e]acephenanthrylene; benzo[a]fluoranthene; benzo[j]fluoranthene; benzo[k]fluoranthene; dibenz[a,h]anthracene; and dibenz[a,j]anthracene.

In some embodiments, the aromatic compound is selected from the group consisting of tert-amylbenzene; biphenyl; phenylcyclohexane; 1-phenyl-1-cyclohexene; 4-phenylcyclohexene; naphthalene: 1-methylnaphthalene; 2-methylnaphthalene; azulene; indane; indene; isoindene; diphenylmethane; 2,2-diphenylpropane; anthracene; fluorene; 9,9-dimethylfluorene; acenaphthene; acenaphthylene; phenanthrene; phenalene; para-terphenyl; meta-terphenyl ortho-terphenyl; tetracene; chrysene; triphenylene; pyrene; and fluoranthene.

In some embodiments, the aromatic compound is selected from the group consisting of tert-amylbenzene; biphenyl; phenylcyclohexane; 1-phenyl-1-cyclohexene; 4-phenylcyclohexene; naphthalene; 1-methylnaphthalene; 2-methylnaphthalene; azulene; indane; indene; isoindene; diphenylmethane; 2,2-diphenylpropane; anthracene; fluorene; 9,9-dimethylfluorene; acenaphthene; acenaphthylene; phenanthrene; phenalene; para-terphenyl; and meta-terphenyl ortho-terphenyl.

In some embodiments, the aromatic compound is selected from the group consisting of biphenyl; phenylcyclohexane; 1-phenyl-1-cyclohexene; 4-phenylcyclohexene; naphthalene; 1-methylnaphthalene; 2-methylnaphthalene; azulene; indane; indene; isoindene; diphenylmethane; 2,2-diphenylpropane; and 9,9-dimethylfluorene.

2. Alkali Metals

The alkali metal in the mixture can be incorporated in the electrode material during the method. The alkali metal can be added to the mixture in metallic form. The incorporation of the alkali metal can be dependent on the time the method is performed and/or the concentration of the alkali metal in the mixture. In addition, the alkali metal can aid in the formation of a film on a surface of the mixture, which has advantageous properties as discussed herein. The alkali metal can be any element (not including hydrogen) from Group I of the periodic table that would be useful in the disclosed electrodes and methods of making. For example, alkali metals include Li, Na, K, Rb, Cs, and Fr. In some embodiments, the alkali metal includes Li, Na, K, or a combination thereof. In some embodiments, the alkali metal is selected from the group consisting of Li, Na, K, and a combination thereof. In some embodiments, the alkali metal is selected from the group consisting of Li, Na, and K.

The alkali metal can be included in the mixture at varying amounts. For example, the alkali metal can be included in the mixture at a concentration of about 0.1 M to about 10 M, such as about 0.5 M to about 10 M, about 0.75 M to about 5 M, about 0.1 M to about 5 M, about 0.1 M to about 2 M, or about 0.5 M to about 2 M. In some embodiments, the alkali metal is included in the mixture at a concentration of greater than 0.1 M, greater than 0.25 M, greater than 0.5 M, or greater than 0.75 M. In some embodiments, the alkali metal is included in the mixture at a concentration of less than 10 M, less than 7 M, less than 5 M, or less than 2 M. In some embodiments, the alkali metal is included in the mixture at an excess amount of the alkali metal's solubility within the mixture.

3. Organic Solvents

The organic solvent can be any organic solvent that would be useful for forming a mixture with the alkali metal and the aromatic compound. In a preferred embodiment, the organic solvent comprises an ether. Examples of ether-based organic solvents include, but are not limited to, diethyl ether, tetrahydrofuran, 1,4-dioxane, dimethoxyethane, methoxymethane, and diethoxyethane. In some embodiments, the organic solvent is an ether.

In some embodiments the organic solvent includes tetrahydrofuran, 2-methyltetrahydrofuran, 1,4-dioxane, diethyl ether, dimethoxyethane, diethoxyethane, dimethylformamide, 1-methoxy-2-ethoxyethane, hexamethylphosphoramide, 1,3-dimethoxypropane, 1,2-dimethoxypropane, or a combination thereof. In some embodiments, the organic solvent is selected from the group consisting of tetrahydrofuran, 2-methyltetrahydrofuran, 1,4-dioxane, diethyl ether, dimethoxyethane, diethoxyethane, dimethylformamide, 1-methoxy-2-ethoxyethane, hexamethylphosphoramide, 1,3-dimethoxypropane, 1,2-dimethoxypropane, and a combination thereof.

C. Electrodes

The electrodes can share some of the properties of the electrode material. Accordingly, the description of the electrode material regarding the active material, the binder, and the conductive material can be applied to the electrode. However, unlike the electrode material, the provided electrode has an increased amount of alkali metal due to the disclosed methods. The increased amount of alkali metal can provide advantageous properties to the electrode. For example, the electrode can have a coulombic efficiency of greater than or equal to 90%, greater than or equal to 91%, greater than or equal to 92%, greater than or equal to 93%, greater than or equal to 94%, or greater than or equal to 95%. In some embodiments, the electrode has a coulombic efficiency of less than or equal to 100%. Coulombic efficiency, as used herein, refers to the ratio of the first dealkaliation capacity (e.g., delithiation or desodiation) and the first alkaliation capacity (e.g., lithiation or sodiation).

2. Methods of Making a Battery

Due to the advantageous properties of the provided electrodes, they can be used in a wide range of energy storage applications. Examples include, but are not limited to, batteries, rechargeable batteries, fuel cells, and redox flow batteries. In another aspect, disclosed are methods of making a battery including the disclosed electrode. The method includes making an electrode as disclosed herein. The provided electrode may include residual components of the mixture (e.g., alkali metal, aromatic compound, solvent, or a combination thereof). The electrode can also be further processed. For example, the electrode may be processed via techniques that include, but are not limited to, slurry coating, dry press, and other techniques known within the art.

The method further includes arranging a separator such that it is between the electrode and a second electrode to provide a cell. Where the provided electrode is a negative electrode, the second electrode is a positive electrode. And, where the provided electrode is a positive electrode, the second electrode is a negative electrode. In a preferred embodiment, the electrode is a negative electrode and the second electrode is a positive electrode. The positive electrode can include $LiCoO_2$, $LiNiO_2$. $LiMn_2O_4$, $Li_{1+n}Ni_xMn_yCo_zO_2$, $LiFePO_4$, $LiNi_xCo_yAl_zO_2$, $V_2O_5$, Sulfur, $O_2$, or a combination thereof. In some embodiments, the positive electrode is selected from the group consisting of $LiCoO_2$, $LiNiO_2$, $LiMn_2O_4$, $Li_{1+n}Ni_xMn_yCo_zO_2$, $LiFePO_4$, $LiNi_xCo_y$-$Al_zO_2$, $V_2O_5$, Sulfur, and $O_2$.

The method also includes adding a non-aqueous electrolyte to the cell to provide the battery. The non-aqueous electrolyte can include an alkali metal salt, a solvent, and optionally an additive. Examples of the solvent include, but are not limited to, ethylene carbonate (EC), propylene carbonate (PC), ethyl methyl carbonate (EMC), dimethyl carbonate (DMC), and diethyl carbonate (DEC). Examples of the additive include, but are not limited to, vinylene carbonate (VC), fluoroethylene carbonate (FEC), vinyl ethylene carbonate (VEC), ethylene sulfite (ES), 1,3-propane sultone (PS), 1,3-propene sultone (PRS), catechole carbonate (CC), cyclohexyl benzene (CHB), biphenyl, and pyrocarbonates. In some embodiments, the alkali metal of the alkali metal salt can be the same alkali metal included in the mixture used to provide the electrode. Examples of a lithium salt include, but are not limited to, lithium hexafluorophosphate, lithium perchlorate, lithium tetrafluoroborate, lithium bis(trifluoromethanesulfonyl)imide, and lithium hexafluoroarsenate. Examples of a sodium salt include, but are not limited to, sodium perchlorate and sodium hexafluorophosphate.

In a preferred embodiment, the battery is a rechargeable lithium-ion battery (LIB). In a LIB embodiment, the provided electrode is a negative electrode that was contacted with a mixture comprising lithium. And, the second electrode is a positive electrode. The positive electrode of a LIB embodiment can include $LiCoO_2$, $LiNiO_2$, $LiMn_2O_4$, $Li_{1+n}Ni_xMn_yCo_zO_2$, $LiFePO_4$, $LiNi_xCo_yAl_zO_2$, $V_2O_5$, Sulfur, $O_2$, or a combination thereof. In some embodiments, the positive electrode is selected from the group consisting of $LiCoO_2$, $LiNiO_2$, $LiMn_2O_4$, $Li_{1+n}Ni_xMn_yCo_zO_2$, $LiFePO_4$, $LiNi_xCo_yA_zO_2$, $V_2O_5$, Sulfur, and $O_2$. Examples of lithium salts that can be included within the LIB embodiment include the same salts as listed above in regards to the battery. In some LIB embodiments, the positive electrode is Li-free.

3. Examples

Example 1

Chemical Treatment of Lithium Battery Anodes

Experimental

Preparation of Prelithiation Reagent: The prelithiation reagent was prepared by dissolving an excess amount of Li metal into a biphenyl (Bp) and tetrahydrofuran (THF) solution in an argon-filled glovebox. In a typical procedure, 1.54 g Bp was dissolved in 10 ml of THF to make a 1 M Bp THF solution and then a piece of Li metal (>0.069 g) was dissolved in this solution to form a 1 M Li-Bp THF.

Prelithiation of Red P and Sn Powder Samples: A certain amount of red P (100 mg) and Sn (200 mg) powders were added into a 1 M Li-Bp THF solution for an overnight reaction. The precipitates were separated by centrifugation and washed with THF several times, and then dried under vacuum. In order to eliminate the possible influence of by-products on the following compositional and structural characterizations, all of the synthesis and washing processes were conducted inside an argon-filled glovebox. The as synthesized powder samples were separately denoted as Li—P and Li—Sn. ICP analysis was employed to determine the composition of Li—P and Li—Sn. 15 mg Li—P and 15 mg Li—Sn were first added into ~0.5 ml ethanol, respectively, then naturally dried under ambient conditions. For Li—P, the residual was dissolved and stepwise diluted with 5% nitric acid ($HNO_3$). For Li—Sn, the residual was dissolved into a few drops of concentrated hydrochloric acid (HCl) and then stepwise diluted with deionized water (DI) water. The dilute solutions were analyzed by using an ICP calibration curve method. The powder samples were sealed under an argon atmosphere in an airtight polyethylene sample holder for XRD measurement.

Synthesis of P/C and S/C Composite Materials: Due to its low electronic conductivity and large volume change, pure P suffers from poor reversibility and problematic cycling stability. Therefore, a P/C composite was prepared by a vaporization/adsorption strategy. A mesoporous carbon was synthesized by the polymerization of resorcinol/formaldehyde onto multi-walled carbon nanotubes and then carbonized in 800° C. under argon atmosphere. A certain amount of as-synthesized mesoporous carbon (150 mg) and red phosphorus (P, 150 mg) were separately placed in a sealed glass tube under vacuum. The sealed glass tube was heated to 600° C. with a heating rate of 5° C./min and held at this temperature for 3 h. After cooling to 260° C. with a cooling rate was 1° C./min, the sealed glass tube was further held at this temperature for 24 h to convert white P to red P. After the vessel naturally cooled to room temperature, the P/C composite was obtained by washing with $CS_2$ and drying under vacuum. The S/C composite was also prepared by a similar method except using a different heat treatment procedure. The sealed glass tube containing mesoporous carbon (150 mg) and sulfur (350 mg) was heated to 550° C. with a heating rate of 5° C./min and held at this temperature for 12 h. The S/C composite was obtained after the vessel naturally cooled to room temperature without any further treatment. The actual content of P (40 wt. %) and S (64.3 wt. %) were determined by TGA analysis.

Electrode Preparation: The P/C electrode was prepared by coating a slurry containing 75 wt % P/C composite, 10 wt % super C65, and 15 wt % carboxymethyl cellulose (CMC) binder on a carbon-coated copper foil substrate. Then the electrode film was dried in an oven at 60° C. overnight. The mass loading of the P/C composite was 0.8~1.1 mg/cm². The Sn thin-film electrode was prepared by the electroless plating of Sn onto a Cu foil at room temperature for 5 min. The plating bath contained 0.1 M $SnSO_4$, 1 M thiourea, 0.5 M sodium hypophosphite and 0.85 M sulfuric acid. The prelithiated electrodes were prepared by immersing the P/C or Sn thin-film electrodes into the prelithiation reagent (1 M Li-Bp THF) for treatment. The degree of prelithiation (DOPL) was controlled by the treatment time. To prevent further reaction, the prelithiated electrodes were immediately washed with THF several times to remove the residual Li-Bp and then dried under vacuum. All operations were performed in an argon-filled glovebox unless otherwise specified. To verify the feasibility of prelithiation in ambient air, a series of P/C electrodes were also immersed into the prelithiation reagent (1 M Li-Bp THF) with different exposure times, then directly dried under vacuum before battery assembly. The immersion time was 10 min. The S/C electrode was prepared by coating a slurry containing 70 wt % S/C composite, 15 wt % super C65, and 15 wt % polyvinylidene fluoride (PVDF) binder on a carbon-coated aluminum foil substrate. Then the electrode film was dried in an oven at 60° C. overnight. The mass loading of the S/C composite was ~1.0 mg/cm².

Electrochemical Test: The electrochemical behavior of the Bp/Li-Bp redox couple in ether and carbonate-based electrolytes were studied using a three-electrode electrochemical cell and a CHI660 potentiostat. Two blank electrolytes, 1 M $LiPF_6$ in dimethoxyethane (DME) and 1 M $LiPF_6$ in ethylene carbonate (EC)/diethyl carbonate (DEC) (1:1 v/v, BASF), were prepared in advance. 0.0925 g Bp and an excess amount of Li metal were added into 6 ml of blank electrolyte. The ether-based electrolyte quickly changed from colorlessness to dark-green, indicating the formation of Li-Bp (0.1 M). In contrast, the carbonate-based electrolyte remained colorless. Cyclic voltammetry (CV) tests were conducted in the two resulting electrolytes. The working electrode is a glassy carbon disk electrode ($\phi$=3 mm). The counter electrode was a Pt wire electrode. The reference electrode was a Li/Li+ electrode made by enclosing a Li strip in a glass tube with Celgard M824 membrane and filling with the corresponding blank electrolyte. To verify the feasibility of as-proposed prelithiation method, the electrochemical behaviors of pristine and prelithiated electrodes were measured using 2032-type coin cells with Li metal as the counter electrode. The electrolyte was 1 M $LiPF_6$ in EC/DEC (1:1 v/v, BASF) with 10 wt % fluoroethylene carbonate (FEC) and 2 wt % vinylene carbonate (VC). The Celgard 2325 polymer was used as separator.

The NMC(111)/graphite full LIB was assembled using 2032-type coin cell using a NMC(111) laminate PE (5/16 inch) and a graphite laminate NE (7/16 inch). The loading of NMC(111) was 6.8 mg/cm² and the corresponding capacity of PE was 0.93 mAh cm⁻². The loading of graphite is 3.25 g cm⁻². The electrolyte was 1 M $LiPF_6$ in EC/DEC (1:1 v/v, BASF) with 10 wt % fluoroethylene carbonate (FEC) and 2 wt % vinylene carbonate (VC). The Celgard 2325 polymer was used as separator. The NMC(111)/pristine P/C and NMC(111)/part-prelithiated P/C full LIBs were assembled with similar conditions except replacing the graphite NE with the pristine P/C or part-prelithiated P/C NE. Since NMC(111) is in Li-rich state, it should be paired with a Li-lacking NE. The part-prelithiated P/C NE was prepared by immersing the pristine P/C electrode in 1 M Li-Bp THF for 10 s treatment. Then the electrode was immediately washed with THF several times to remove the residual Li-Bp and dried under vacuum. Prior to the S/P LIB assembly, the NE (P/C) and PE (S/C) were also investigated using 2032-type coin cells with Li metal as the counter electrode. The electrolyte was 1 M Lithium bis(trifluoromethane sulfonyl) imide (LiTFSI) in dimethoxyethane (DME)/1,3-dioxolane (DOL) (1:1 v/v, BASF) with 0.4 M lithium nitrate ($LiNO_3$) as additive. The S/P LIB was assembled in 2032-type coin cells with S/C PE (7/16 inch) and prelithiated P/C NE (½ inch) using the same ether-based electrolyte. The mass ratio of P/C to S/C is ~1.3:1.

All cells were assembled in an argon-fill glovebox. The galvanostatic charge/discharge test was conducted on an Arbin battery test system (BT2000) test system at room temperature.

Characterizations: Scanning electron microscopy (SEM) was carried out using a Hitachi S-4800 with a 5 kV accelerating voltage. Thermogravimetric analysis (TGA) was carried out on an SDT Q600 thermal analyzer with a heating speed of 10° C./min in argon flow of 50 ml/min. X-ray diffraction (XRD) was performed on a Bruker D8 instrument with a Cu Kα beam (40 kV, 40 mA, $\lambda$=1.5406 Å). ICP atomic emission spectrophotometry measurements were carried out on a Perkin-Elmer Optima 2100 DV ICP-OES apparatus.

The theoretical energy density for sulfur-phosphorus battery is estimated according to the following equation:

$$E = U \times C = \left(\frac{1}{3} \times 1.4\ V + \frac{2}{3} \times 1.1\ V\right) \times \frac{1552\ mAh/g \times 1675\ mAh/g}{1552\ mAh/g + 1675\ mAh/g} = 967\ Wh/kg.$$

The capacity of S/P LIB is 686 mAh/g (S/C) at a current density of 0.1 A/g. The mass ratio of P/C to S/C is ~1.3:1. The capacity ratio of first and second discharge plateaus is ~1:2. Therefore, the practical energy density for sulfur-phosphorus battery is estimated according following equation:

$$E = U \times C = \left(\frac{1}{3} \times 1.4\ V + \frac{2}{3} \times 1.1\ V\right) \times \frac{686\ mAh/g}{1+1.3} = 358\ Wh/kg.$$

Results

Figure 2A:
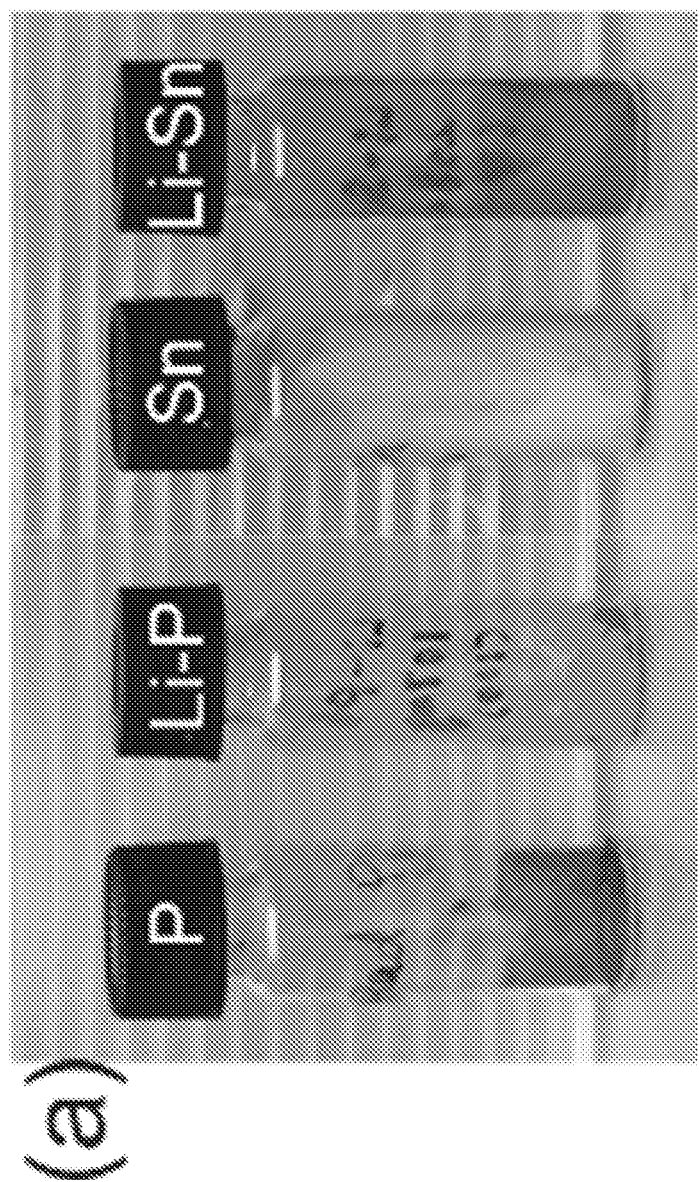
(FIG. 2A) Digital images.
Figure 2B:
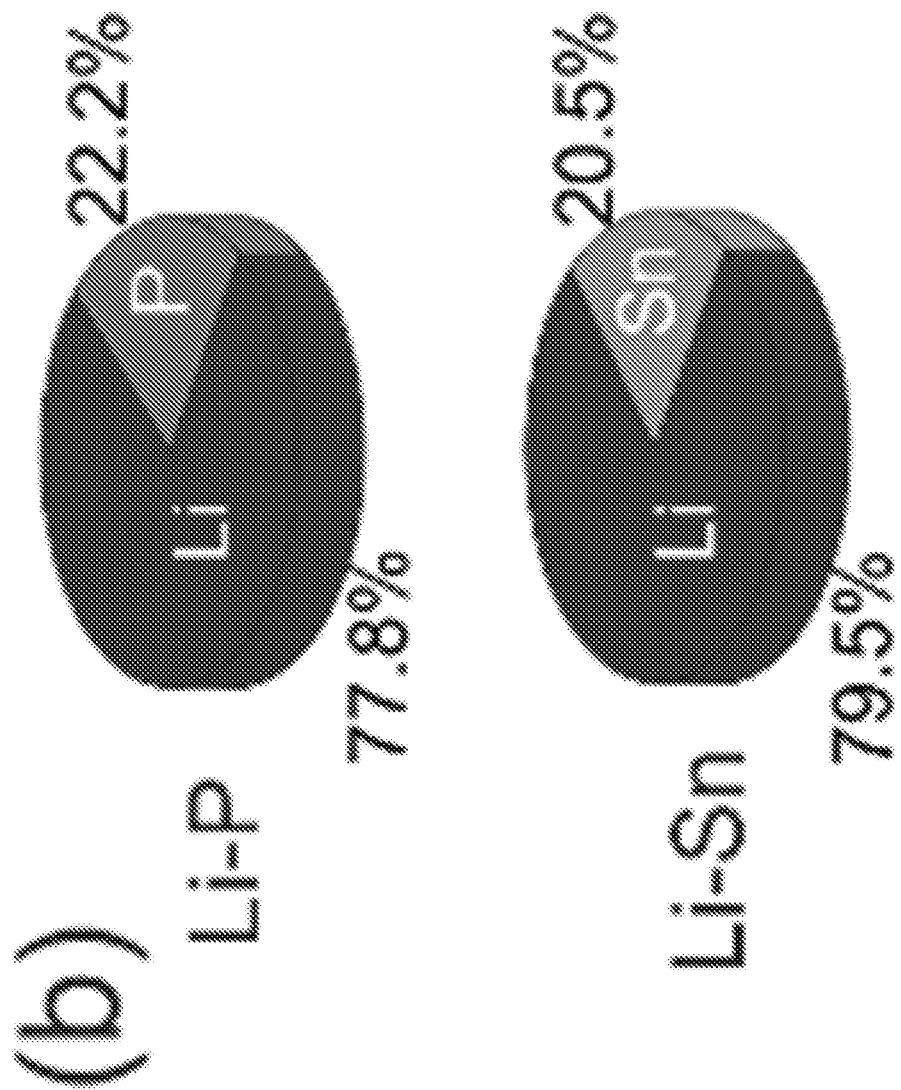
(FIG. 2B) The chemical compositions.
Figure 2C:
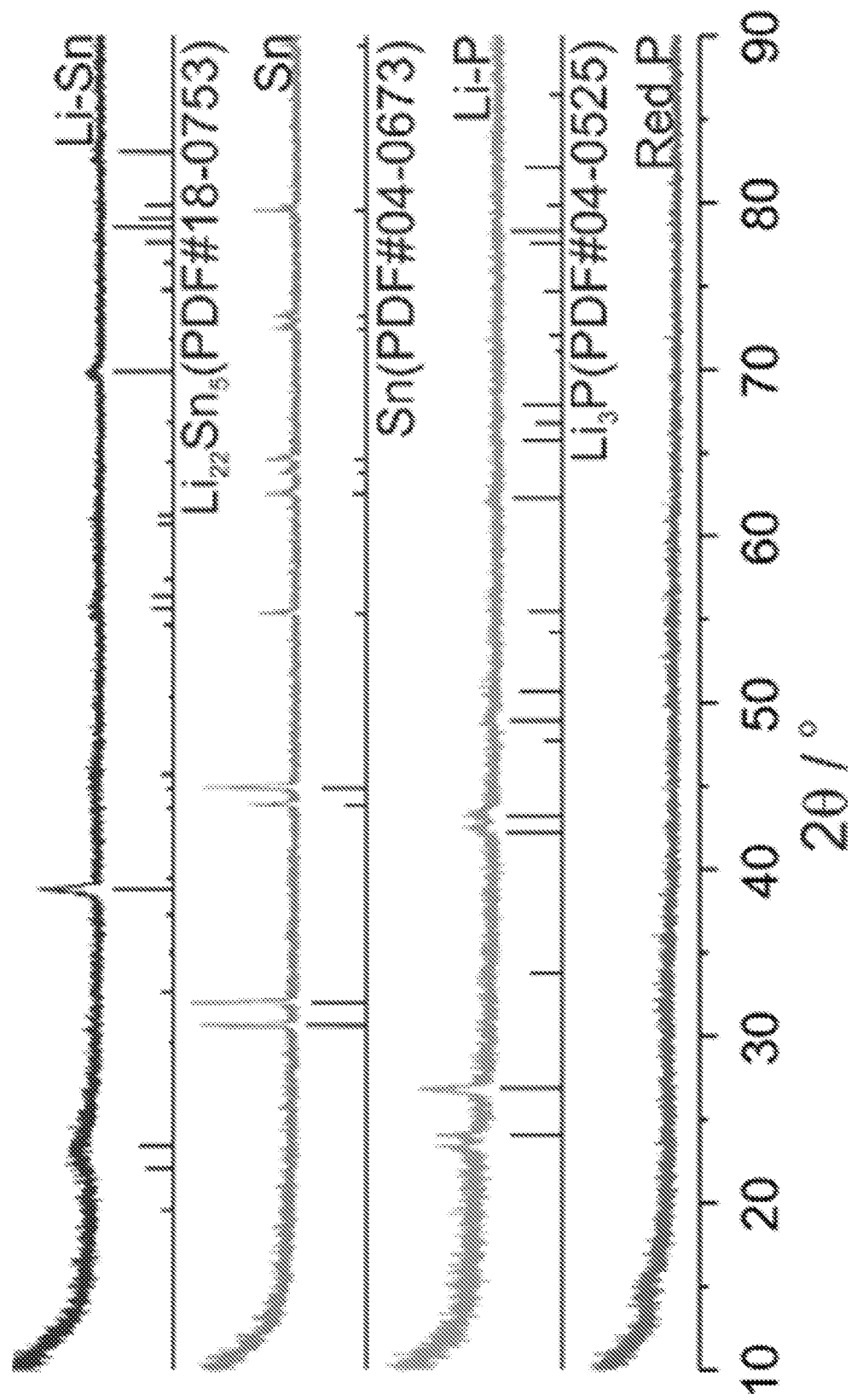
(FIG. 2C) X-ray diffraction (XRD) patterns.
Figure 2D:
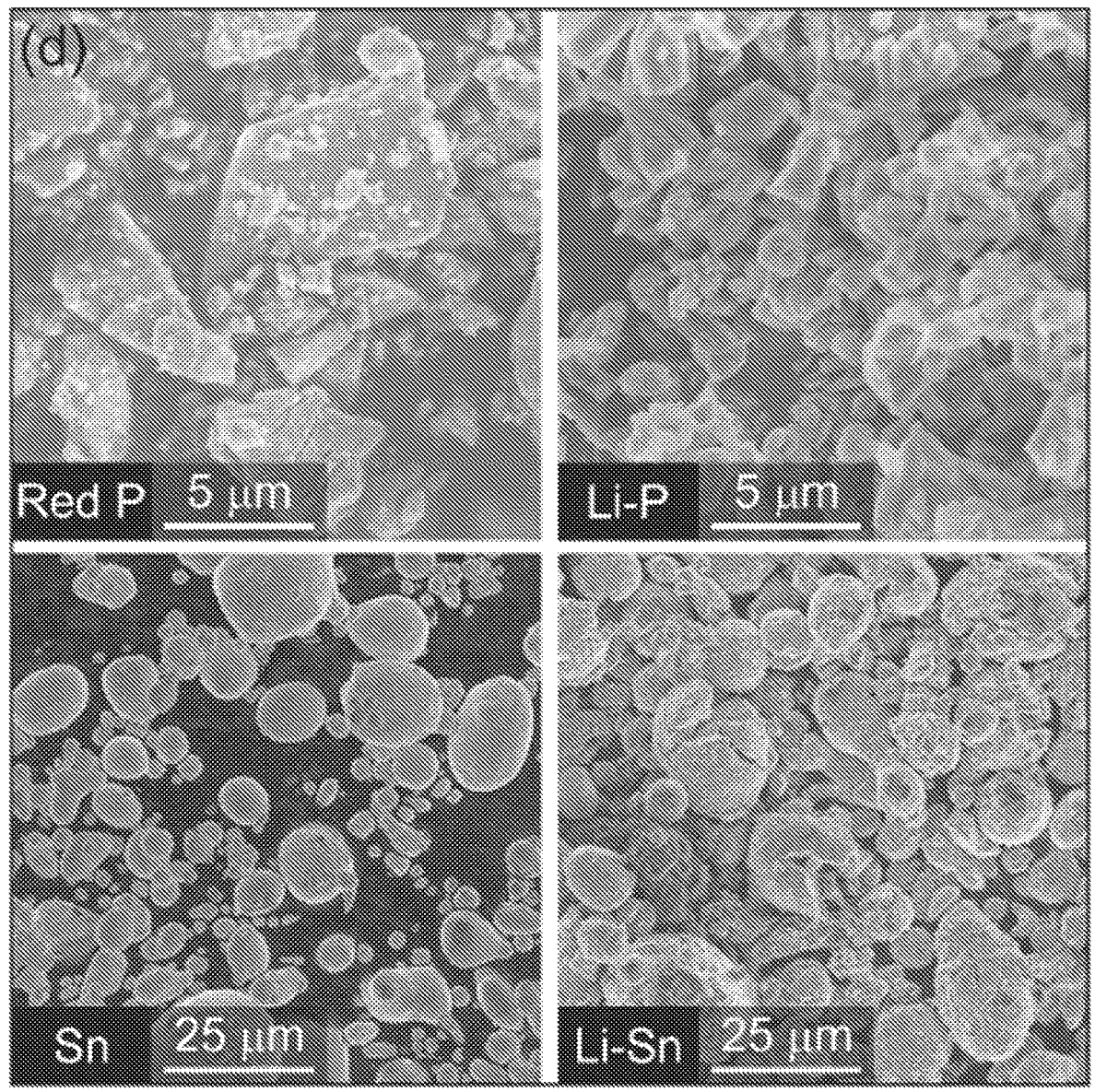
(FIG. 2D) scanning electron microscopy (SEM) images.
Figure 8A:
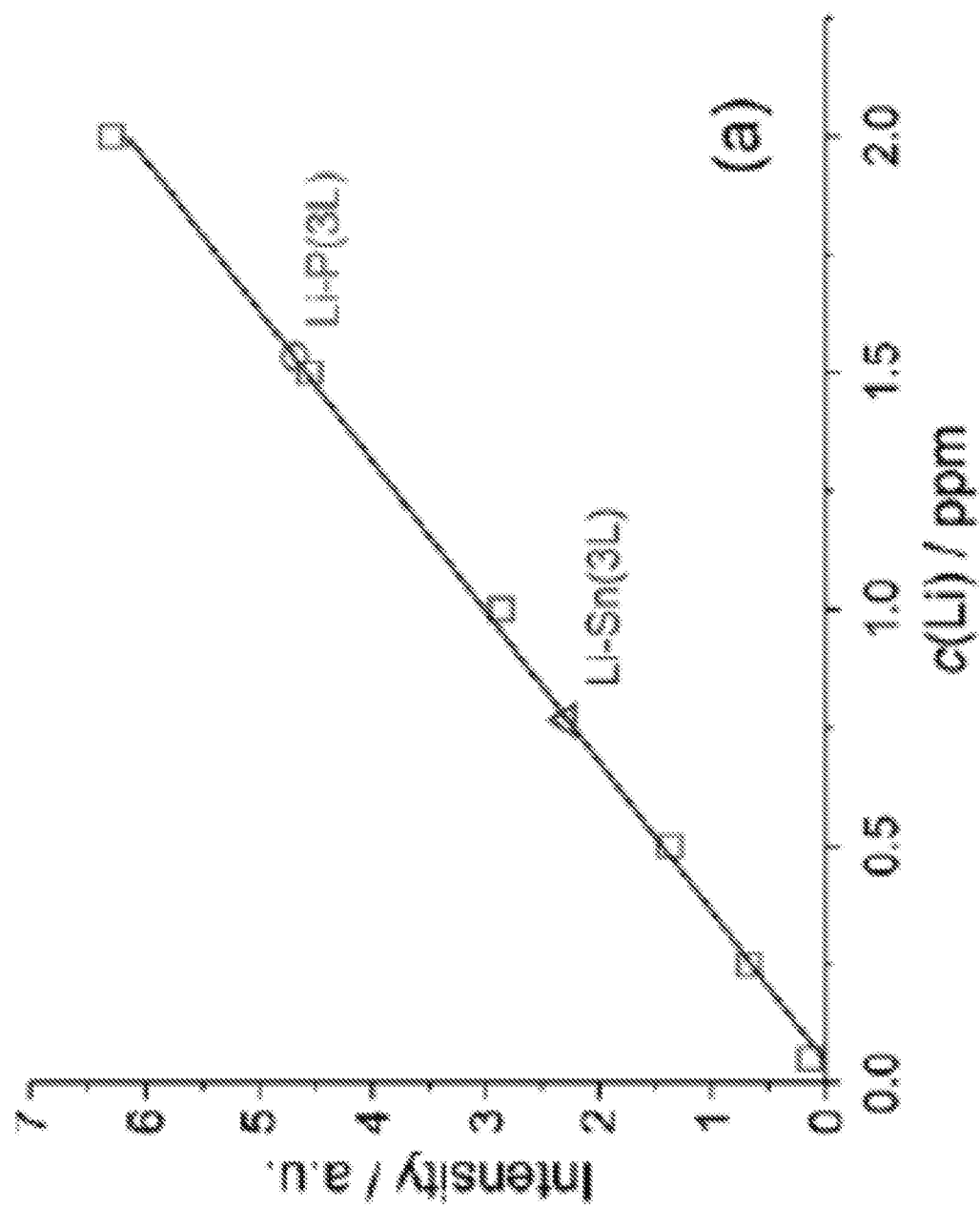
FIG. 8 is a series of plots showing the concentrations of Li (FIG. 8A), P (FIG. 8B), and Sn (FIG. 8C) as determined by an inductively coupled plasma (ICP) calibration curve method. The solutions were prepared by a stepwise dissolution technique, which is equivalent to the dissolution of the 15 mg powder samples (Li—P or Li—Sn) in 3 L water solvent.
Figure 8B:
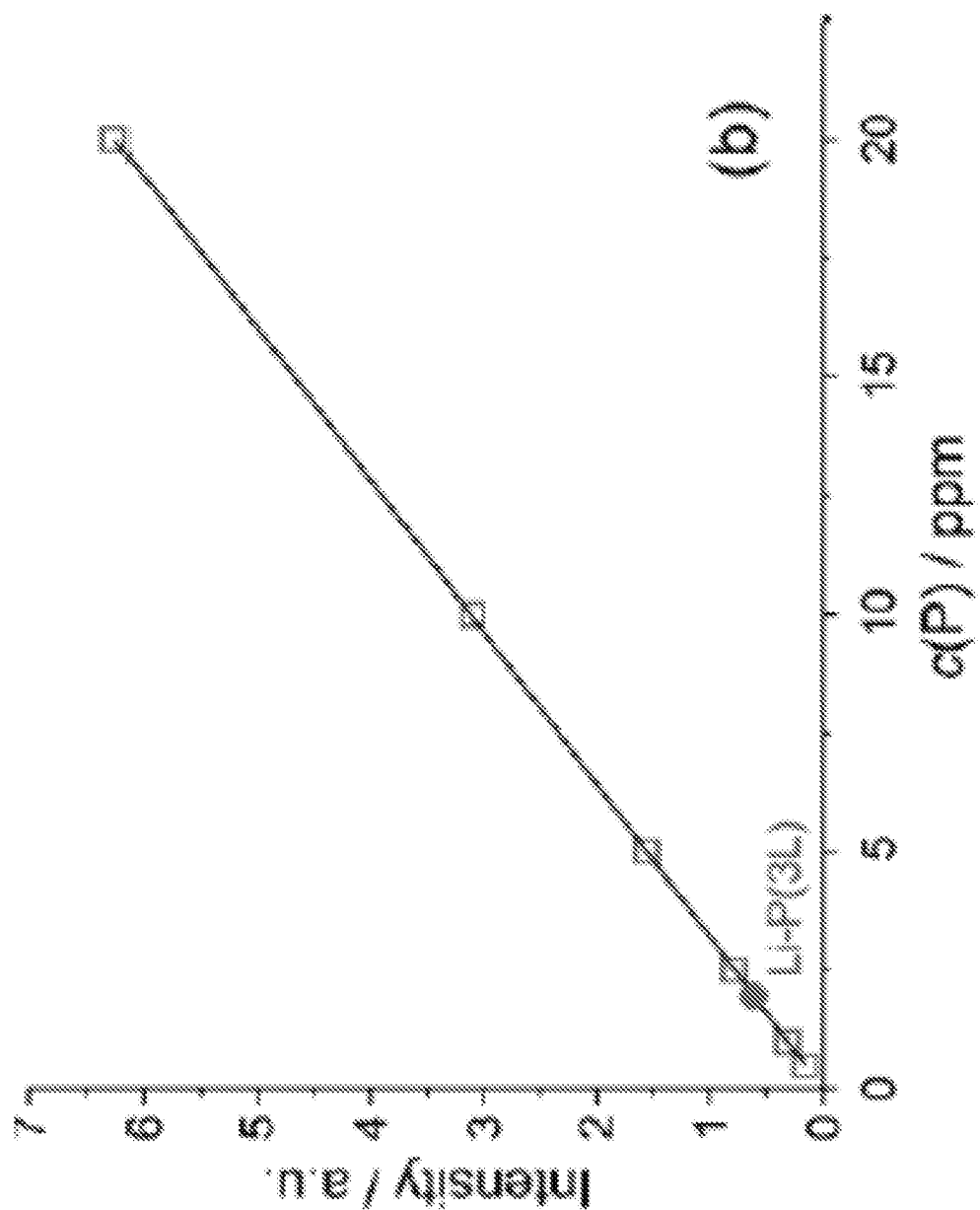
Figure 8C:
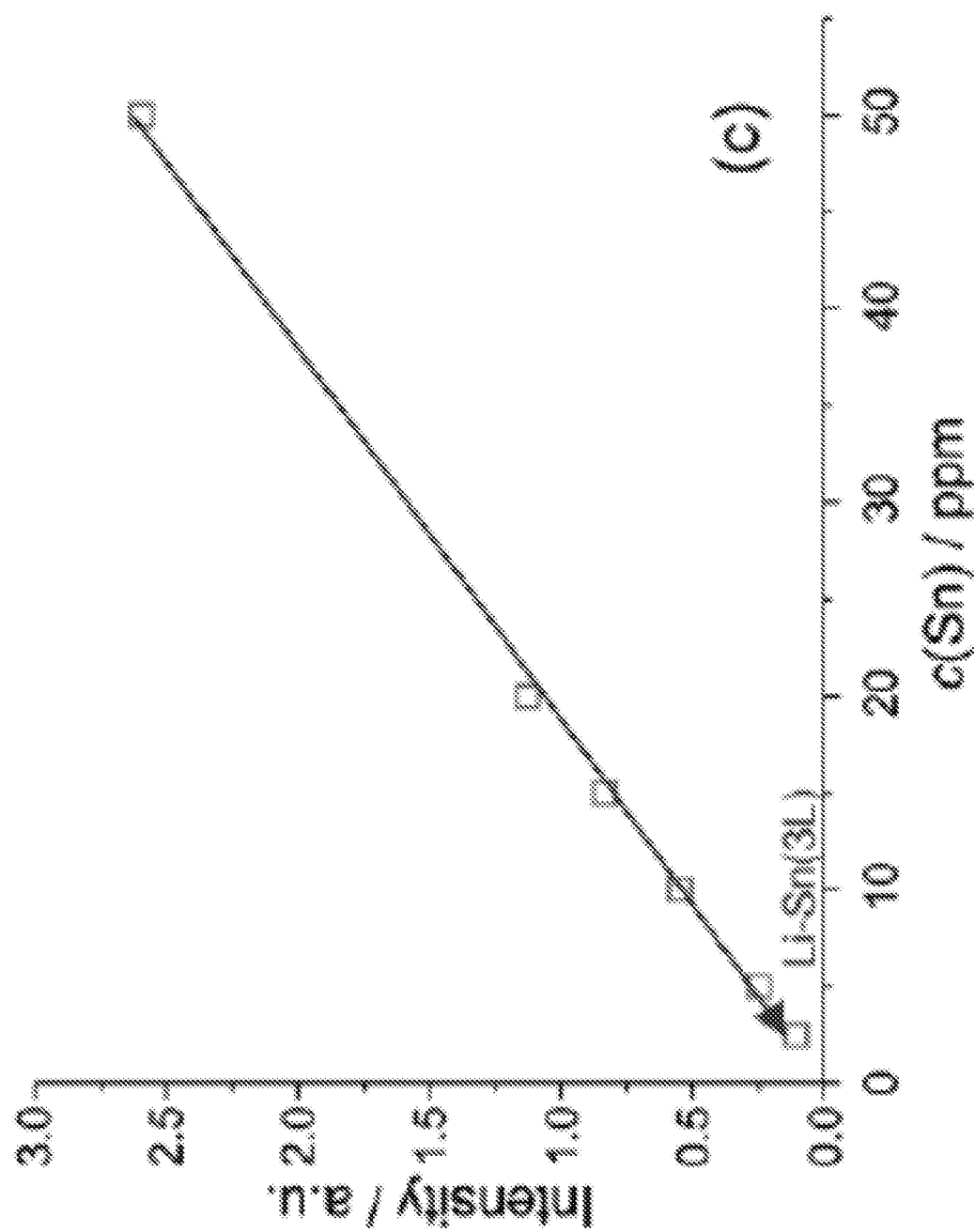
Figure 9A:
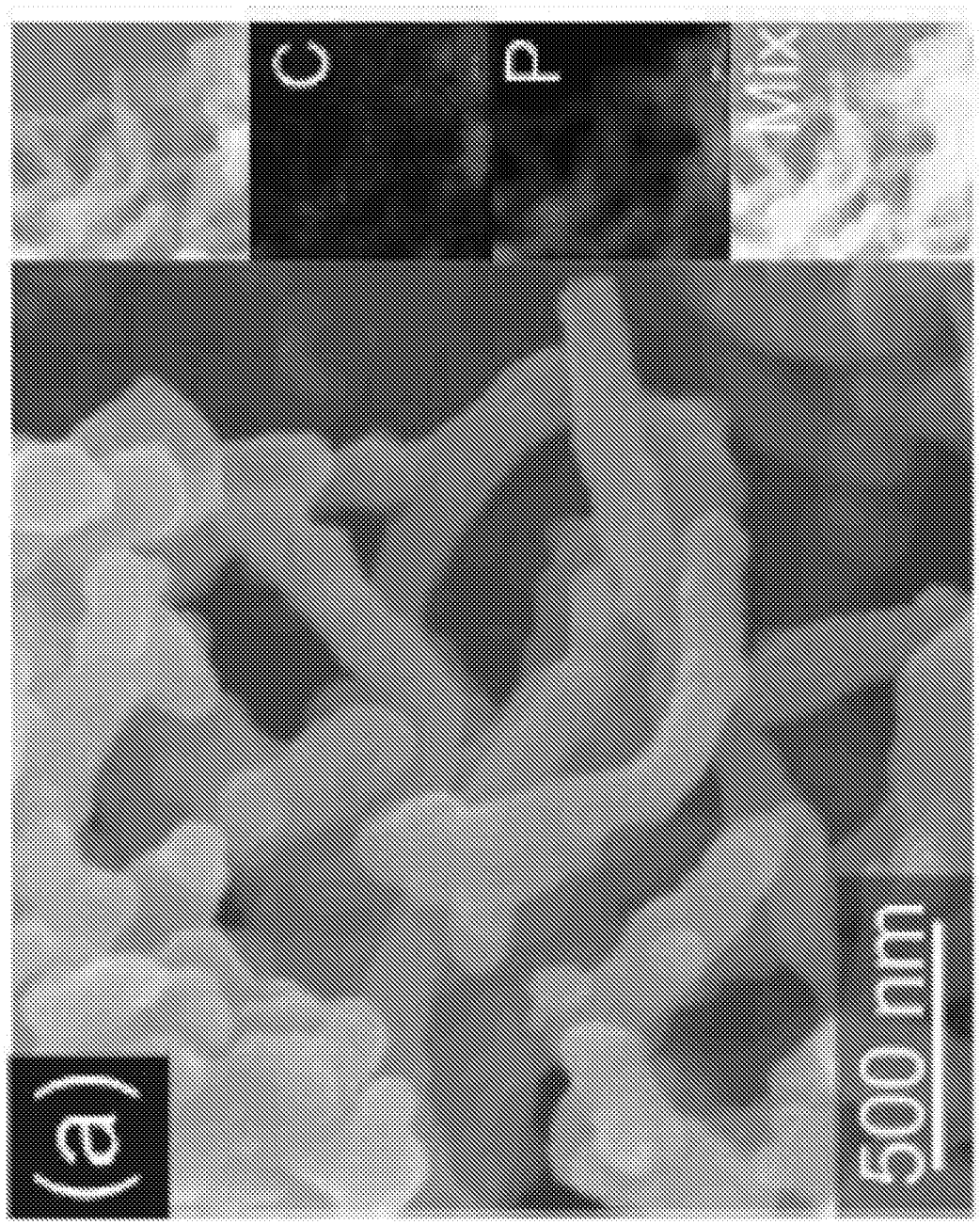
FIG. 9 is a series of SEM images showing P/C composite (FIG. 9A), pristine P/C electrode (FIG. 9B), prelithiated P/C electrode with 10 min treatment (FIG. 9C), Cu foil substrate (FIG. 9D), pristine Sn thin-film electrode (FIG. 9E) and prelithiated Sn thin-film electrode with 20 min treatment (FIG. 9F).
Figure 9B:
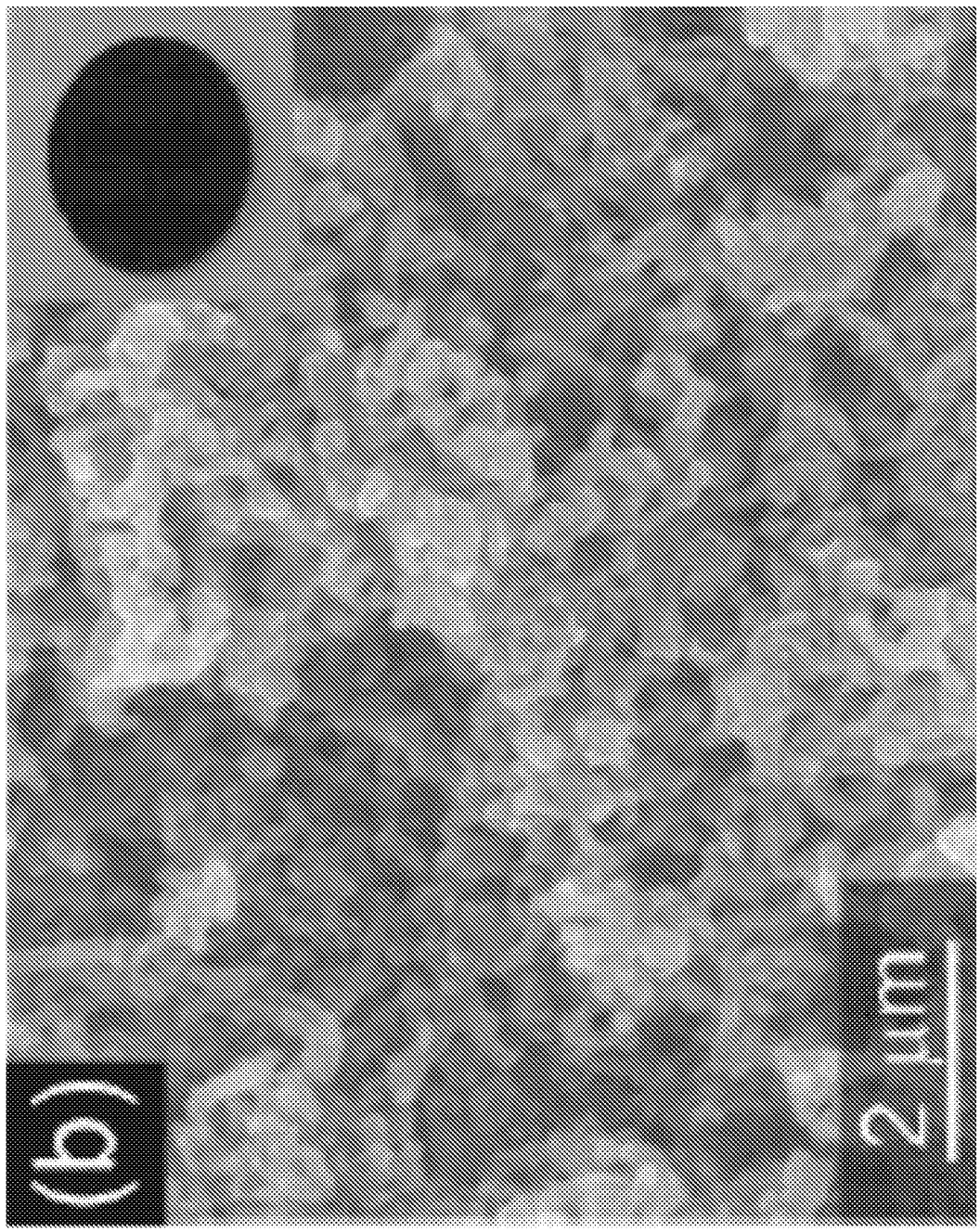
Figure 9C:
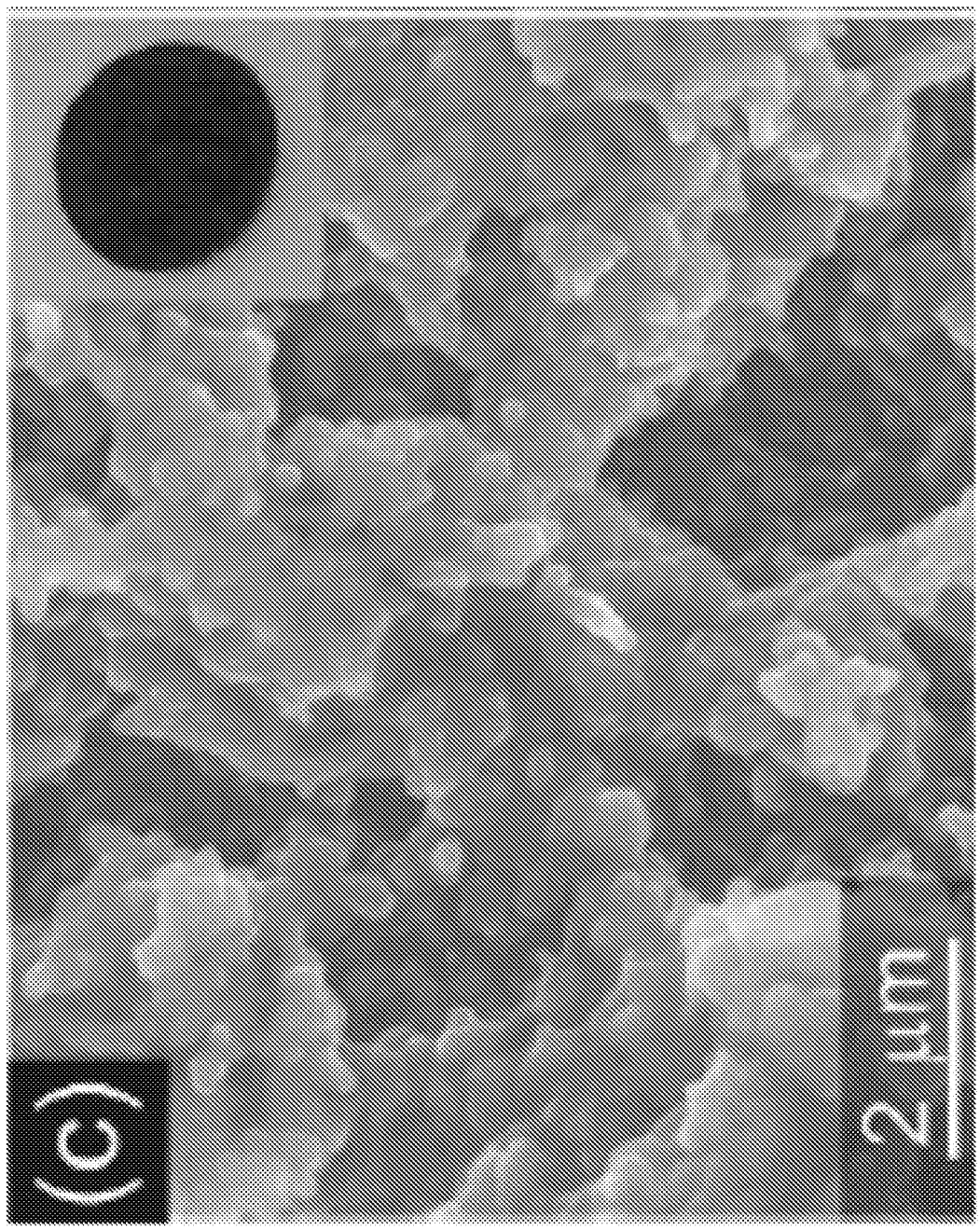
Figure 9D:
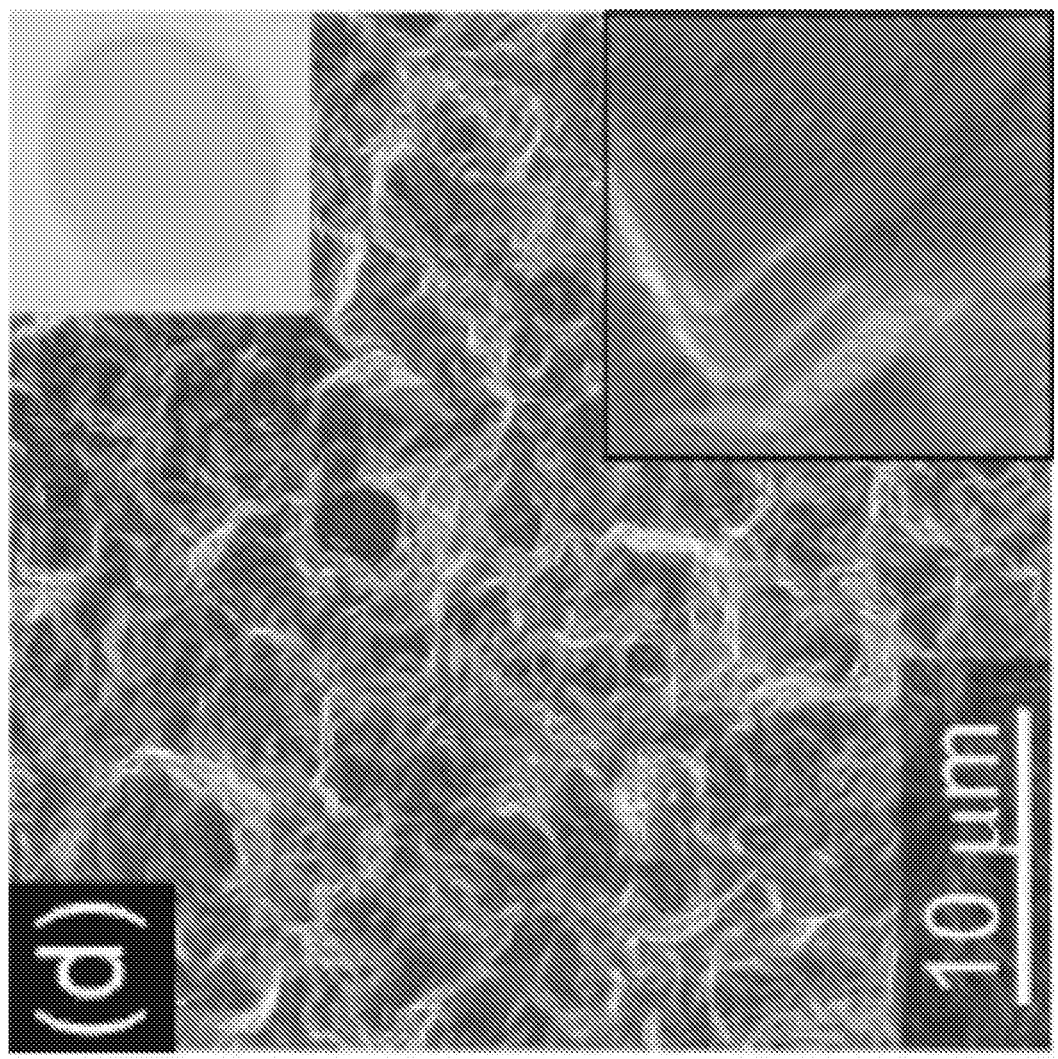
Figure 9E:
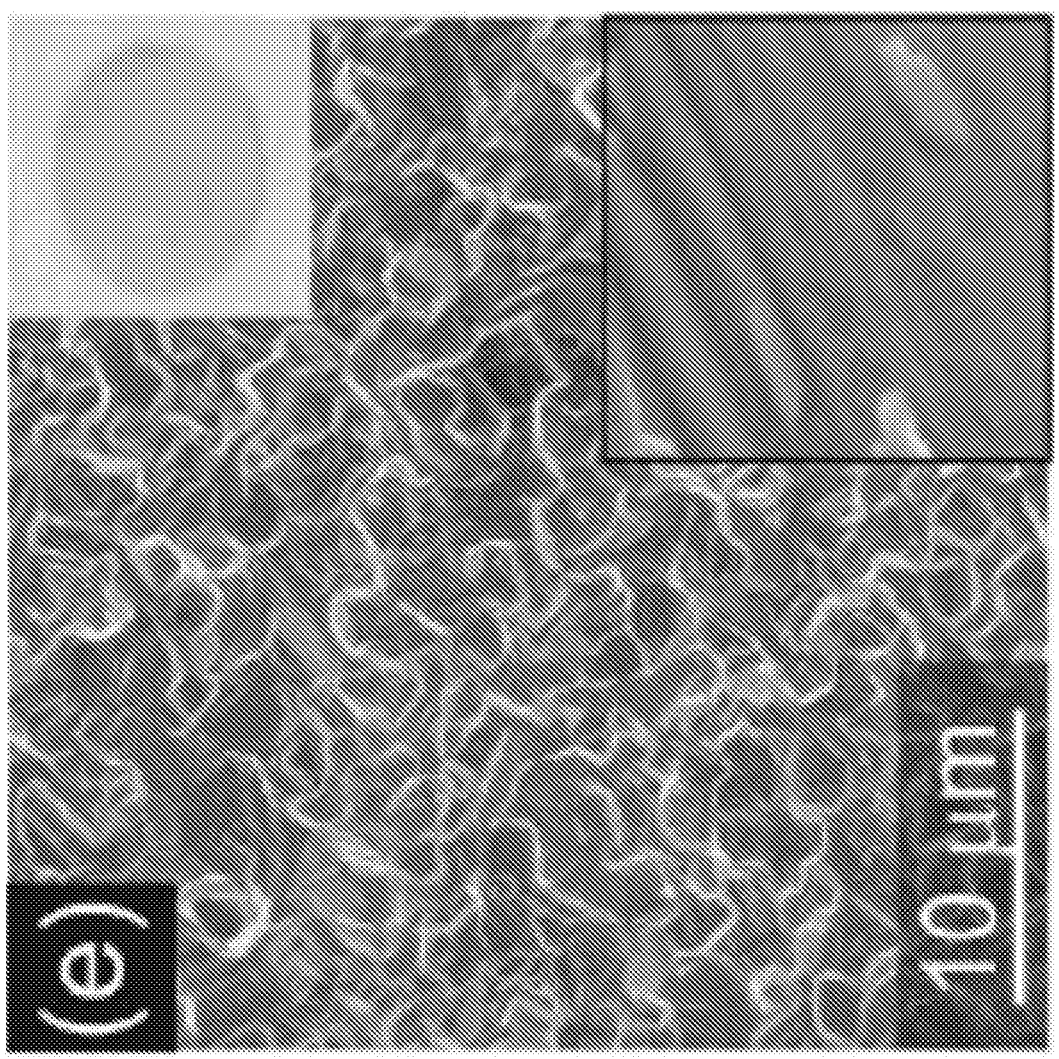
Figure 9F:
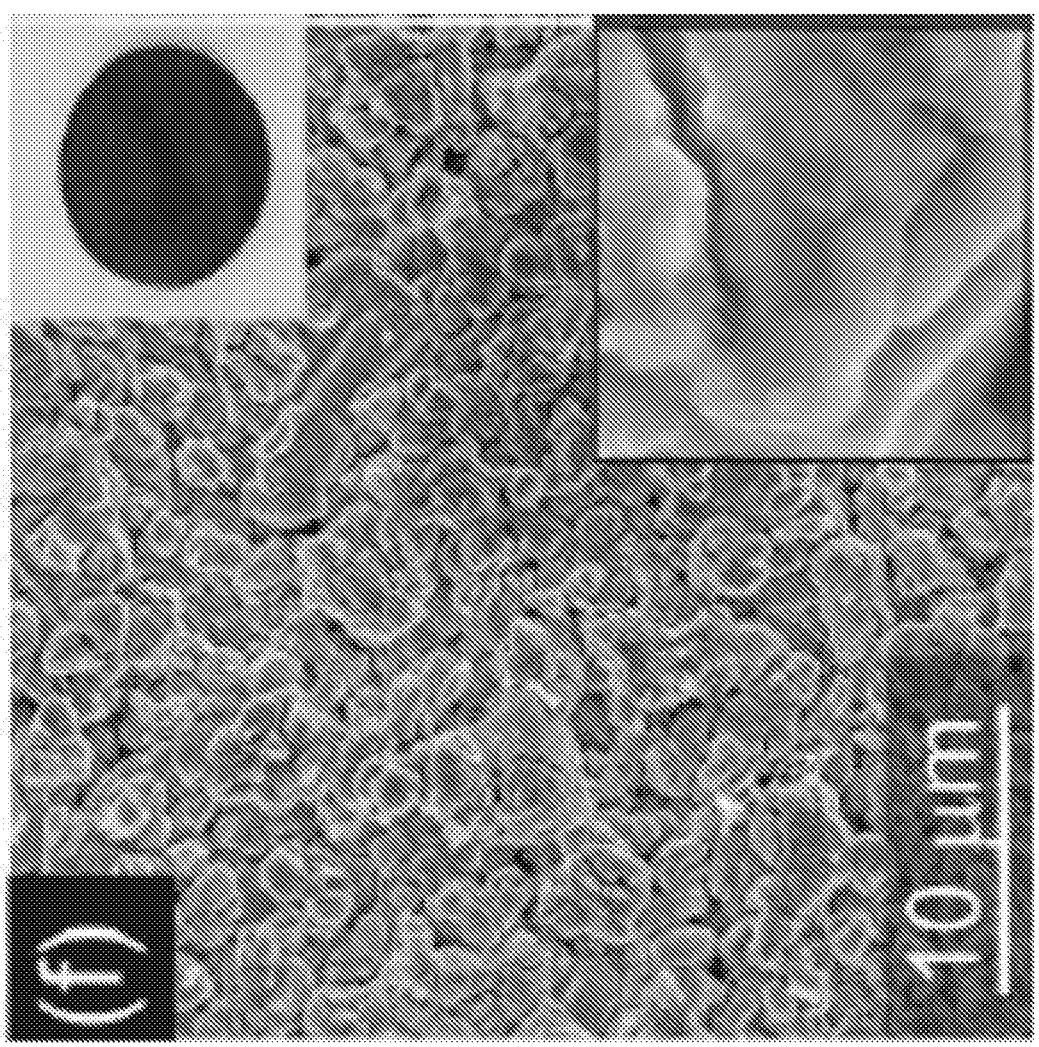

Prelithiation of Phosphorus and Tin: To verify the feasibility of the prelithiation method, red P and Sn powder samples were used as starting materials and were separately added into 1 M Li-Bp THF. After an overnight reaction, the initial dark-red P powder turns into an orange product (denoted as Li—P), and the initial light-gray Sn powder turns into a dim-gray product (denoted as Li—Sn, FIG. 2A). FIG. 2B gives the chemical compositions of Li—P and Li—Sn determined by ICP analysis (FIG. 8). The Li/P and Li/Sn atomic ratios are 3.5/1 and 3.9/1, respectively, close to the stoichiometric ratios of their fully lithiated products ($Li_3P$ and $Li_{22}Sn_5$). The X-ray diffraction (XRD) patterns of Li—P and Li—Sn are in good agreement with the standard data of $Li_3P$ and $Li_{22}Sn_5$, further confirming a full prelithiation after the treatment (FIG. 2C). The morphologies were characterized using scanning electron microscopy (FIG. 2D). Both red P and Li—P exhibit an aggregation state but have different appearances. The Sn particles have a smooth surface and clearly become rougher after prelithiation. Some Li—Sn particles even crack and crumble due to large volume expansion.

Figure 3A:
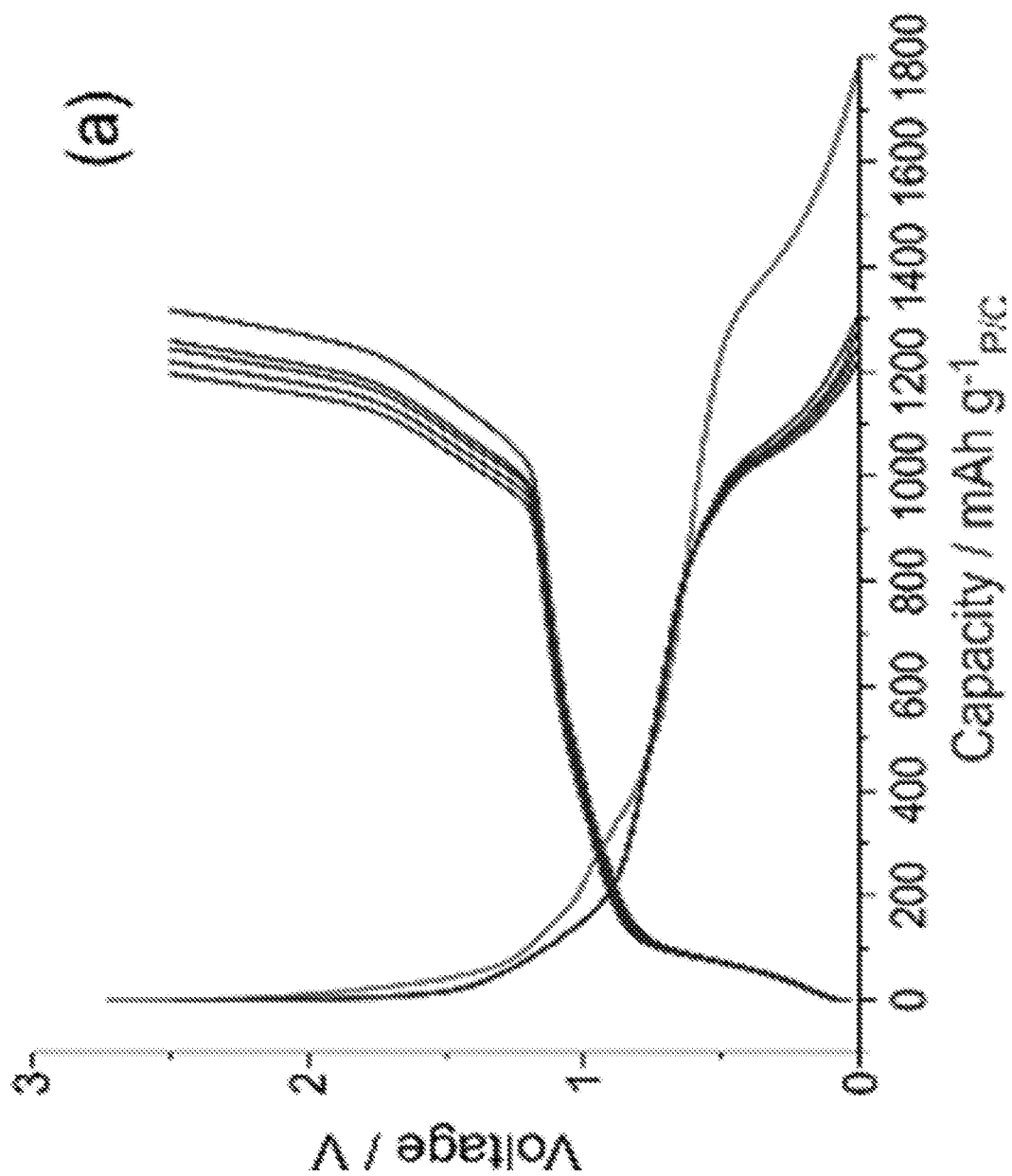
FIG. 3 is a series of plots showing electrochemical characterization of pristine and prelithiated P/C electrodes. Voltage profiles of pristine P/C electrode (FIG. 3A) and prelithiated P/C electrode with 10 min treatment (FIG. 3B). The red curves represent the initial segments. The first (FIG. 3C) and second (FIG. 3D) cycle voltage profiles of prelithiated P/C electrodes with different prelithiation durations. The capacities (FIG. 3E), initial coulumbic efficiency (CE) and degree of prelithiation (DOPL) (FIG. 3F) of pristine P/C and prelithiated P/C electrodes.
Figure 3B:
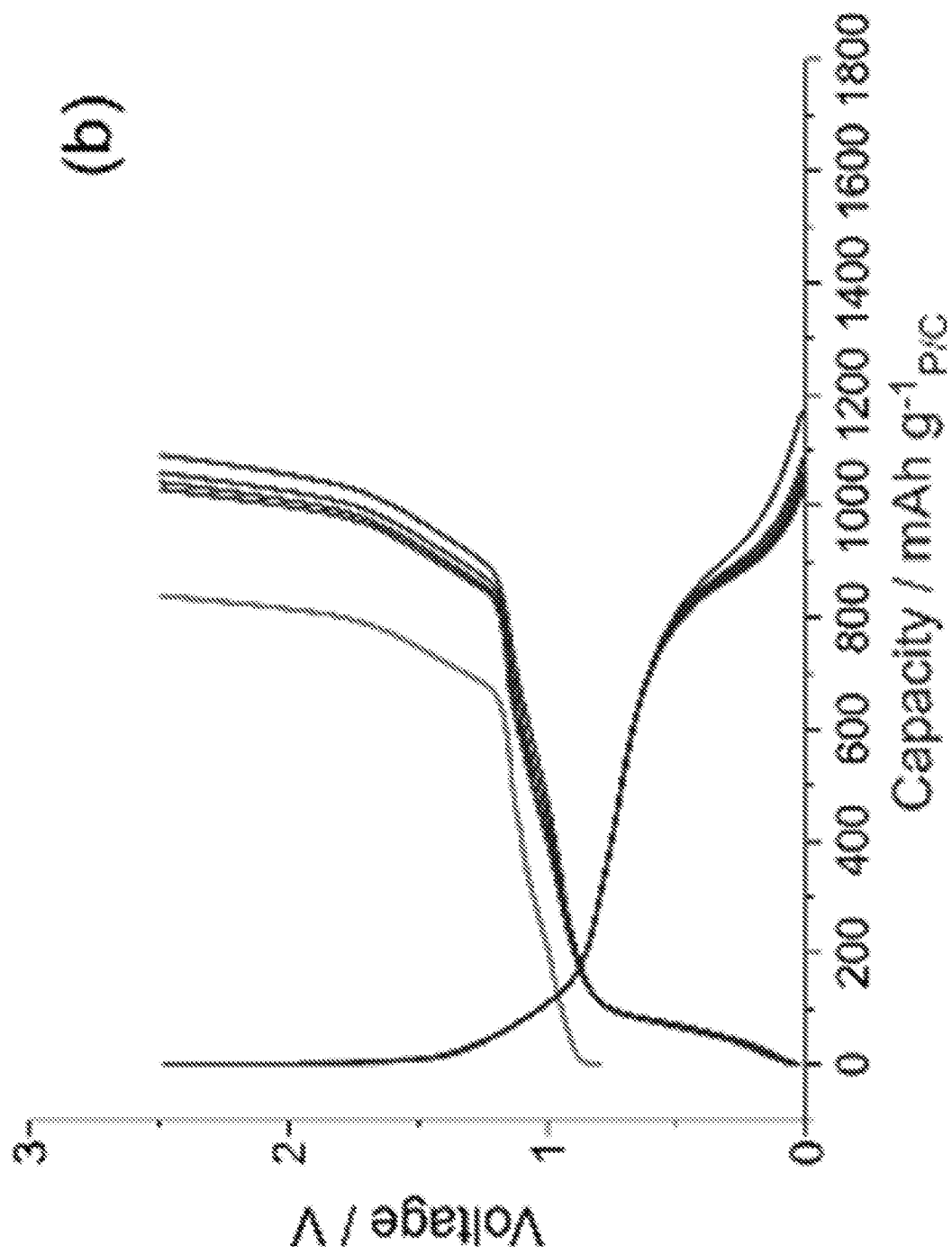
Figure 3C:
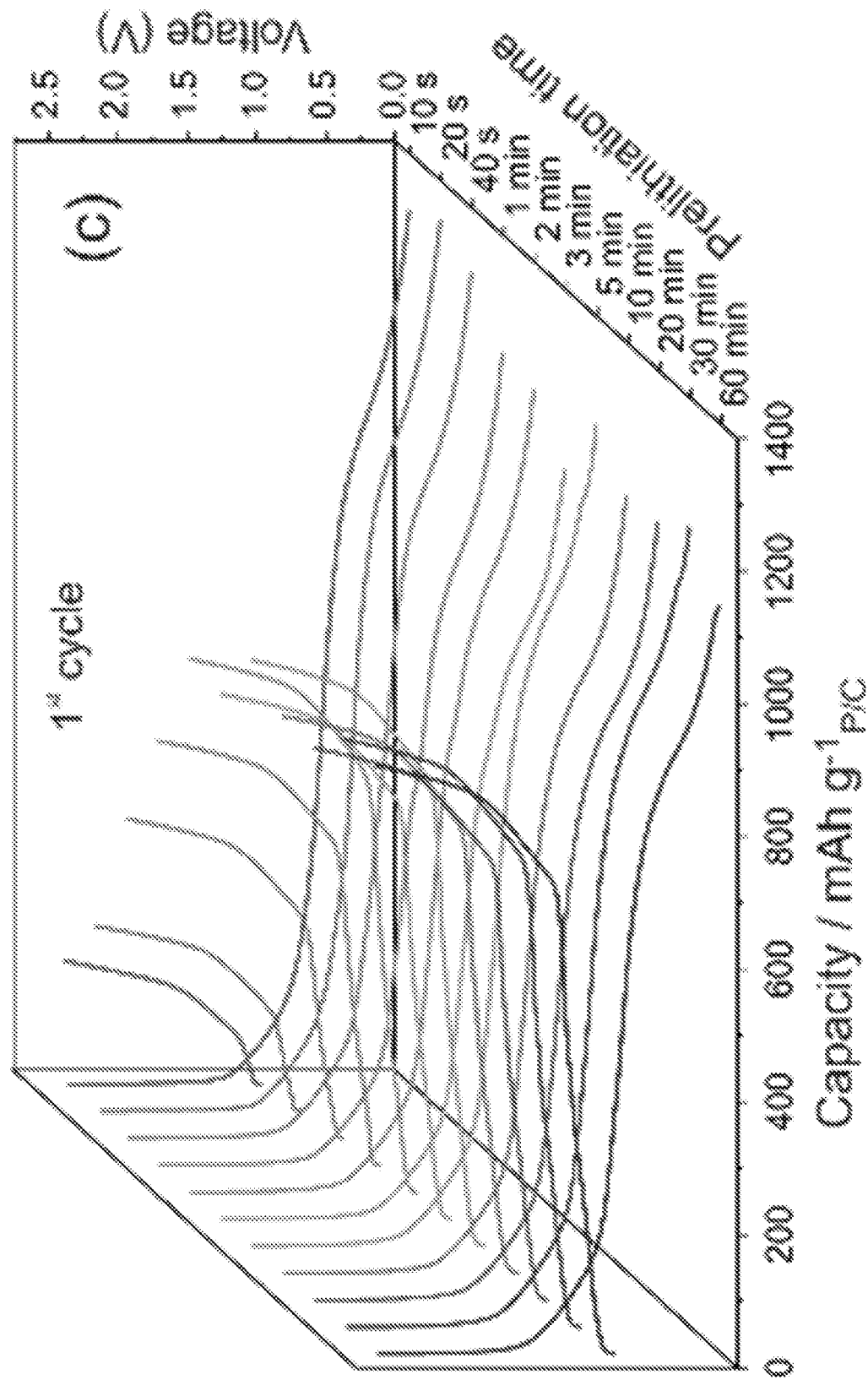
Figure 3D:
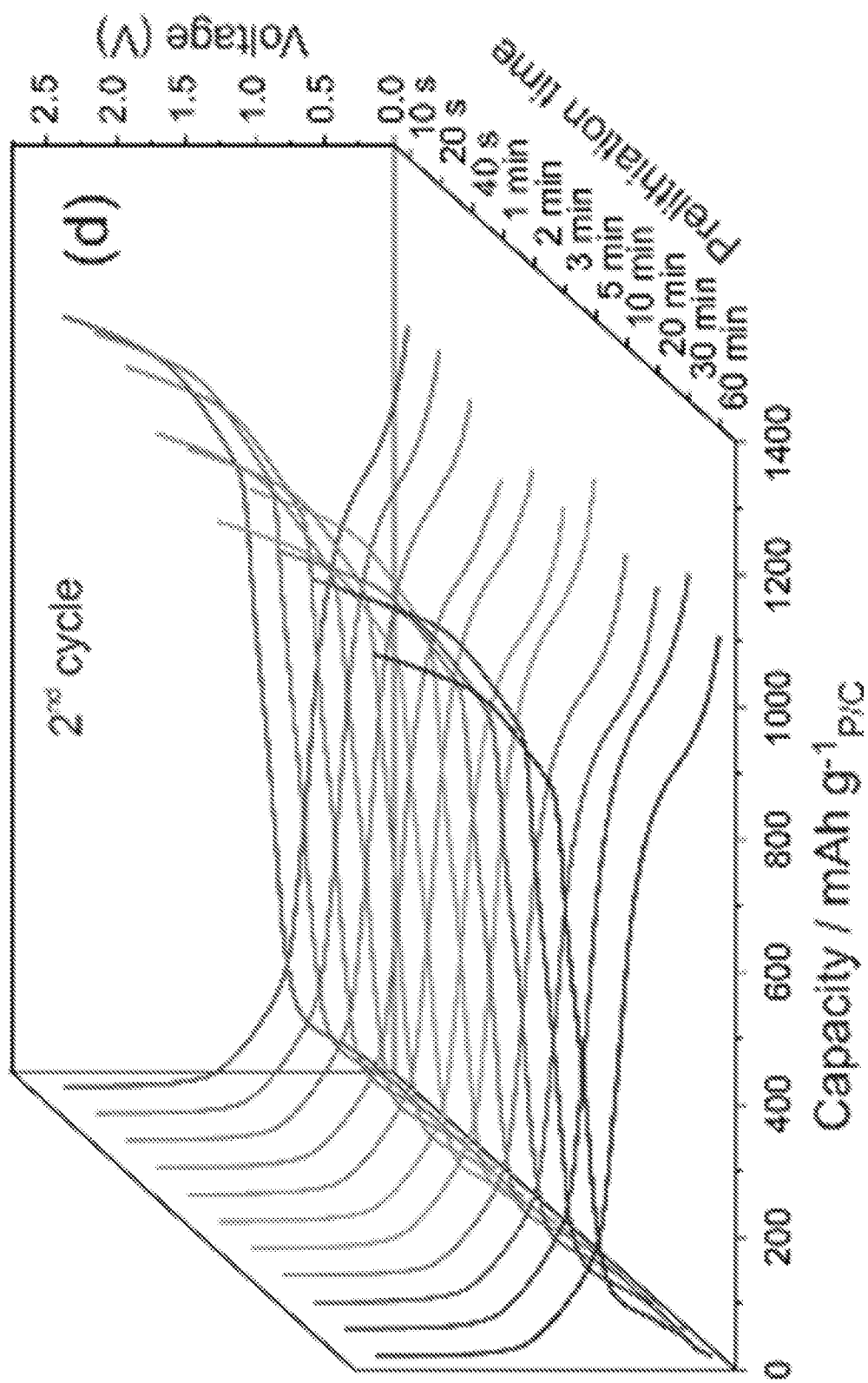
Figure 3E:
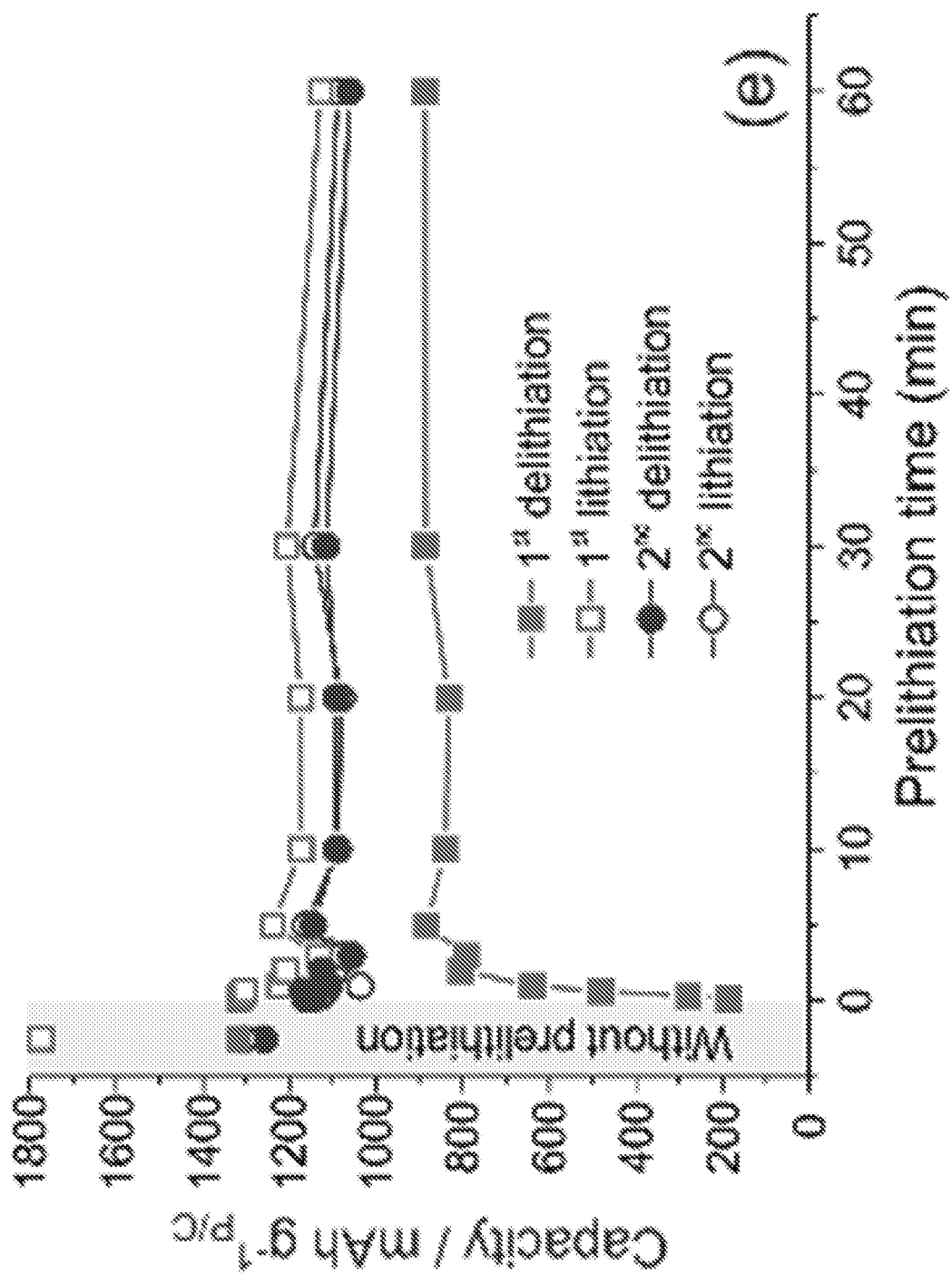
Figure 3F:
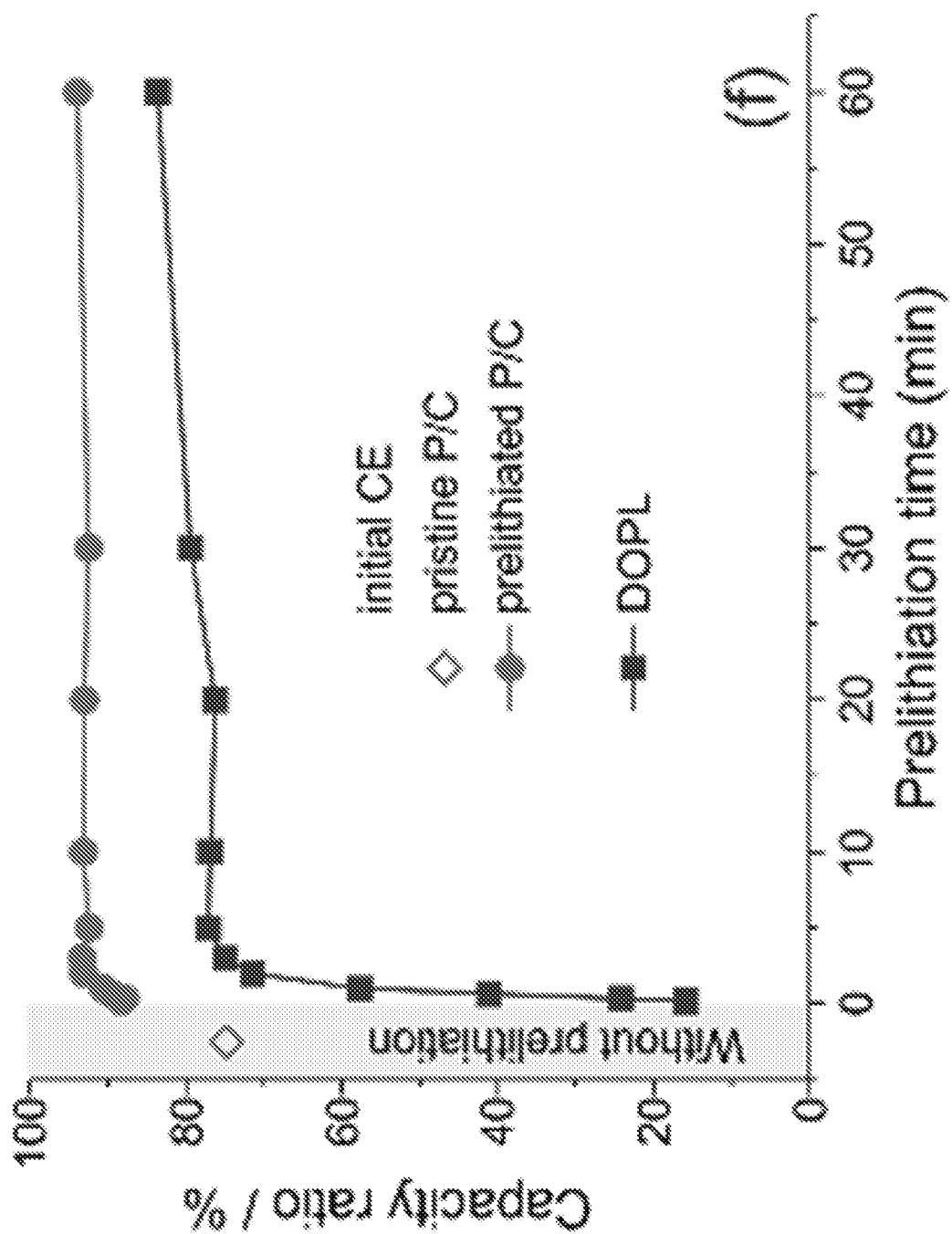
Figure 10A:
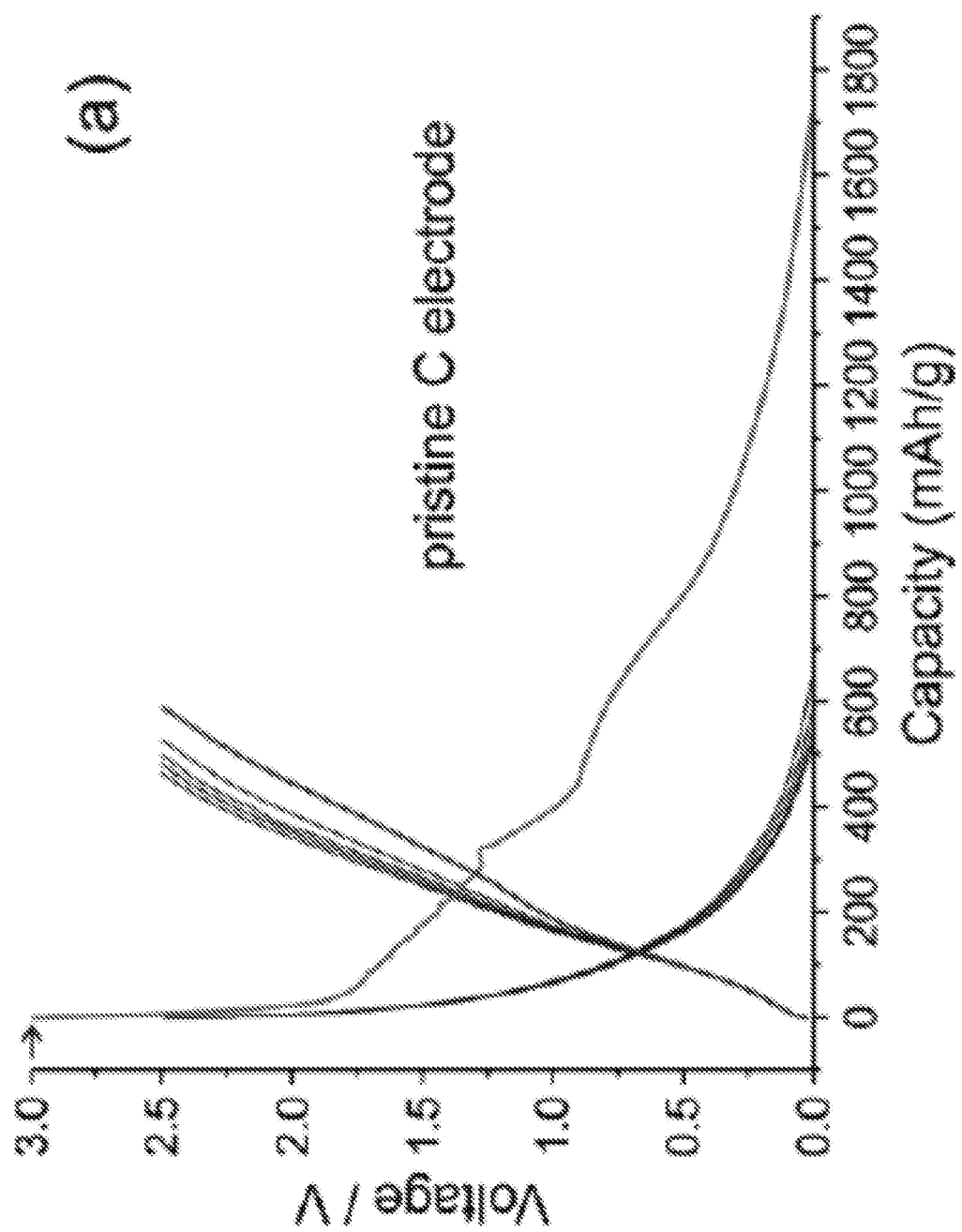
(FIG. 10A) the pristine C electrode.
Figure 10B:
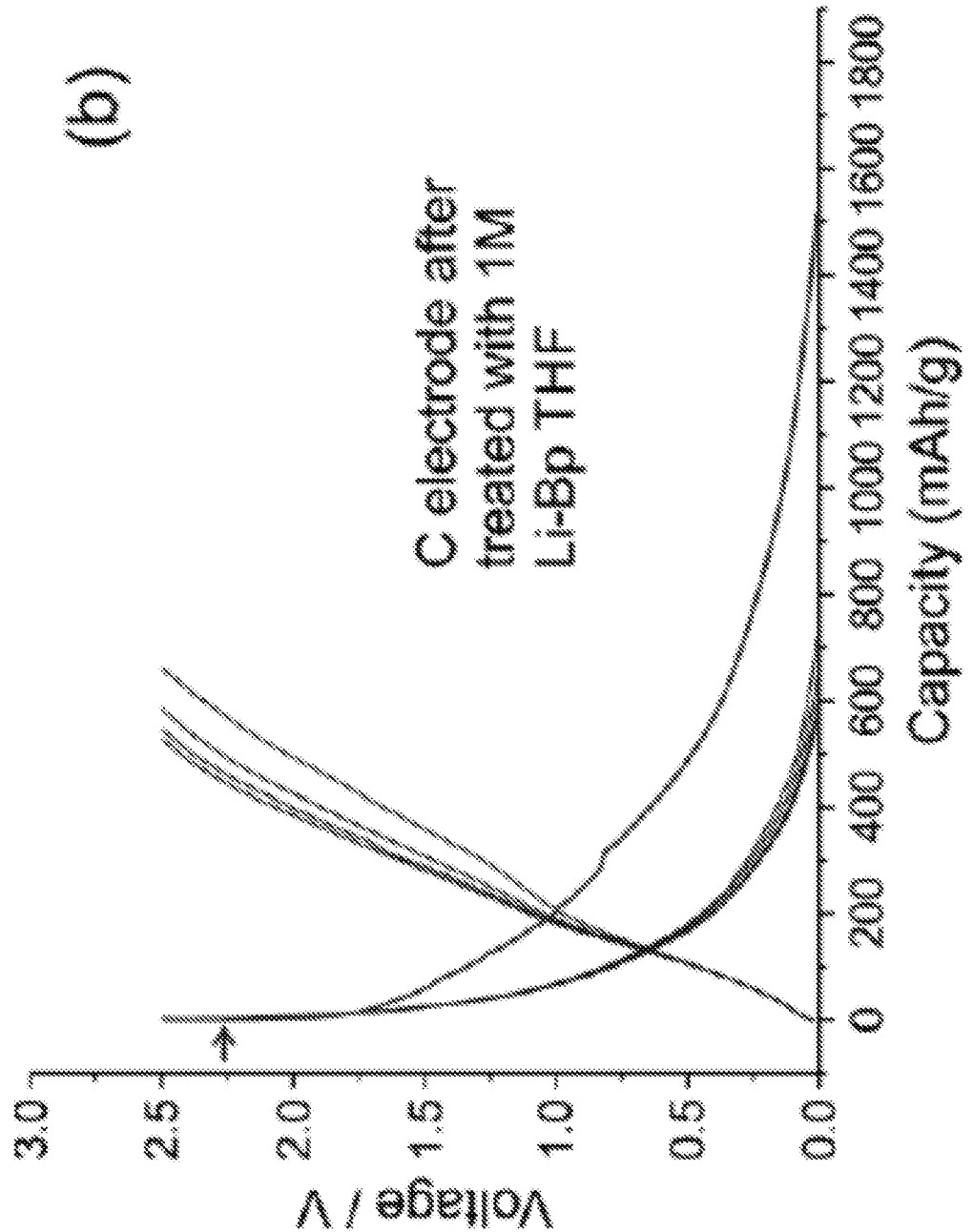
(FIG. 10B) the C electrode treated with 1 M Li-Bp THF for 10 min. The electrochemical performance was measured using a half cell with Li metal as the counter electrode. The electrolyte is 1 M $LiPF_6$ in EC/DEC (1:1 v/v, BASF) with 10 wt % fluoroethylene carbonate (FEC) and 2 wt % vinylene carbonate (VC).
Figure 11:
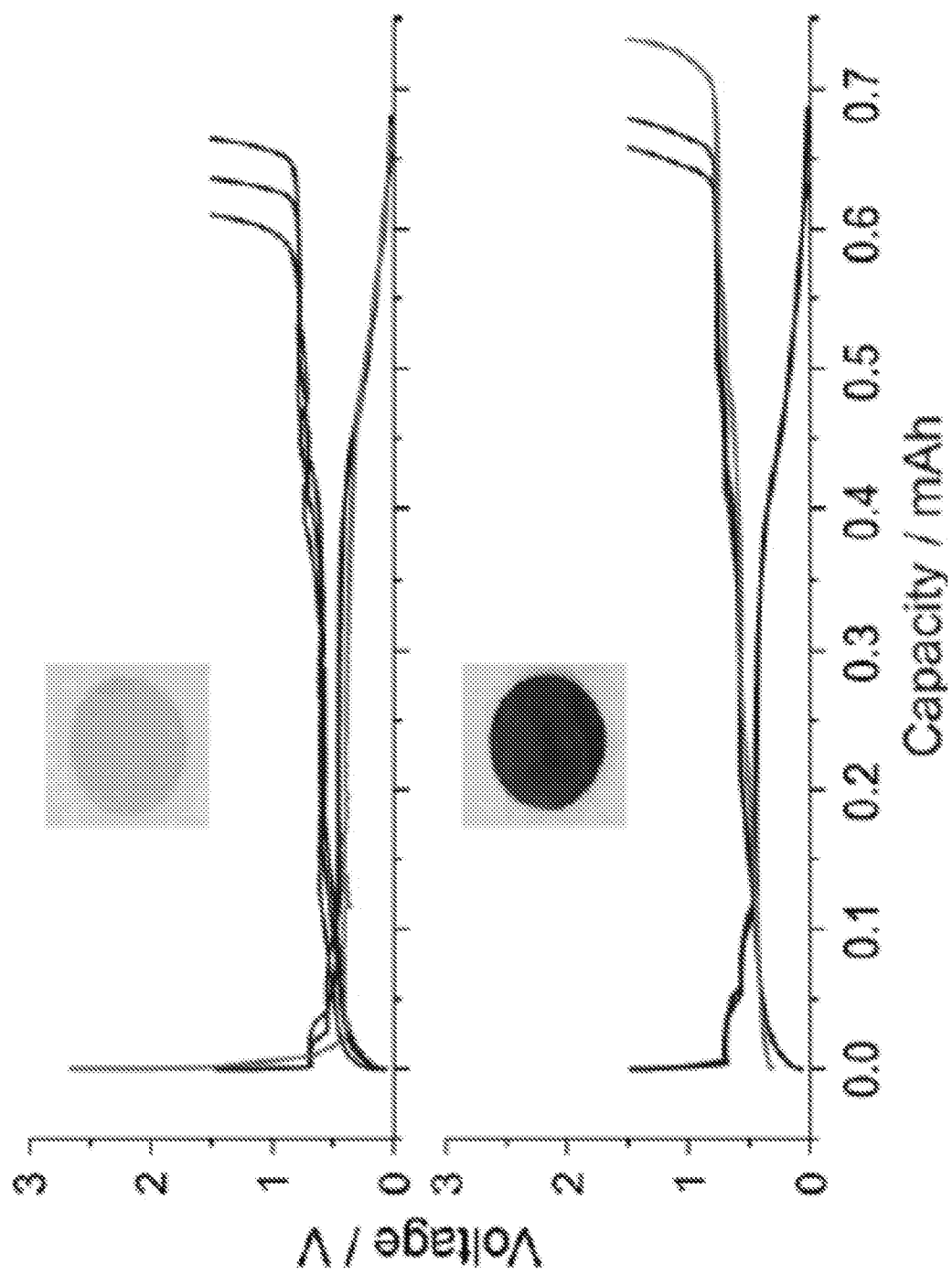
FIG. 11 is a set of voltage profiles of pristine (upper) and prelithiated (lower) Sn thin-film electrodes. Inserts are the digital images of corresponding electrodes. The red curves represent the initial segments.

To further confirm the prelithiation effect, the electrochemical behavior of pristine and prelithiated electrodes were compared under half-cell configurations. Red P was preloaded into a mesoporous carbon material (P/C) via a vaporization/adsorption strategy, and then coated on a carbon-coated copper foil to form the pristine P/C electrode. The pristine P/C electrode exhibits an initial open-circuit voltage (OCV) of ~2.9 V, an initial lithiation capacity of 1773 mAh $g^{-1}$(P/C), and subsequent reversible capacities of around 1200 mAh $g^{-1}$(P/C) (FIG. 3A). The irreversible capacity loss at first lithiation results from SET layer formation. The prelithiated P/C electrodes were obtained by immersing the pristine P/C electrode into 1 M Li-Bp THF for various treatment times (FIG. 9). FIG. 3B shows a typical voltage profile of the prelithiated P/C electrode. It exhibits an initial OCV of ~0.8 V. As the prelithiated P/C electrode is in Li-rich state, it begins Li-extraction with an initial delithiation capacity of 840 mAh $g^{-1}$(P/C) and similarly subsequent reversible capacities of around 1200 mAh $g^{-1}$(P/C). The increased reversible capacity after the first delithiation can be attributed to the contribution of the carbon materials (mesoporous carbon and Super C65) in the electrode (FIG. 10). Since the redox potential of Bp/Li-Bp is higher than the electrochemical lithiation potential of carbon materials (FIG. 1), the carbon materials cannot be prelithiated by Li-Bp but can undergo repeated lithiation/delithiation under cycling conditions. FIG. 3C & FIG. 3D separately show the first and second cycle voltage profiles of a prelithiated P/C electrode with various treatment times. The corresponding capacities are summarized in FIG. 3E, in comparison with that of pristine P/C electrode. The prelithiated P/C electrodes exhibit a much higher initial CE (~95%) than that of the pristine P/C electrode (75%) (FIG. 3F), suggesting that a stable SEI layer is formed during the prelithiation. The DOPL for prelithiated NEs can be expressed as the ratio of the first/second delithiation capacities. The DOPL increases with prolonging the treatment time and a maximal DOPL (~80% reversible capacity for P/C) is reached after ~5 min (FIG. 3F), indicating a delicate control of DOPL as well as a high efficiency for this prelithiation method. The rest of ~20% unprelithiated reversible capacity comes from the contribution of carbon materials as discussed above. Similarly, the electrochemical behaviors of pristine and prelithiated Sn electrodes were also compared. A Sn thin-film electrode was prepared via electroless-plating (FIG. 9). After prelithiation, the color of Sn electrode changes from light-gray to dim-gray (FIG. 11 inserts). The OCV for pristine and prelithiated Sn electrodes are ~2.7 V and ~0.28 V, respectively. The pristine Sn electrode displays an initial lithiation capacity of 0.67 mAh and the prelithiated Sn electrode displays an initial delithiation capacity of 0.73 mAh (FIG. 11). These results demonstrate effective prelithiation of P and Sn based NEs.

Figure 1:
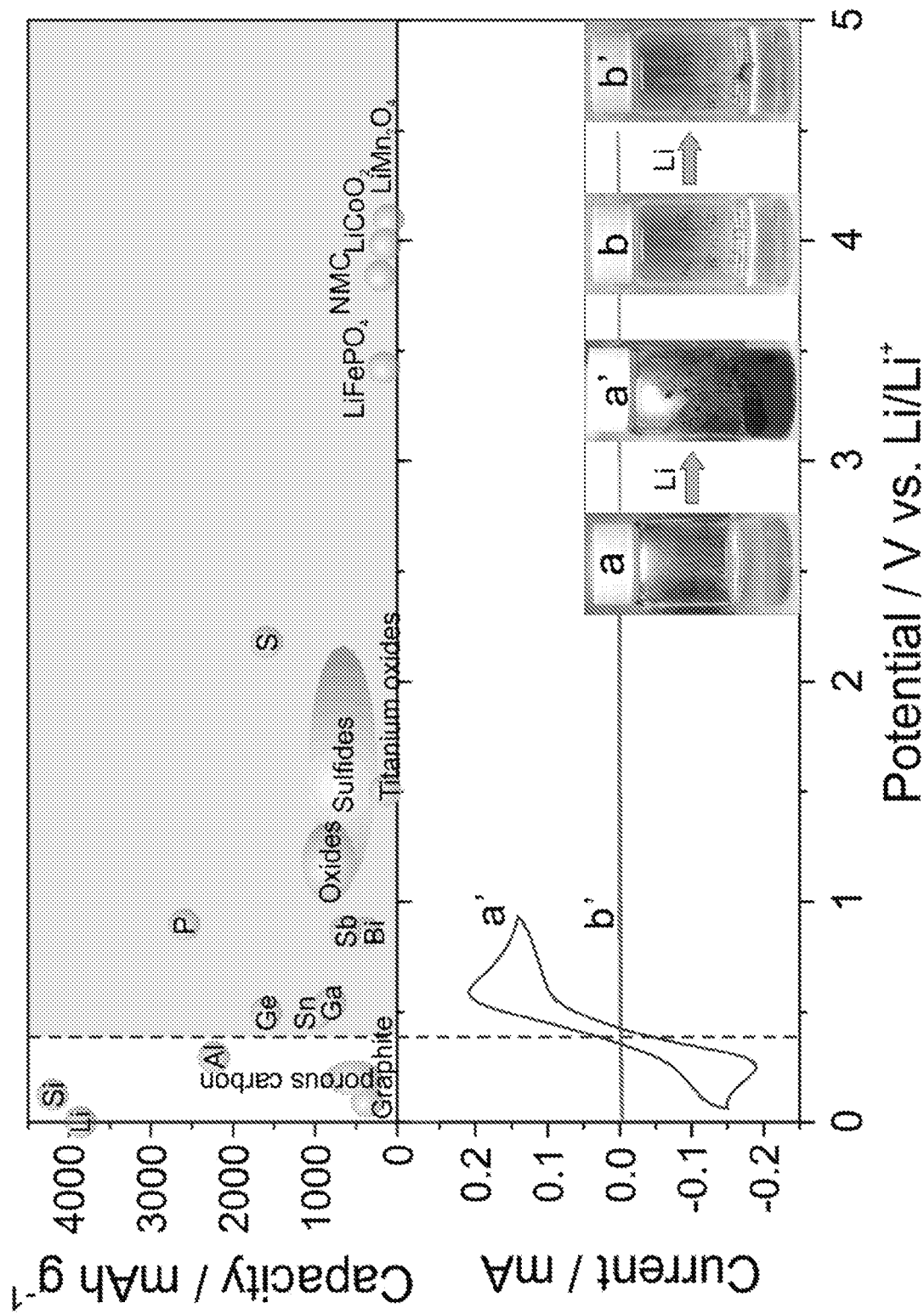
FIG. 1 is a plot showing capacities and potentials of various active materials for LIBs (upper). Cyclic voltammograms in ether-based (a') and carbonate-based (b') electrolytes at a scan rate of 20 mV/s (lower). (a) 0.1 M biphenyl (Bp) and 1 M $LiPF_6$ in dimethoxyethane (DME), (b) 0.1 M Bp and 1 M $LiPF_6$ in ethylene carbonate (EC)/diethyl carbonate (DEC) (1:1 v/v). (a') and (b') are the resulting solutions after reacting with Li metal. Active materials in shaded area could be prelithiated by using the disclosed methods.
Figure 4A:
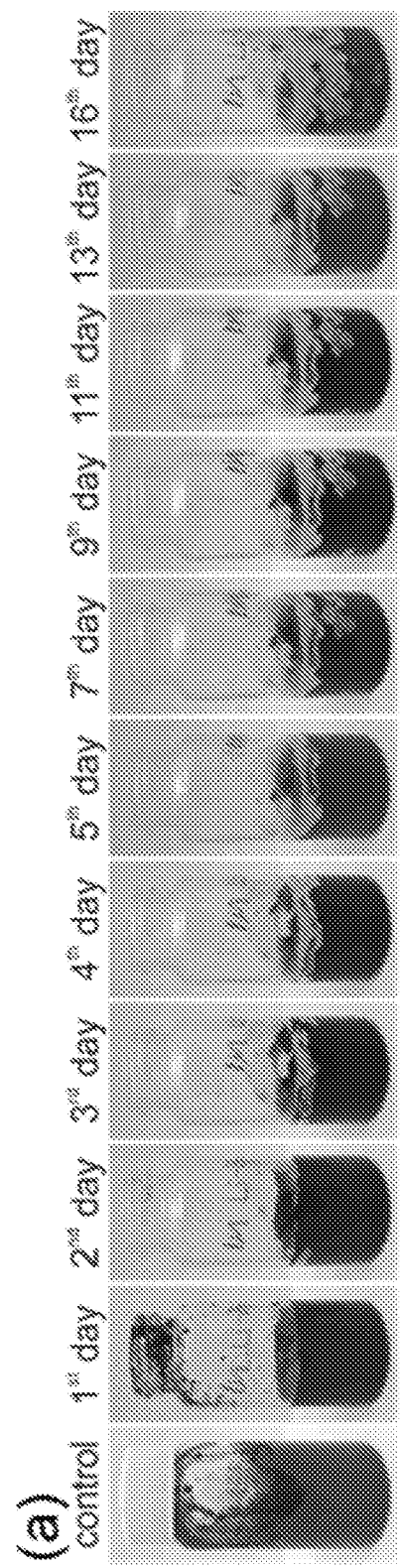
(FIG. 4A) Digital images of 1 M Li-Bp tetrahydrofuran (THF) exposed to ambient air for different durations.
Figure 4B:
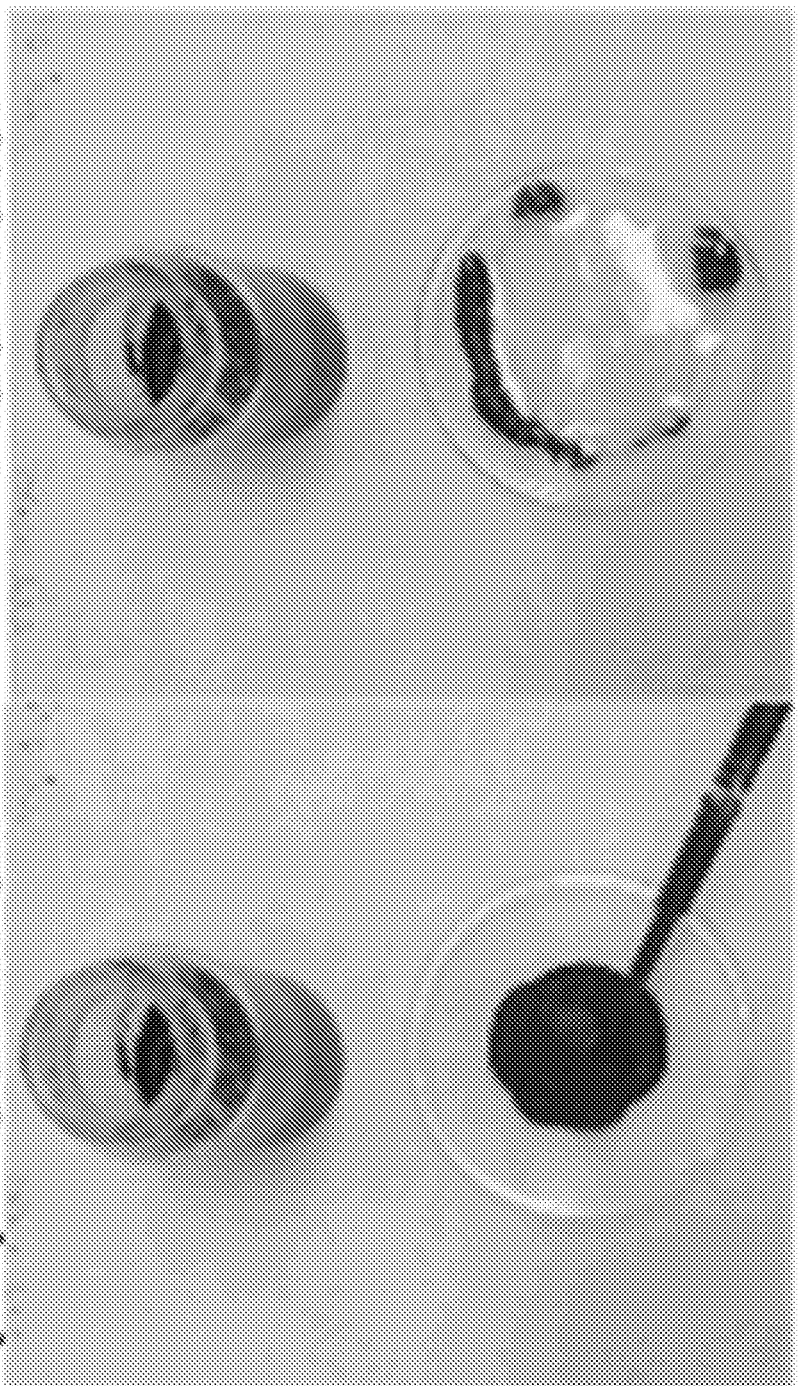
(FIG. 4B) Snapshots of the 1 M Li-Bp THF under stirring in ambient air or after adding water.
Figure 4C:
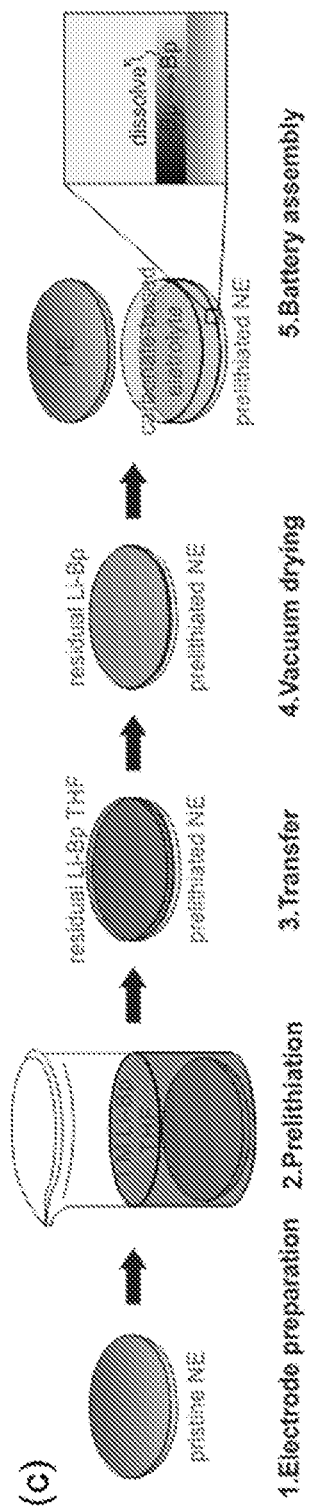
(FIG. 4C) Schematic of a prelithiation process in ambient air.
Figure 4D:
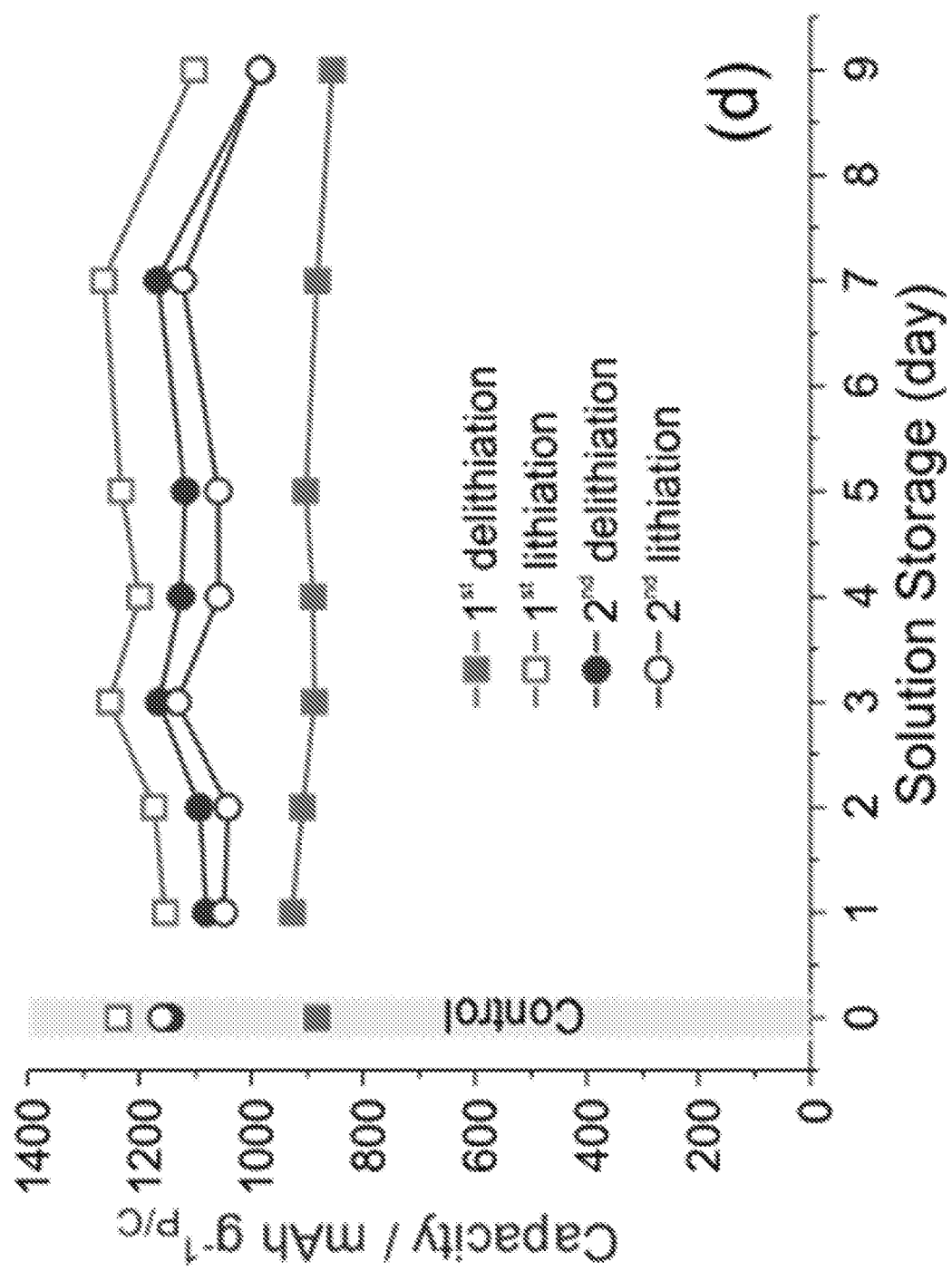
(FIG. 4D) The capacities of prelithiated P/C electrodes prepared by using 1 M Li-Bp THF with different exposure time as shown in (FIG. 4A).
Figure 4E:
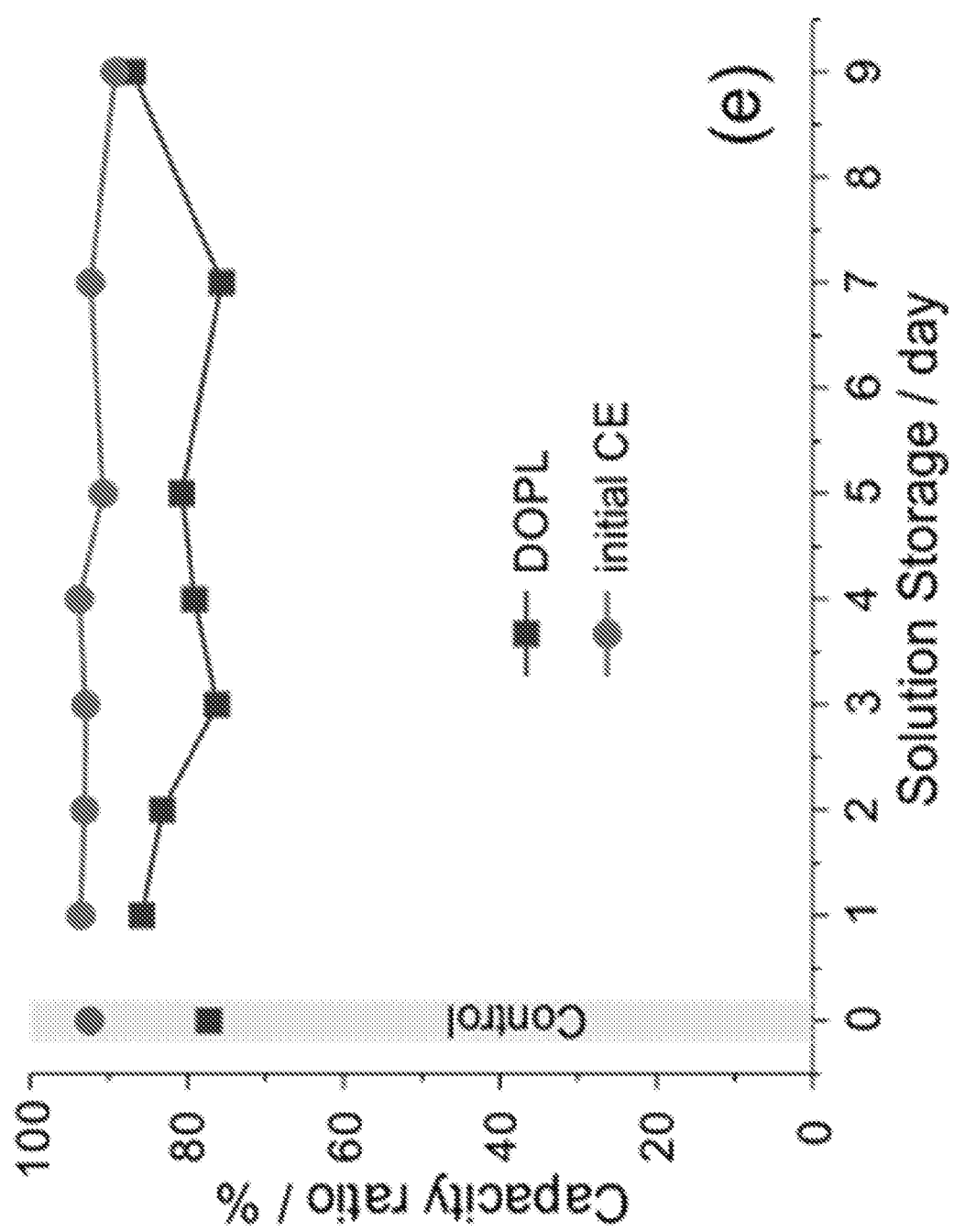
(FIG. 4E) The corresponding DOPL and initial CE.
Figure 12:
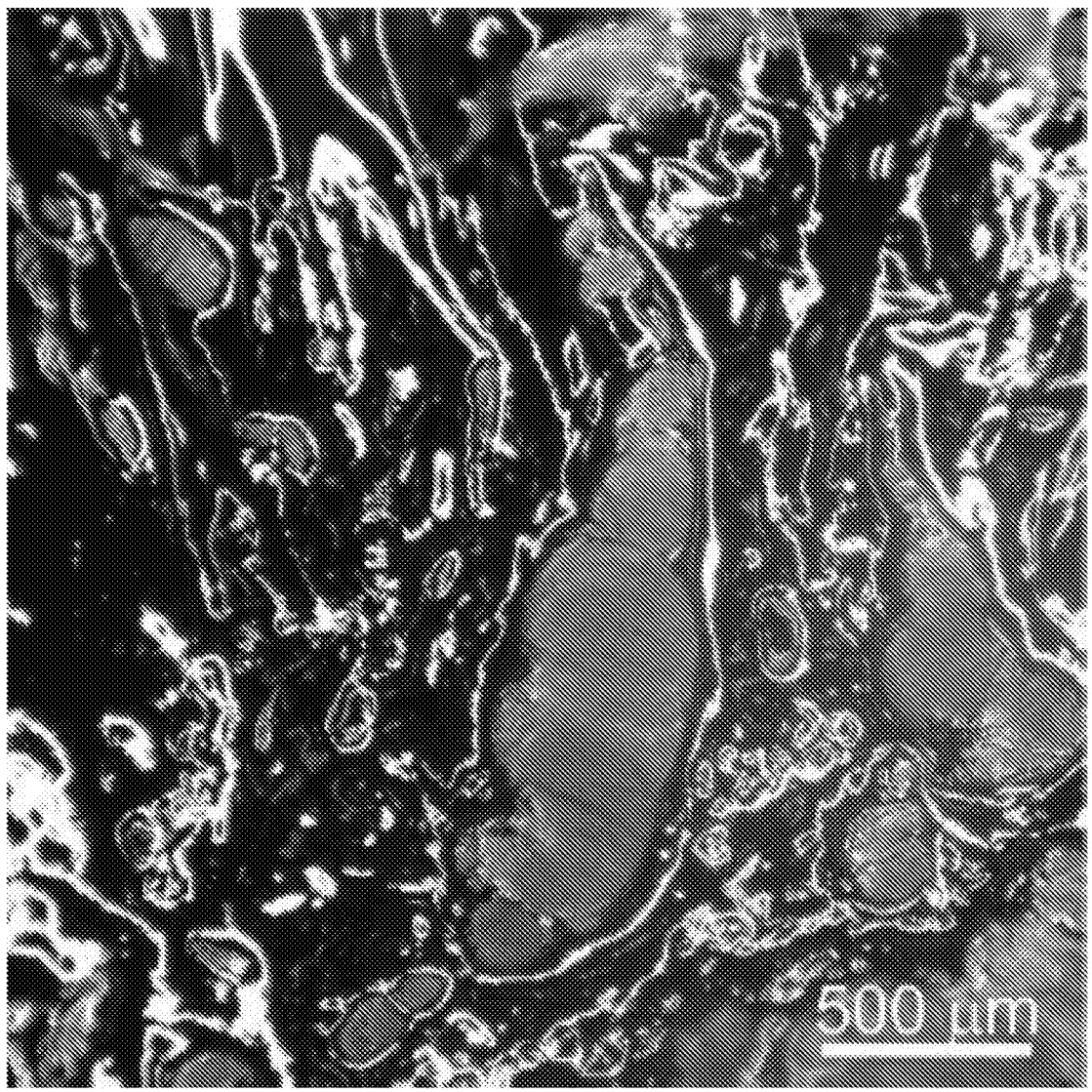
FIG. 12 is a microscope image of a protective film formed on the surface of 1 M Li-Bp THF solution in ambient air.
Figure 13A:
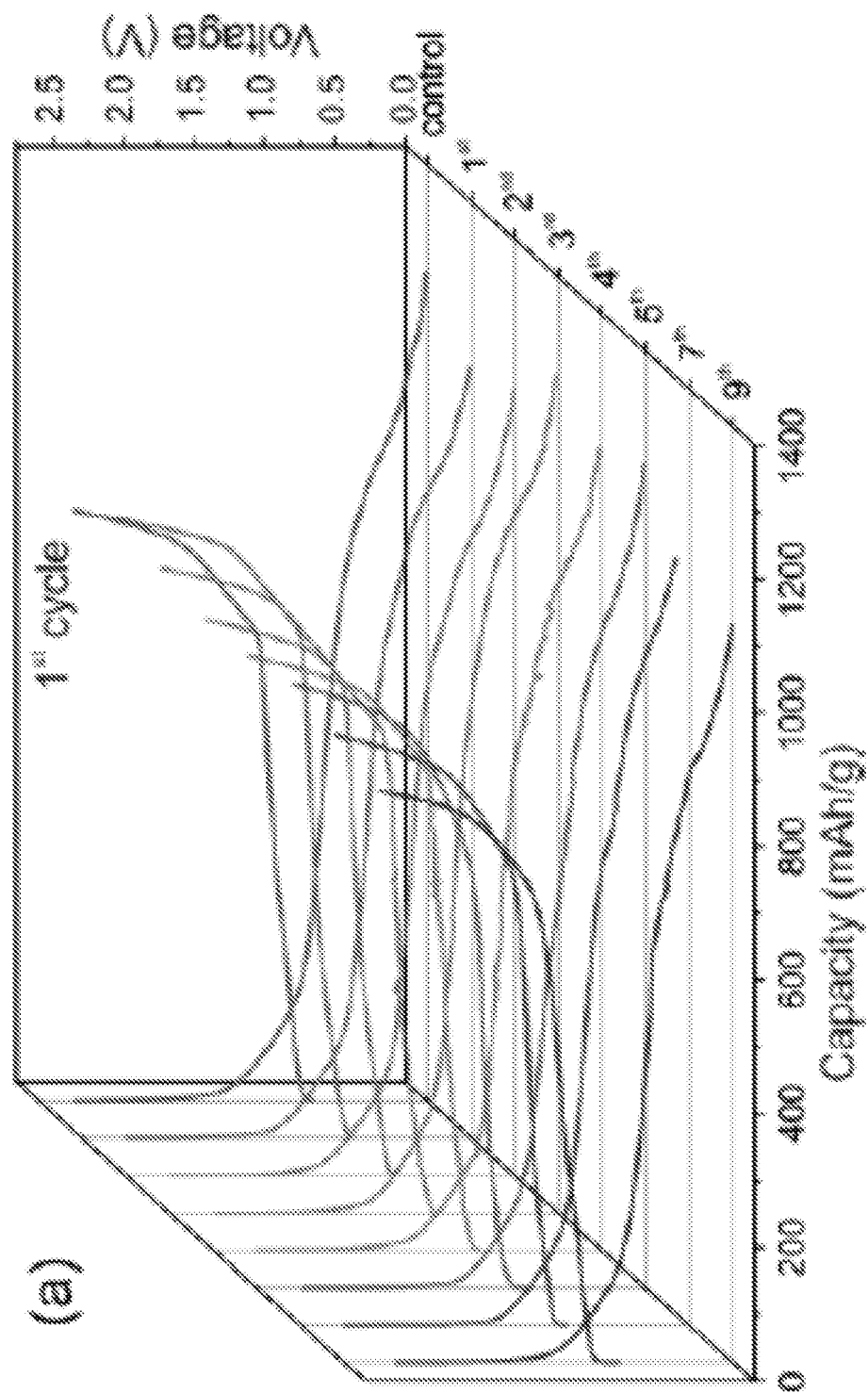
FIG. 13 is a set of plots showing voltage profiles (FIG. 13A—$1^{st}$ cycle.
FIG. 13B—$2^{nd}$ cycle) of prelithiated P/C electrodes prepared using a prelithation reagent exposed in ambient condition for 1 to 9 days. Current density: 0.1 A/g.
Figure 13B:
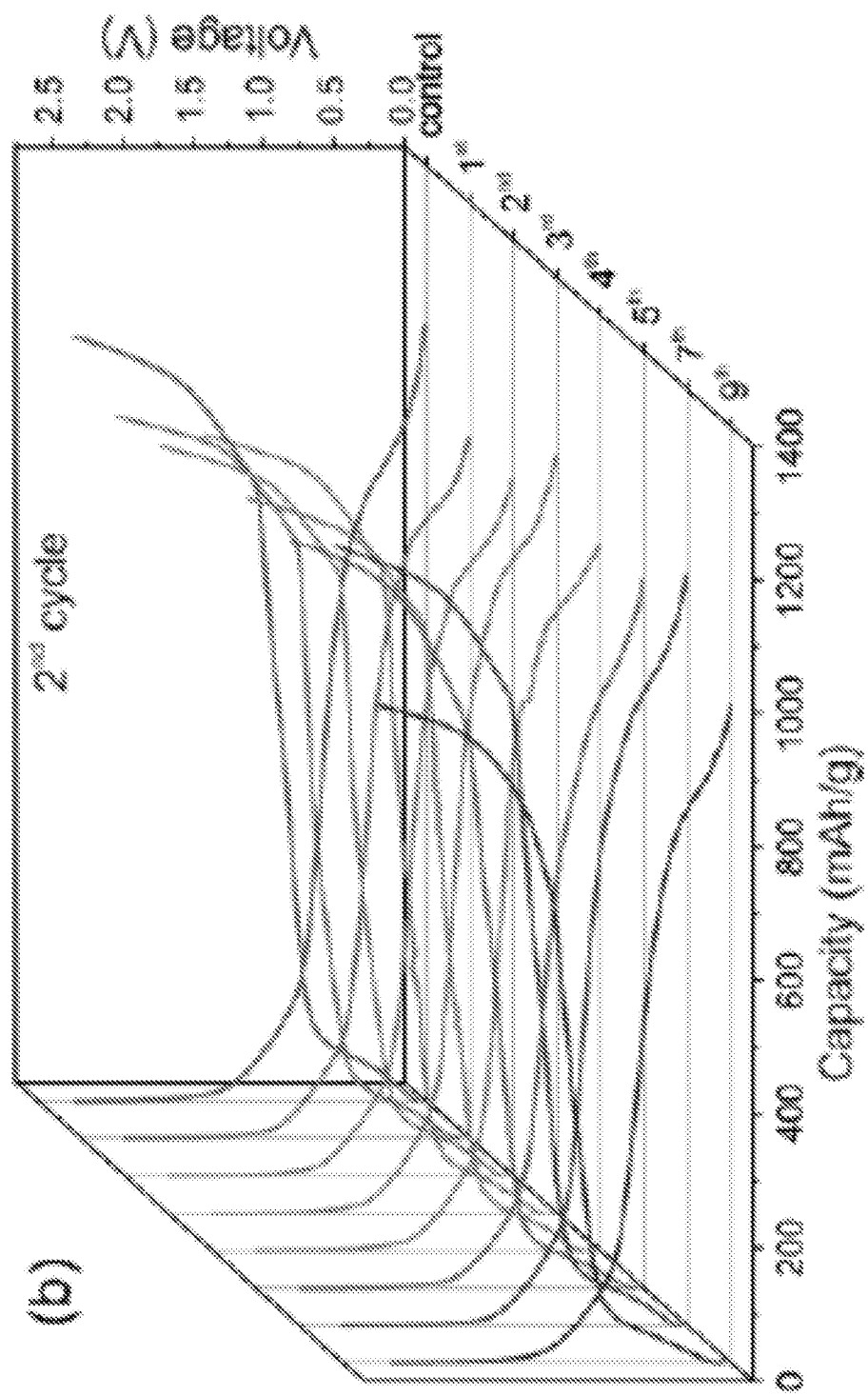

Prelithiation in Ambient Air: The prelithiation in ambient air is desirable but very challenging due to the high reactivity of the prelithiation reagents and prelithiated NE products. The dilute Li-Bp THF (10 mM) will quickly change from dark-green to colorlessness once expose to ambient air. However, an unexpected finding was that the concentrated Li-Bp THF (1 M) can be stored in ambient air for over two weeks and can even withstand repeated stirring (FIG. 4A & FIG. 4B). Whereas, pure THF solvent with same volume will completely evaporate after just a few hours. Such phenomenon could be attributed to a visible protective film formed on the liquid surface (FIG. 12), which not only prevents further reaction of Li-Bp with oxygen or moisture but also retards THF evaporation. Besides, the reaction of Li-Bp THF (1 M) with water is more milder than that of Li metal (FIG. 4B), reducing operational risk. These features make concentrated Li-Bp THF (1 M) a qualified prelithiation reagent in ambient air. Nevertheless, the subsequent washing, which is to remove the residual Li-Bp, could expose the high-reactive prelithiated NE to ambient air and cause a loss of the preloaded active Li. Bp can readily dissolve in the electrolytes of 1 M $LiPF_6$ in dimethoxyethane (DME) and 1 M $LiPF_6$ in ethylene carbonate (EC)/diethyl carbonate (DEC) (1:1 by volume), but only the former turns to dark green after adding Li metal (FIG. 1 inserts). Cyclic voltammetry (CV) was carried out in the two resulting solutions. A pair of quasi-reversible redox peaks are observed in the ether-based electrolyte, whereas no such peaks are found in the carbonate-based electrolyte, suggesting that Bp is redoxactive only in ether-based electrolytes. Generally, the soluble redoxactive species in electrolyte may react with electrode materials and thus negatively affect battery performance. Hence, the washing step is useful for LIBs using ether-based electrolytes but unnecessary for LIBs using carbonate-based electrolytes. A prelithiation procedure in ambient air is proposed in FIG. 4C. The residual Li-Bp THF could act as a robust protecting layer and prevent the depletion of prelithiated NE in ambient air.

Figure 14:
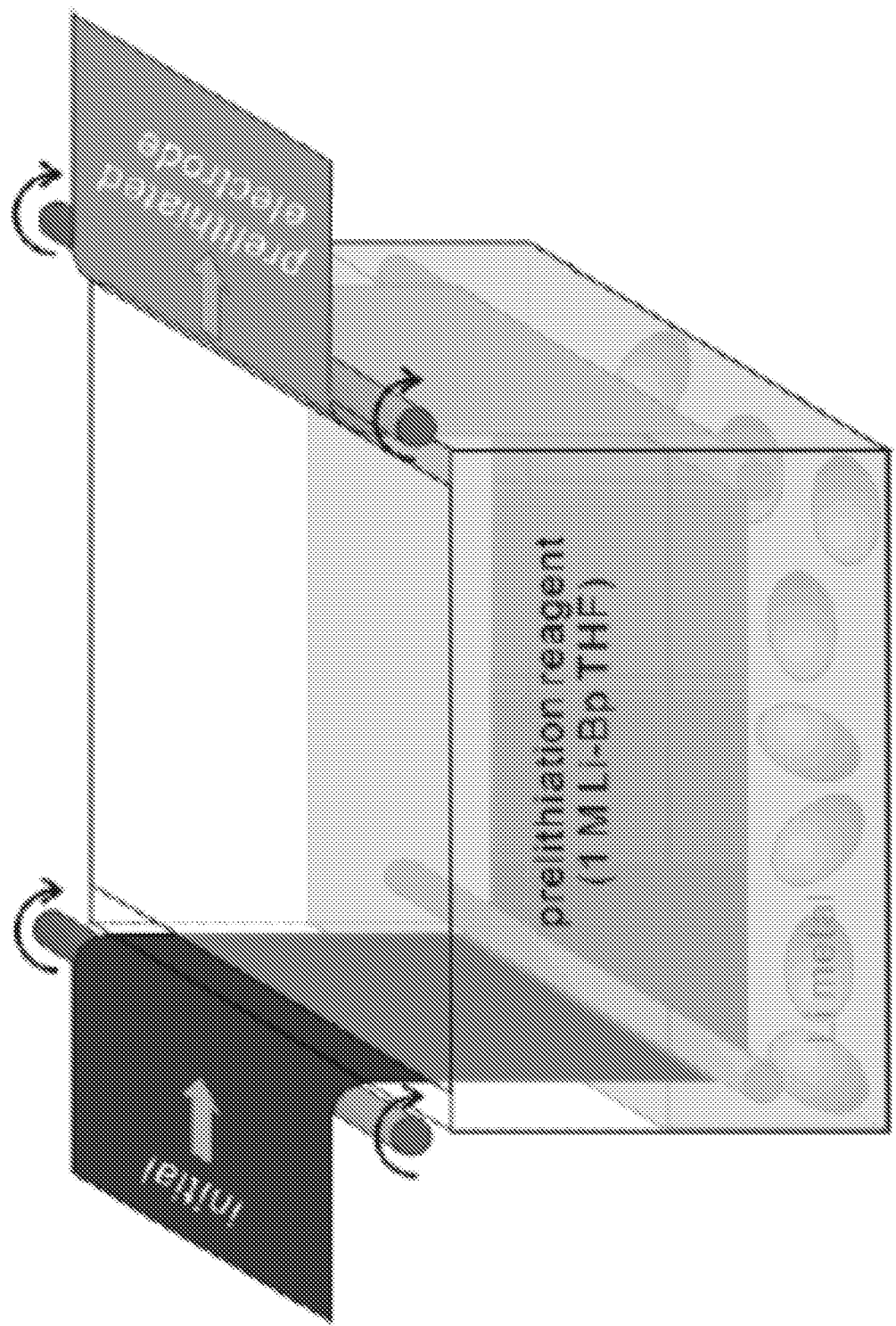
FIG. 14 is a schematic of a scalable roll-to-roll embodiment of the disclosed methods in ambient air.

During the battery assembly, the residual Li-Bp could be consumed by carbonate-based electrolyte and be converted to soluble Bp, which has no effect on battery performance. To validate this procedure, a series of P/C electrodes were treated with the 1 M Li-Bp THF stored in ambient air for different days (FIG. 4A) and dried under vacuum without washing. The corresponding electrochemical performances were evaluated using a half-cell configuration and a carbonate-based electrolyte, in comparison to that of the control prelithiated P/C electrode obtained with a similar method but in argon-filled glovebox and with repeated washing. There is no significant difference in their capacities, initial CE and DOPL (FIG. 4D, FIG. 4E, FIG. 13A, and FIG. 13B), confirming that this method can be performed in ambient air with no ill effects. We expect that it can be implemented into a commercial manufacturing process using a scalable roll-to-roll design (FIG. 14).

Figure 5A:
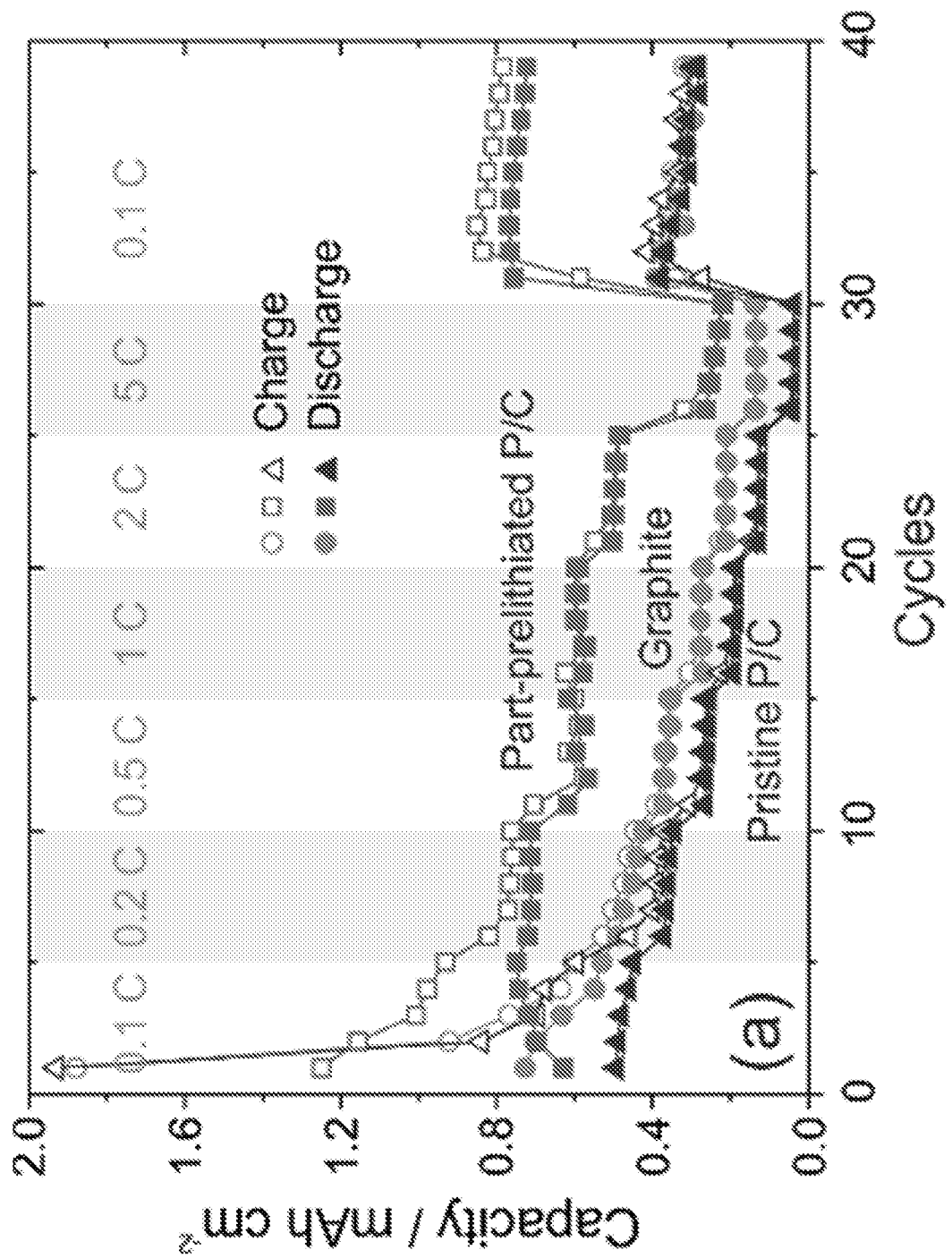
(FIG. 5A) Rate capability.
Figure 5B:
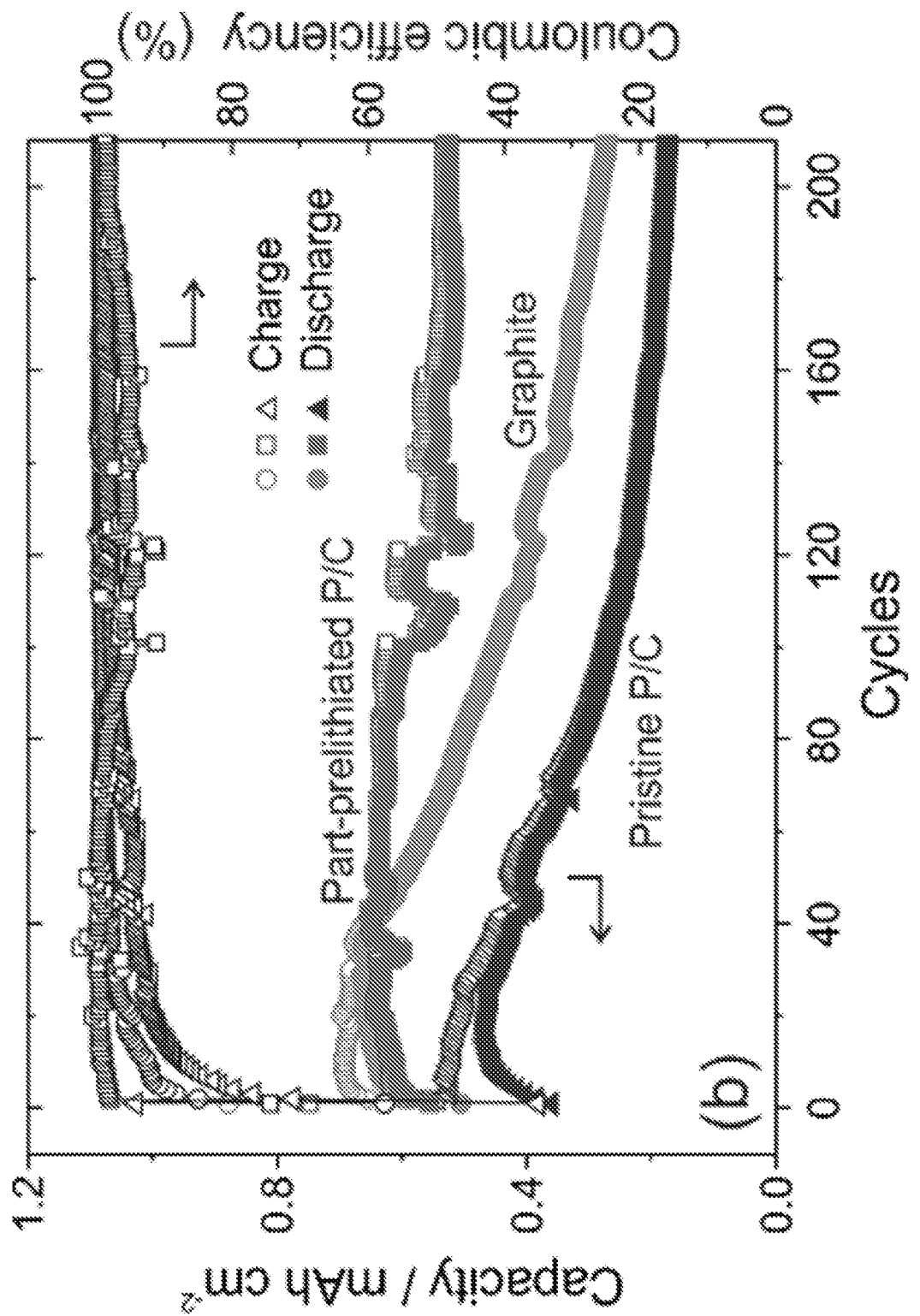
(FIG. 5B) cycling performance at 1 C.
Figure 6A:
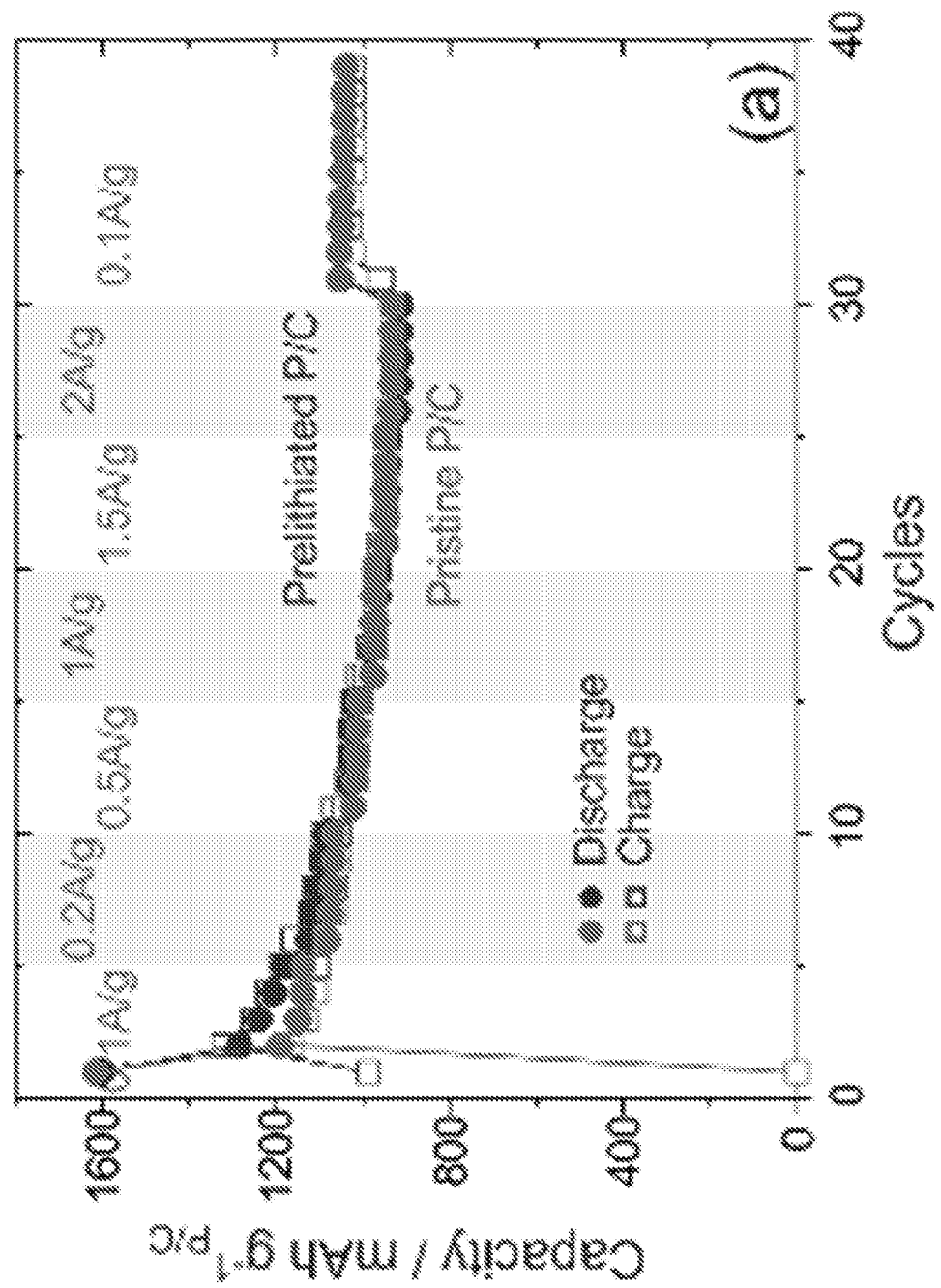
(FIG. 6A) Rate performance of pristine and prelithiated P/C. Both begin from Li-extraction.
Figure 6B:
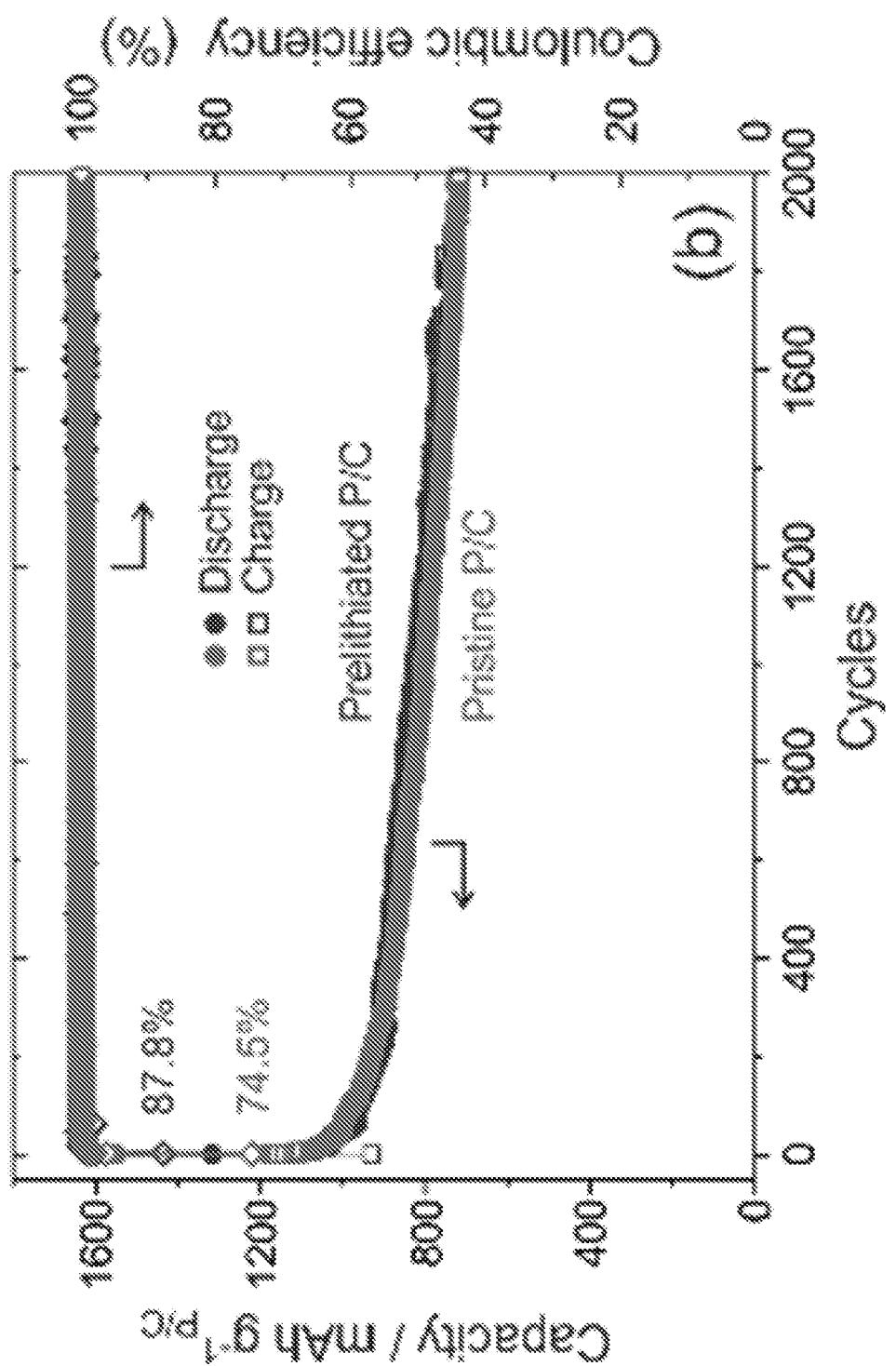
(FIG. 6B) Cycling performance of pristine (initial CE=7.5%) and prelithiated P/C (initial CE=87.8%) at 1 A $g^{-1}$. Rate performance of S/C (FIG. 6C) and S/P LIB (FIG. 6E). Cycling performance of S/C (FIG. 6D) and S/P LIB (FIG. 6F) at 1 A $g^{-1}$.
Figure 6C:
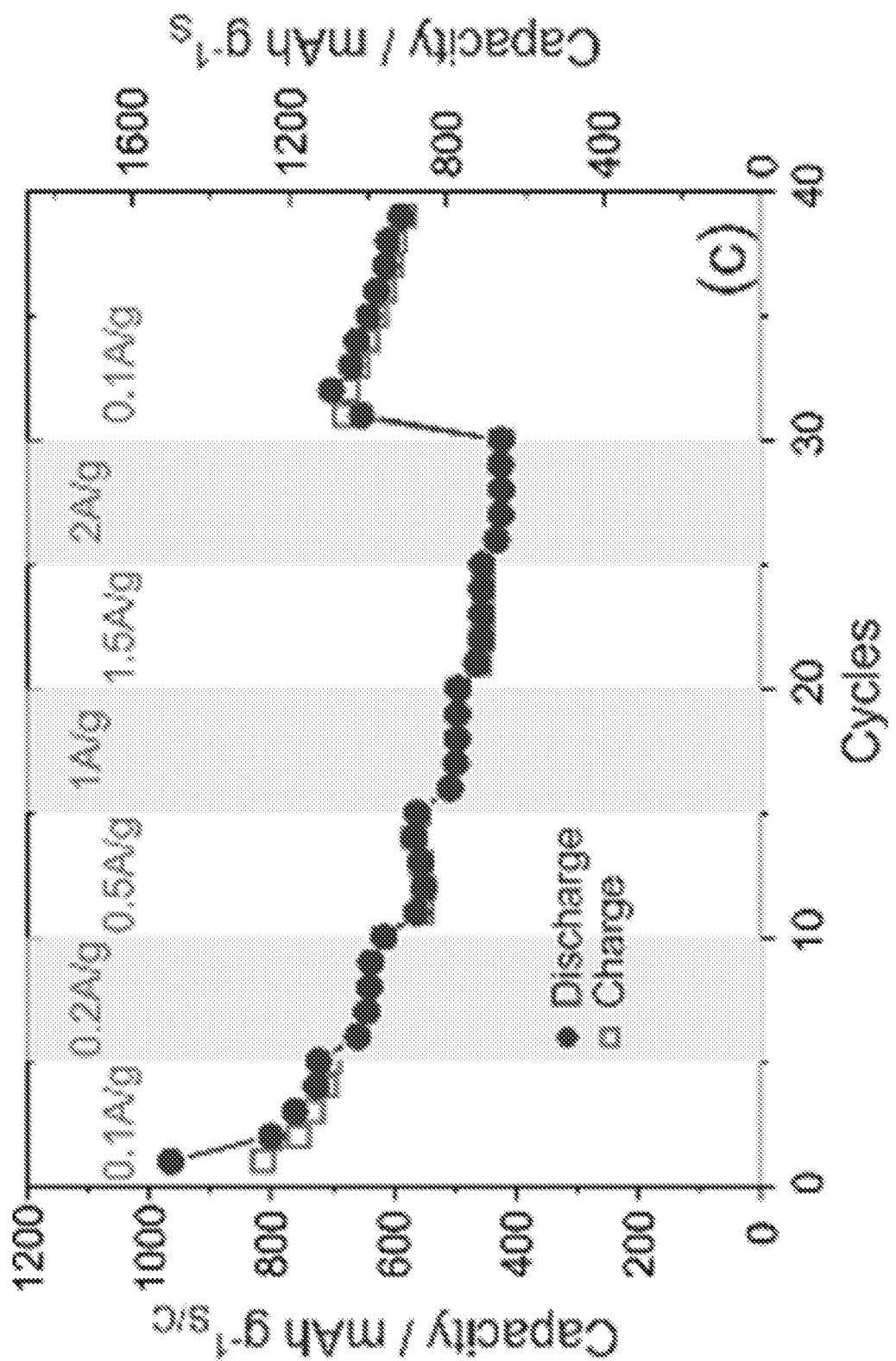
FIG. 6 is a series of plots showing electrochemical performances of prelithiated P/C, S/C half cells and S/P LIB.
Figure 6D:
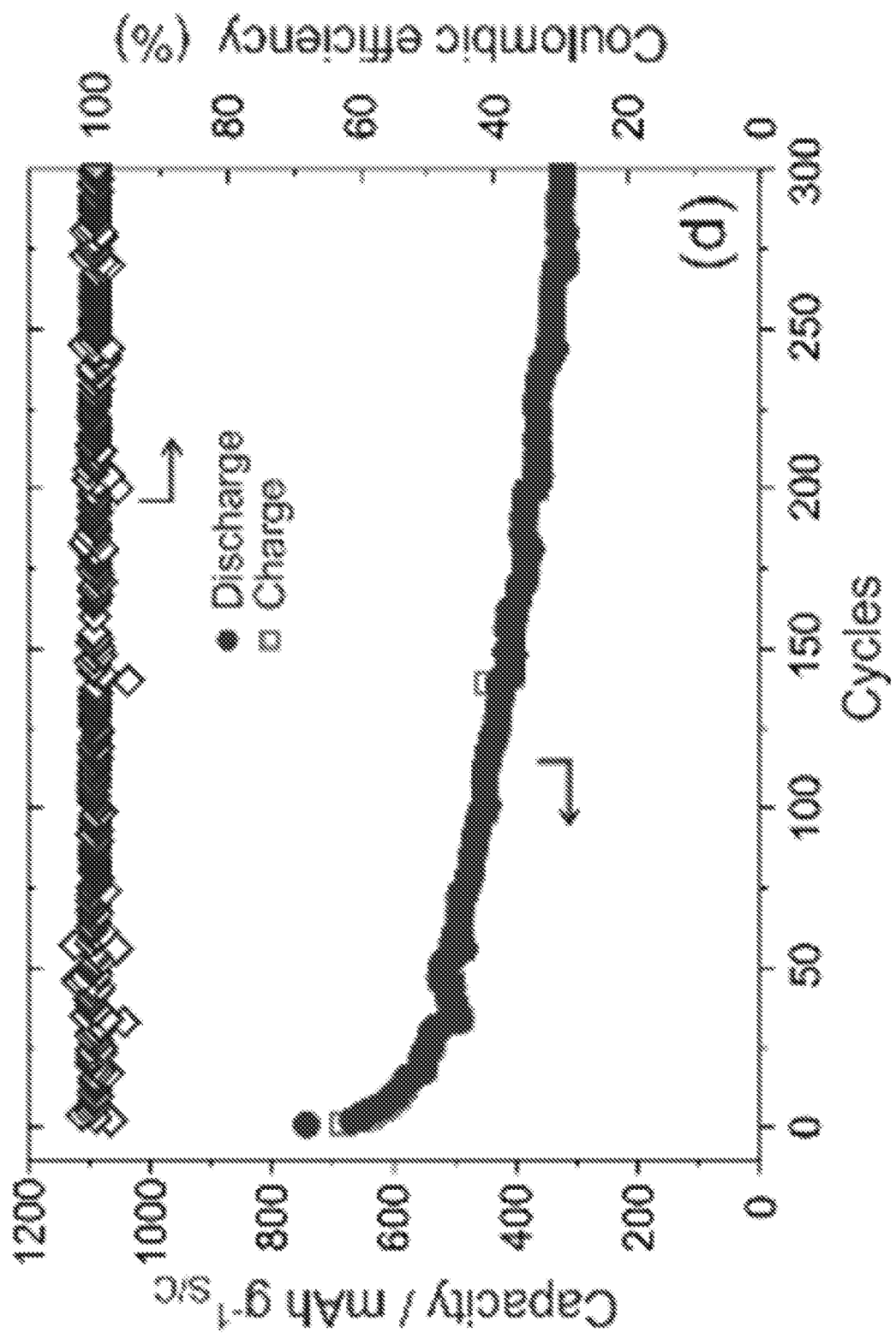
Figure 6E:
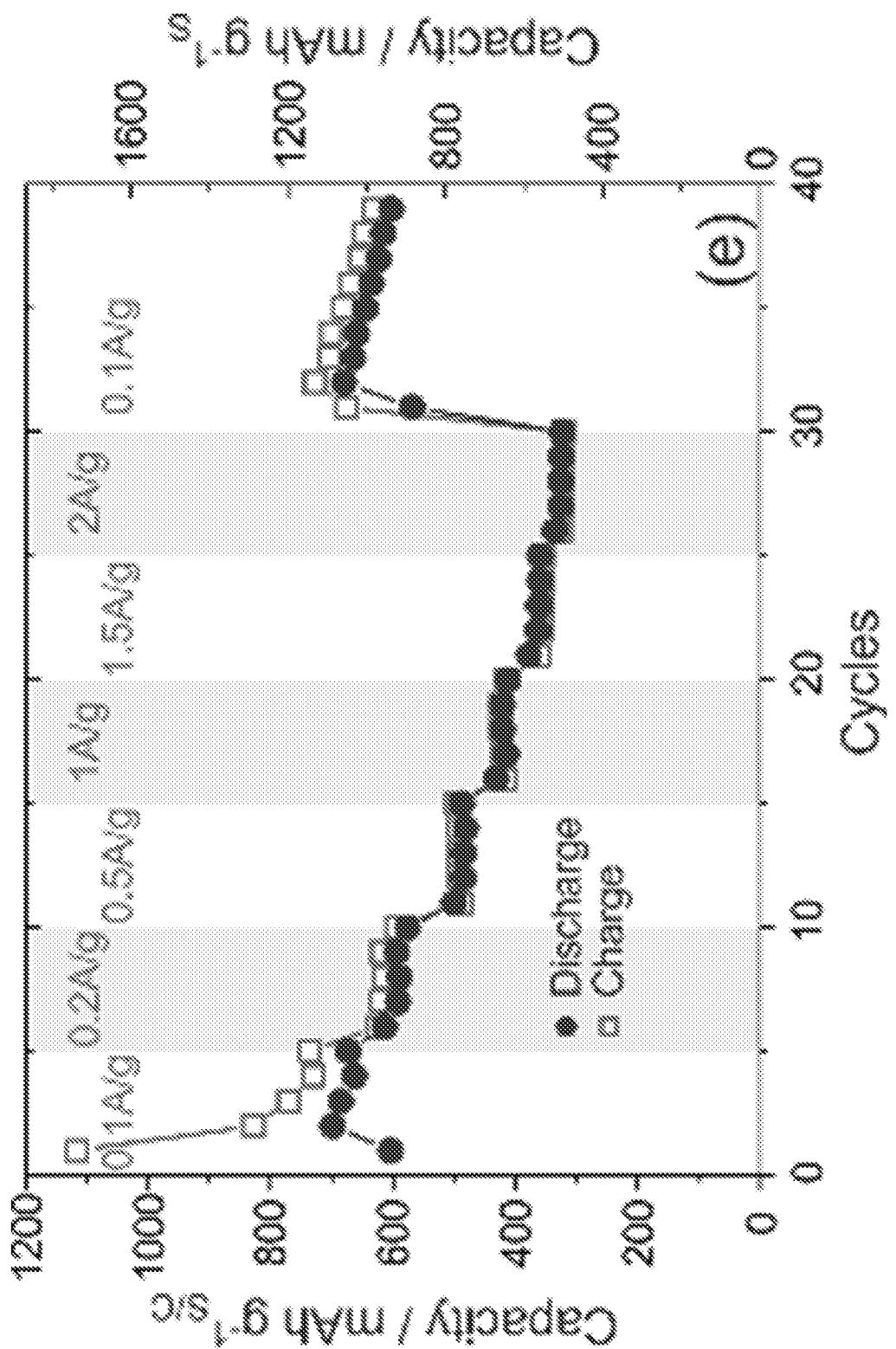
Figure 6F:
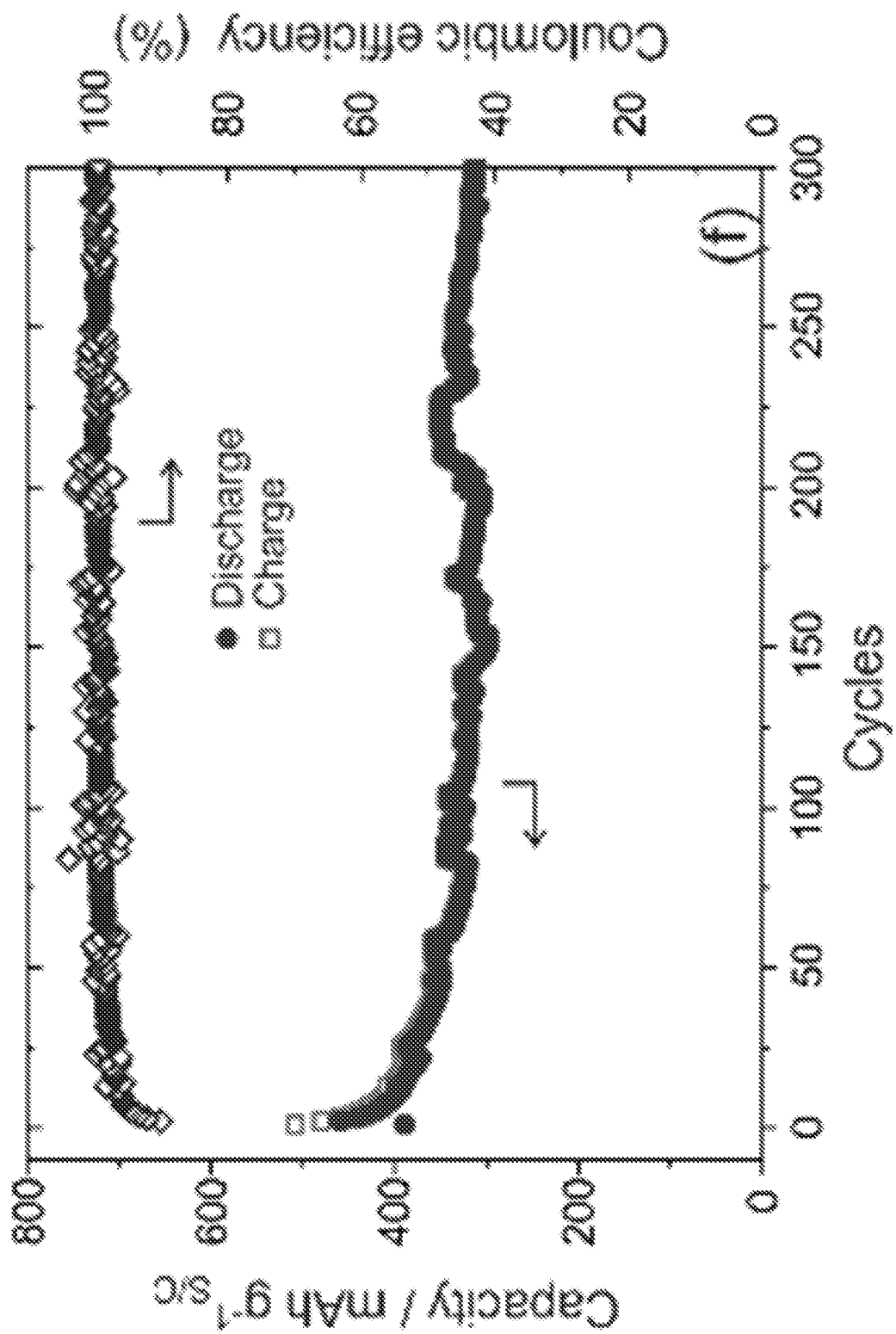
Figure 15:
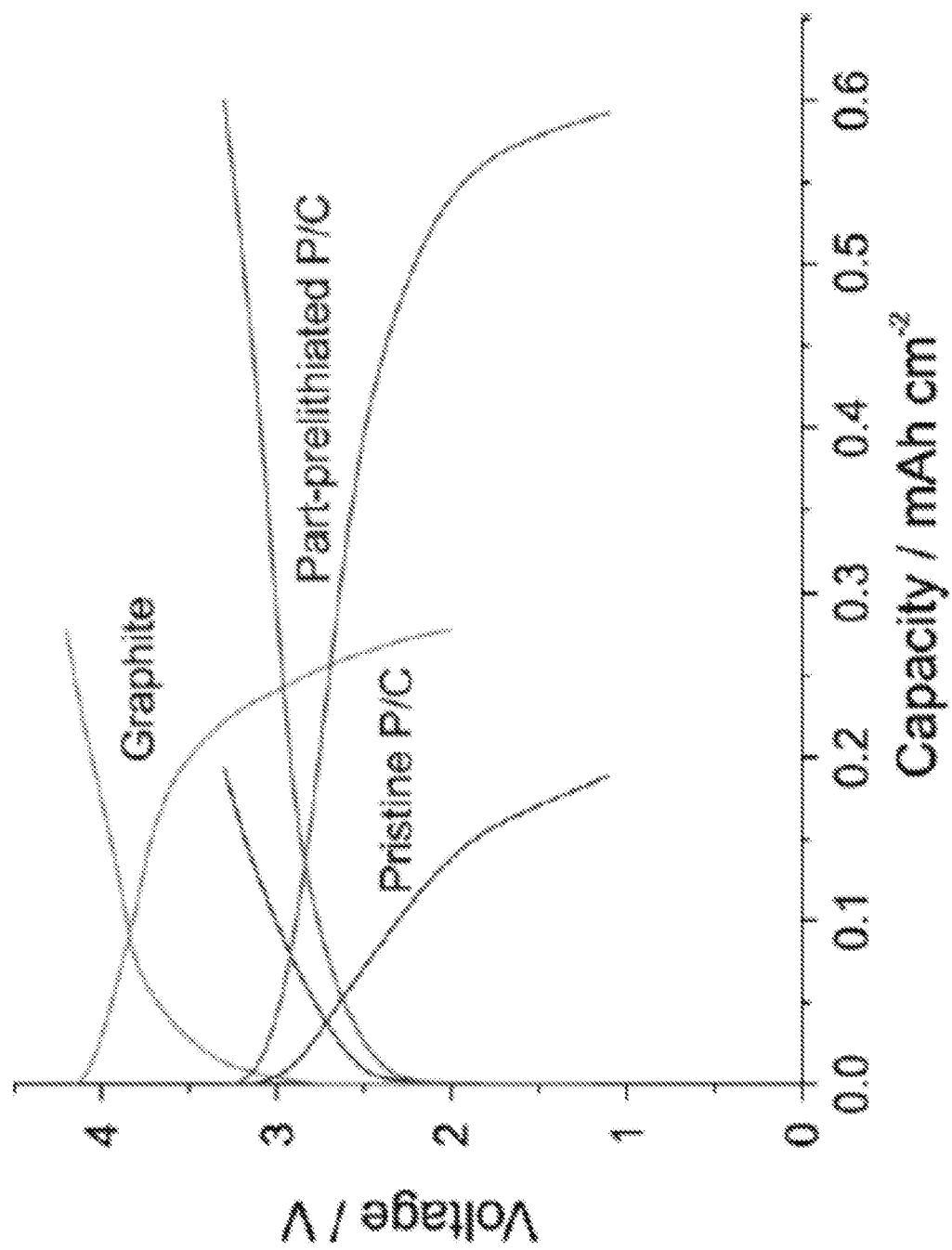
FIG. 15 is a plot of voltage profiles of the NMC(111)/graphite, NMC(111)/pristine P/C and NMC(111)/part-prelithiated P/C full LIBs at 1 C.
Figure 16A:
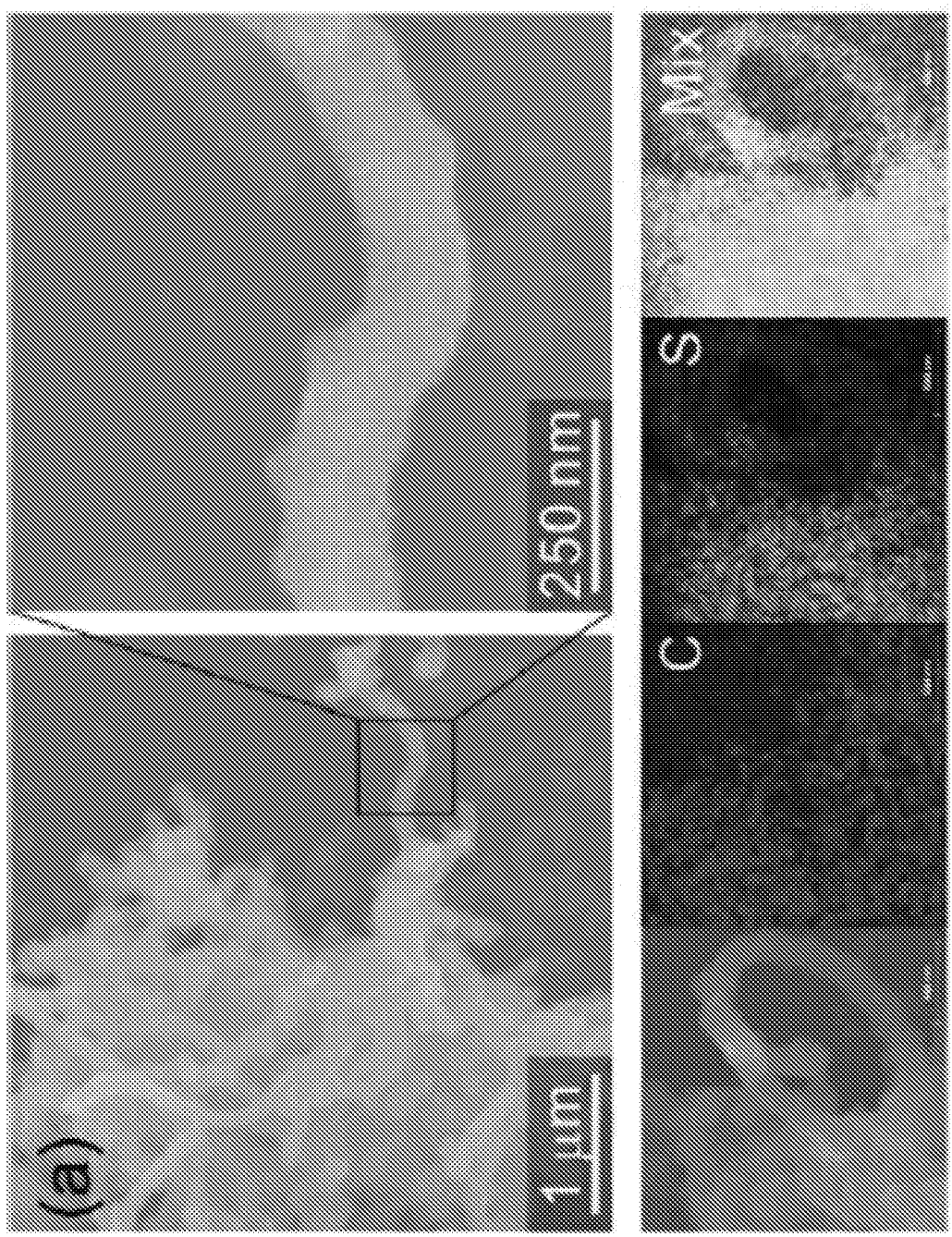
FIG. 16 shows characterization of an electrode embodiment. SEM images, energy-dispersive X-ray spectroscopy (EDX) elemental mapping (FIG. 16A) and thermogravimetric analysis (TGA) curve (FIG. 16B) of a S/C composite.
Figure 16B:
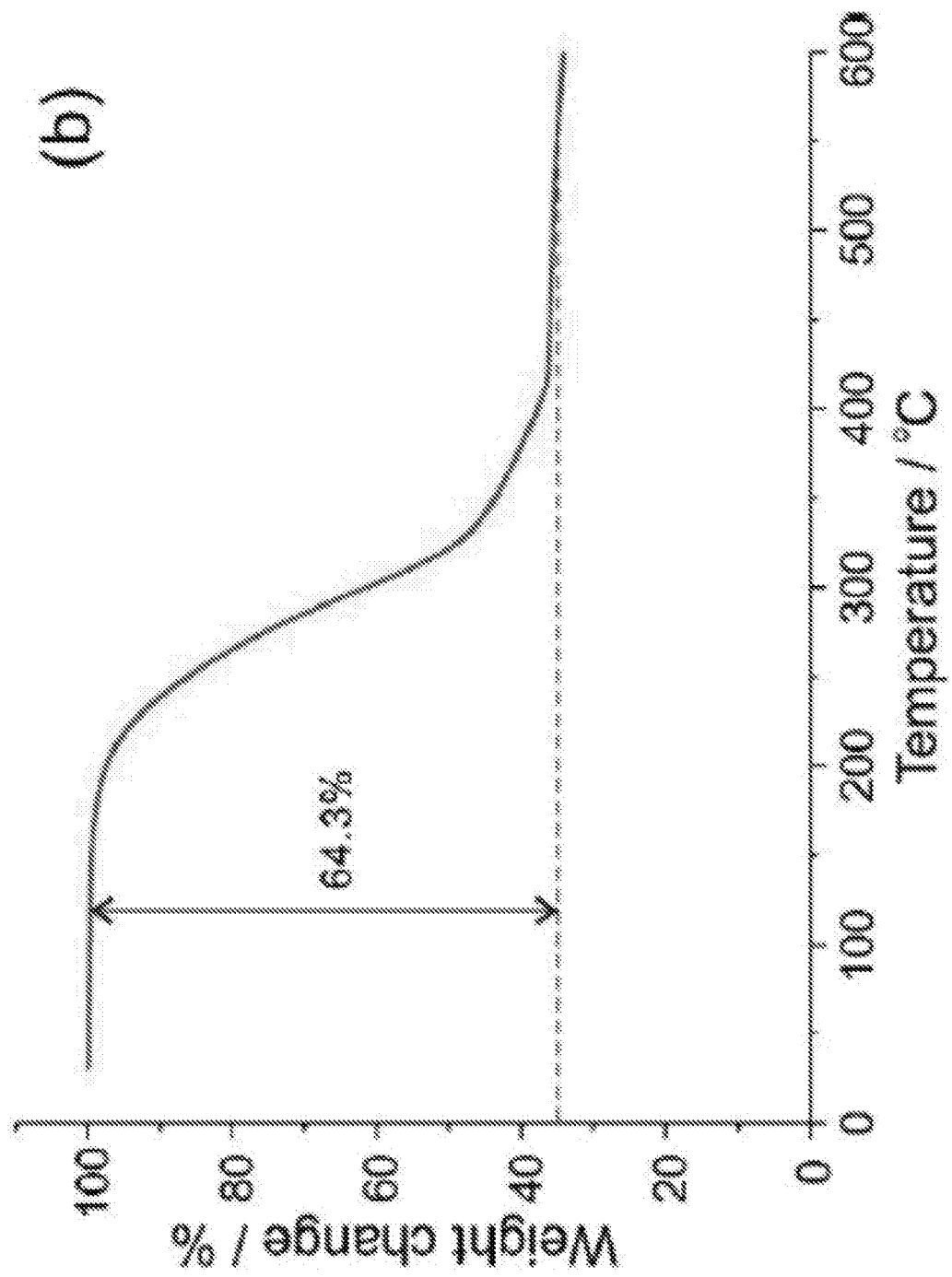
Figure 17:
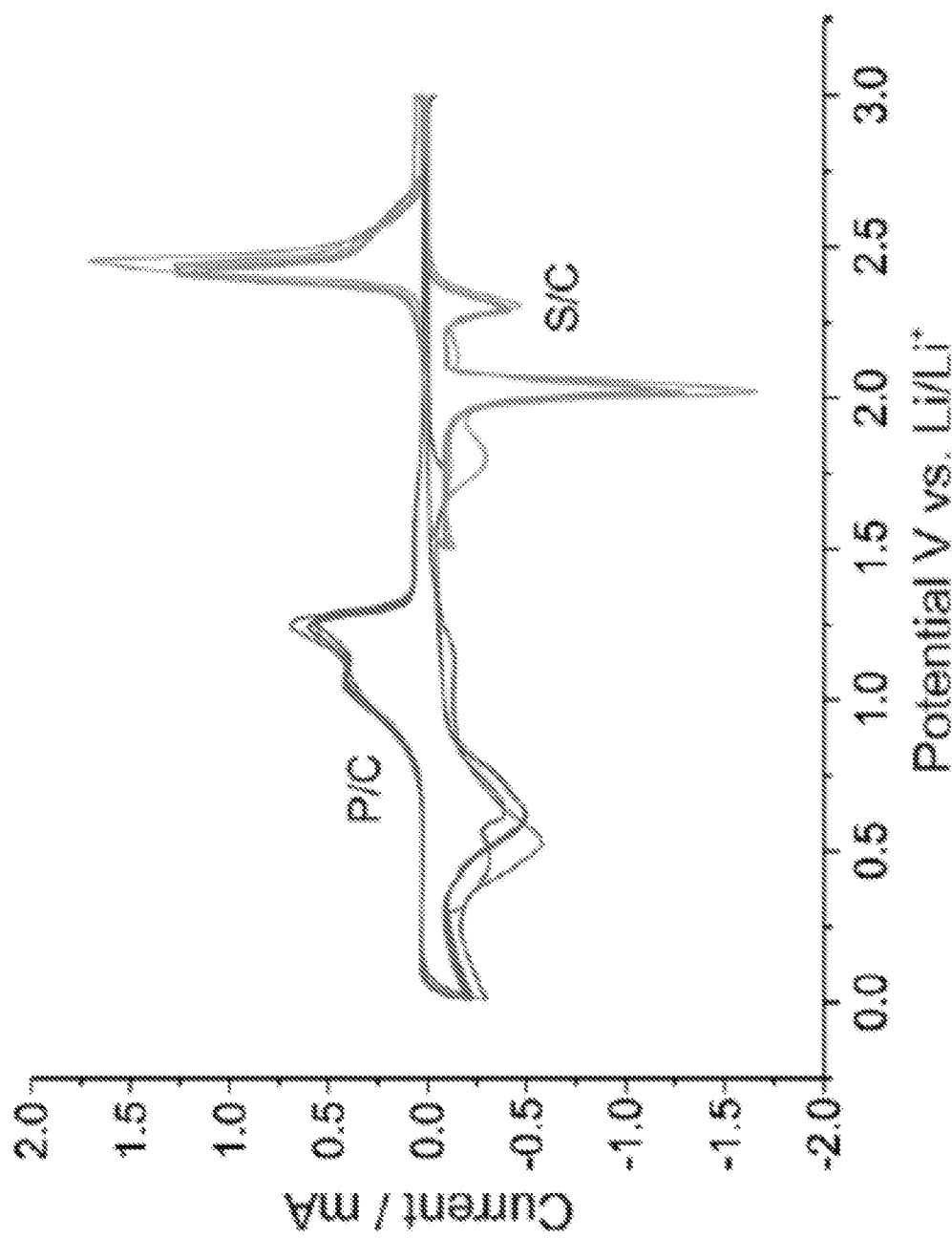
FIG. 17 is a plot of cyclic voltammograms of P/C and S/C composite at a scan rate of 0.1 mV/s.
Figure 18A:
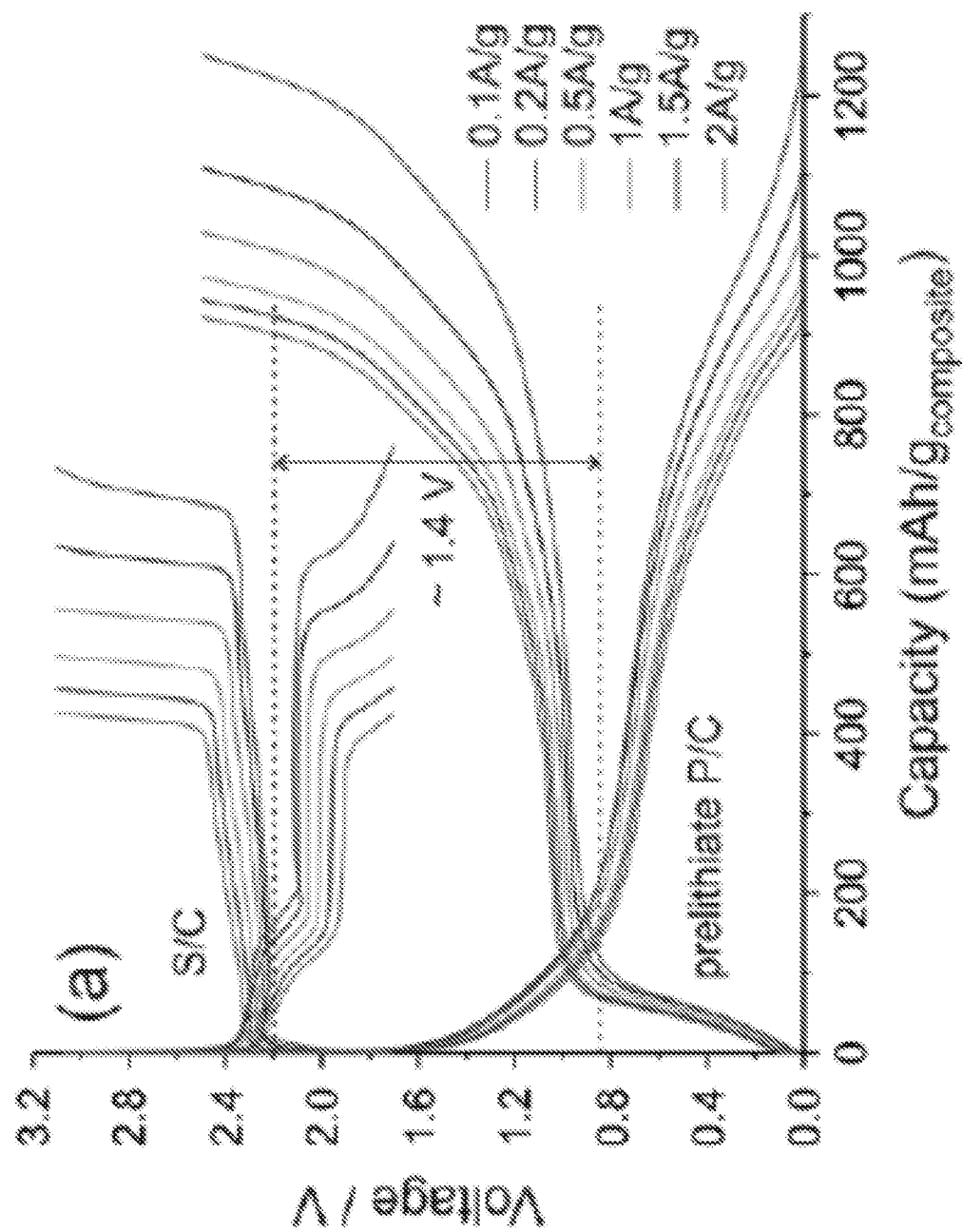
FIG. 18 is a set of plots showing (FIG. 18A) Voltage profiles of S/C and prelithiate P/C half cells at different current densities.
(FIG. 18B) Voltage profiles of S/P LIB at different current densities. Insert is the theoretical and practical energy densities of S/P LIB.
Figure 18B:
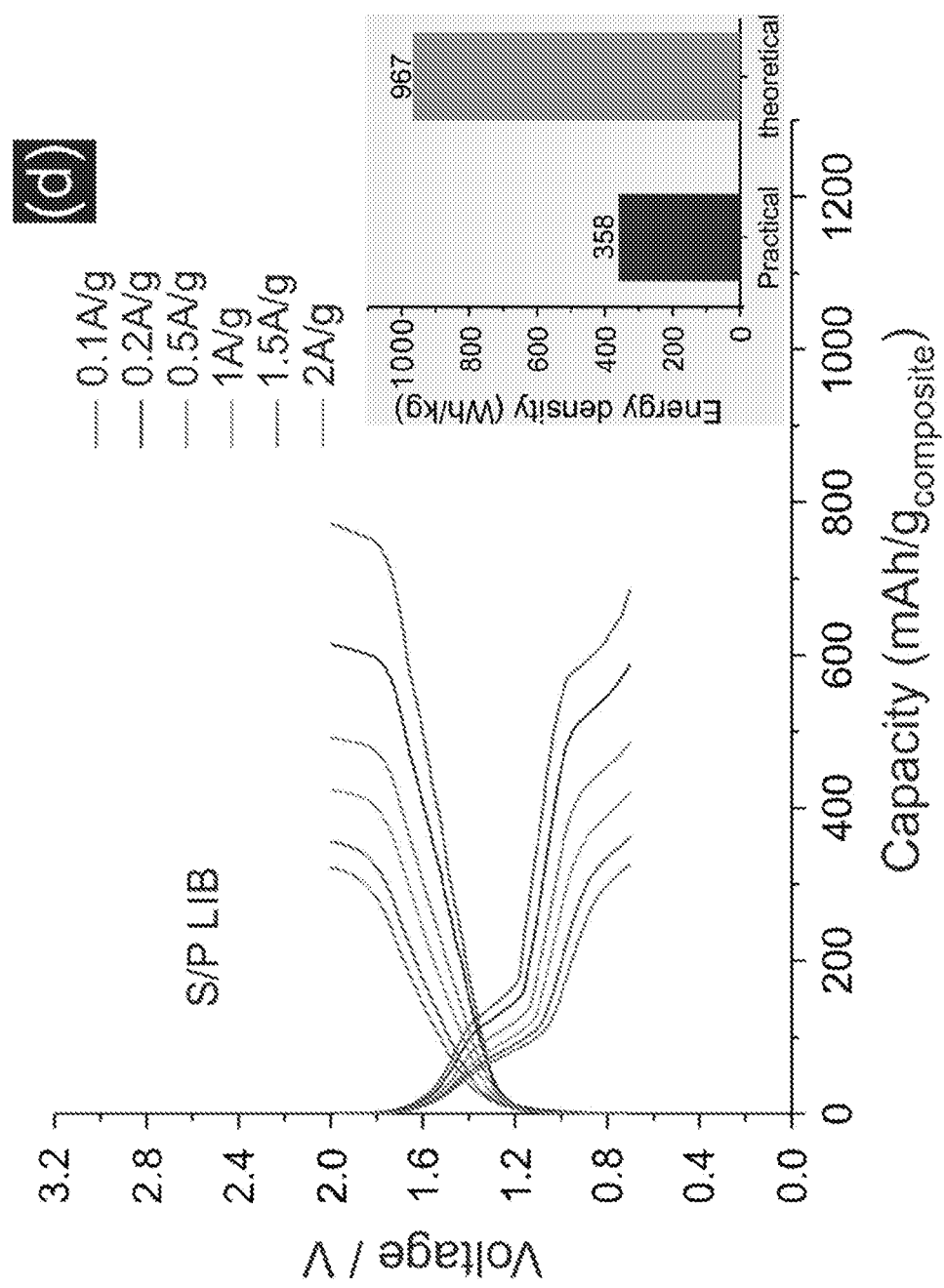
Figure 19:
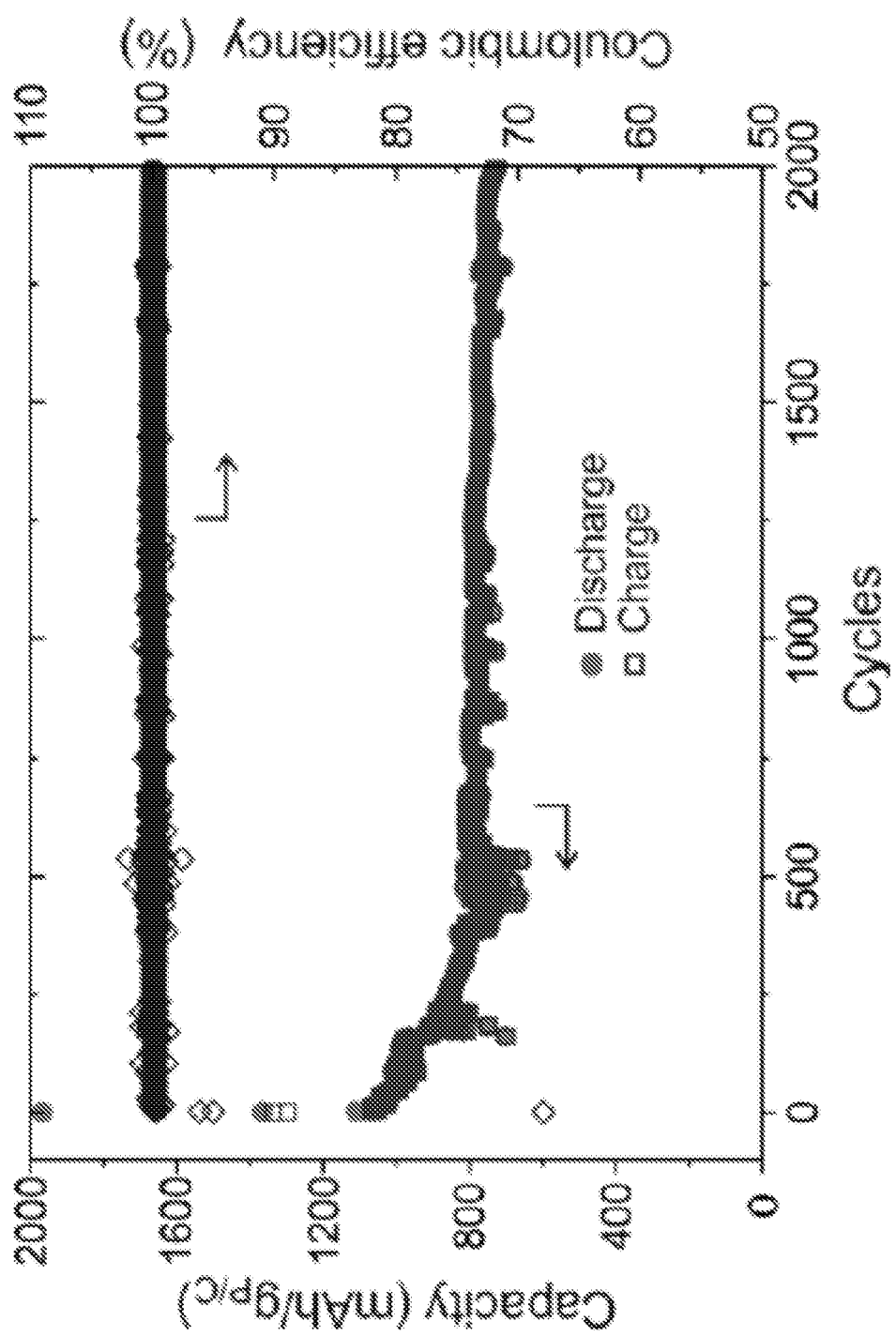
FIG. 19 is a plot showing long-term stability and coulombic efficiency of a P/C electrode at 2 A g$^{-1}$ for 2000 cycles.

Application of Prelithiation: As mentioned above, the prelithiation could improve the available capacity of a full LIB by compensating the initial active Li loss. NMC(111) was used as PE and separately paired with graphite, pristine P/C and part-prelithiated P/C NEs. Voltage profiles are shown in FIG. 15. The full LIB using part prelithiated P/C NE provides a much higher capacity than the other two full cells (FIG. 5A & FIG. 5B). Sulfur stands as a promising Li-free PE due to its high theoretical capacity (1675 mAh $g^{-1}$), which is usually paired with Li metal NE. Although the resulting Li—S battery offers a high theoretical energy density, the Li metal NE remains a big obstacle because of its low CE and serious safety concern. Most studies still rely on the utilization of a large excess amount of Li metal NE, limiting their practical energy density. The prelithiation enables replacing Li metal with other high-capacity NEs. A sulfur/mesoporous carbon composite (S/C) was prepared as the PE material (FIG. 16). Prior to full cell assembly, the electrochemical performance of NE and PE materials were investigated using half-cell configurations. Both of them exhibit good rate capability (FIG. 6A & FIG. 6C) and cycling stability (FIG. 6B & FIG. 6D; FIG. 17). Notably, the rate capabilities as well as cycling performances of pristine and prelithiated P/C are almost accordant with each other except for the initial few cycles (FIG. 6A, FIG. 6B, & FIG. 19), indicating that the prelithiation treatment would not damage the electrode's stability. A new S/P LIB was then assembled by coupling the S/C PE with the prelithiated P/C NE. With a limited Li source in the prelithiated P/C NE, the S/P LIB still shows discharge capacities of 686, 589, 485, 421, 363, and 327 mAh $g^{-1}$(S/C) at 0.1, 0.2, 0.5, 1, 1.5, and 2 A $g^{-1}$, respectively. When the current density is back to 0.1 A $g^{-1}$, it delivers a reversible capacity of 681 mAh $g^{-1}$(S/C) (FIG. 6E). At 1 A $g^{-1}$, the S/P LIB delivers an initial capacity of 460 mAh $g^{-1}$(S/C) and retains a reversible capacity of 312 mAh $g^{-1}$(S/C) after 300 cycles, with a capacity decrease of 0.10% per cycle and an average CE over 99% (FIG. 6F). As shown in FIG. 18A & FIG. 18B, the S/P LIB exhibits similar voltage profiles as S/C half cell except at different voltages, displaying two discharge plateaus at 1.4 V and 1.1 V at 0.1 A $g^{-1}$. Despite the output voltage being a little low, the new configured S/P LIB could provide a theoretical maximum energy density of 1222 Wh $kg^{-1}$ since both S and P have high specific capacities. An energy density of 358 Wh $kg^{-1}$ has been realized based on the total mass of active materials (P/C and S/C) and the discharge capacity at 0.1 A $g^{-1}$ (FIG. 18B insert), which is much higher than conventional LIBs. In addition, both S and P are cheap and environmentally abundant. These characteristics make the new configured S/P LIB a potential candidate for next-generation batteries.

Example 2

Chemical Treatment of Silicon-Based Anodes

Sample 1: A prelithiation reagent was prepared by dissolving an excess amount of metallic lithium into a naphthalene (Nap) and tetrahydrofuran (THF) solution. In a typical procedure, 1.28 g Nap was dissolved in 10 ml THF to make a 1 M Nap THF solution, then an excess amount of lithium metal was dissolved in this solution to form a 1 M Li-Nap THF solution. The prelithiation was conducted by immersing SiO/Graphite (SiO/G) composite electrode into the reagent. The degree of prelithiation can be controlled via immersion time.

Half cells were assembled using the prelithiated SiO/G as cathode, metallic lithium as anode, 1 M $LiPF_6$ dissolved in EC/EMC (3:7 in volume) with 10 wt. % FEC and 2 wt. % VC additives as electrolyte, and Glassfiber (GD/D model) as separator. The first formation charge/discharge cycle was conducted at 0.05C (1 C=1000 mA $g^{-1}$) between 0.02 and 1.5 V. For the full cell construction, $LiNi_{0.6}Co_{0.2}Mn_{0.2}$ (NCM622) was used as cathode, the prelithiated SiO/G as anode, and Celgard 2325 as separator. The reversible areal capacities of NCM622 and SiO/G are both 3 mAh $cm^{-2}$. The size of SiO/G and NCM622 electrodes were ⅝ and 9/16 inch OD, respectively. The reversible capacity of negative to positive electrodes (N/P ratio) was ~1.2. The formation process of full cell tests include 3 cycles: Constant current (CC) charge at 0.05C, 0.1C, 0.2C with constant voltage (CV) charge to 0.05C, then CC discharge at 0.05C, 0.1C, 0.2C. The voltage range is from 2.7 to 4.3 V. The cycling test of full cell test was CC charge at 0.5C with CV charge to 0.05C, then CC discharge at 0.5C. The voltage range is from 3 to 4.3 V.

Figure 21:
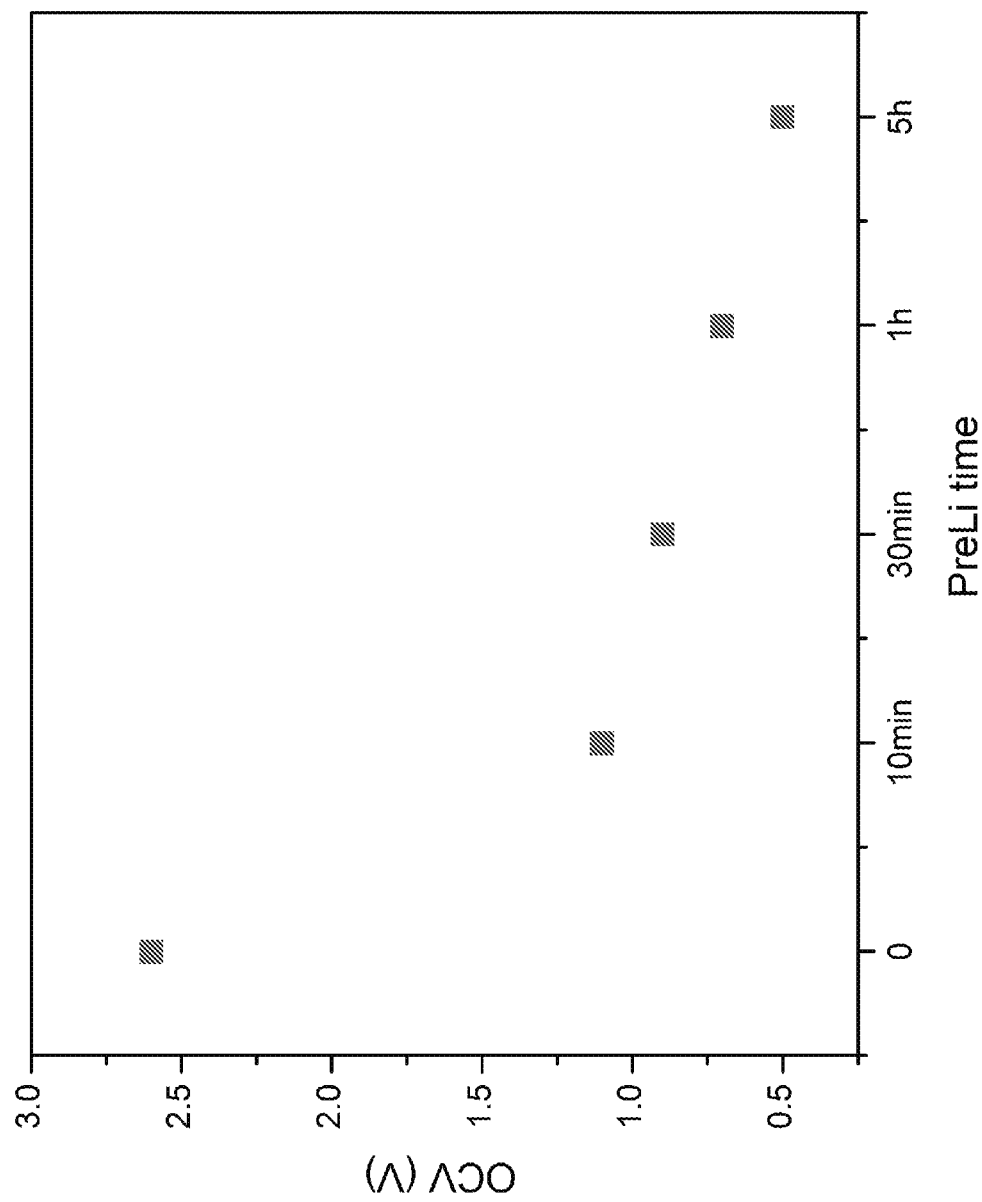
FIG. 21 is a plot showing open circuit voltage (OCV) of control and prelithiated SiO/G composite (using 1 M Li-naphthalene (Nap) THF reagent) half cells with different immersion time.
Figure 22:
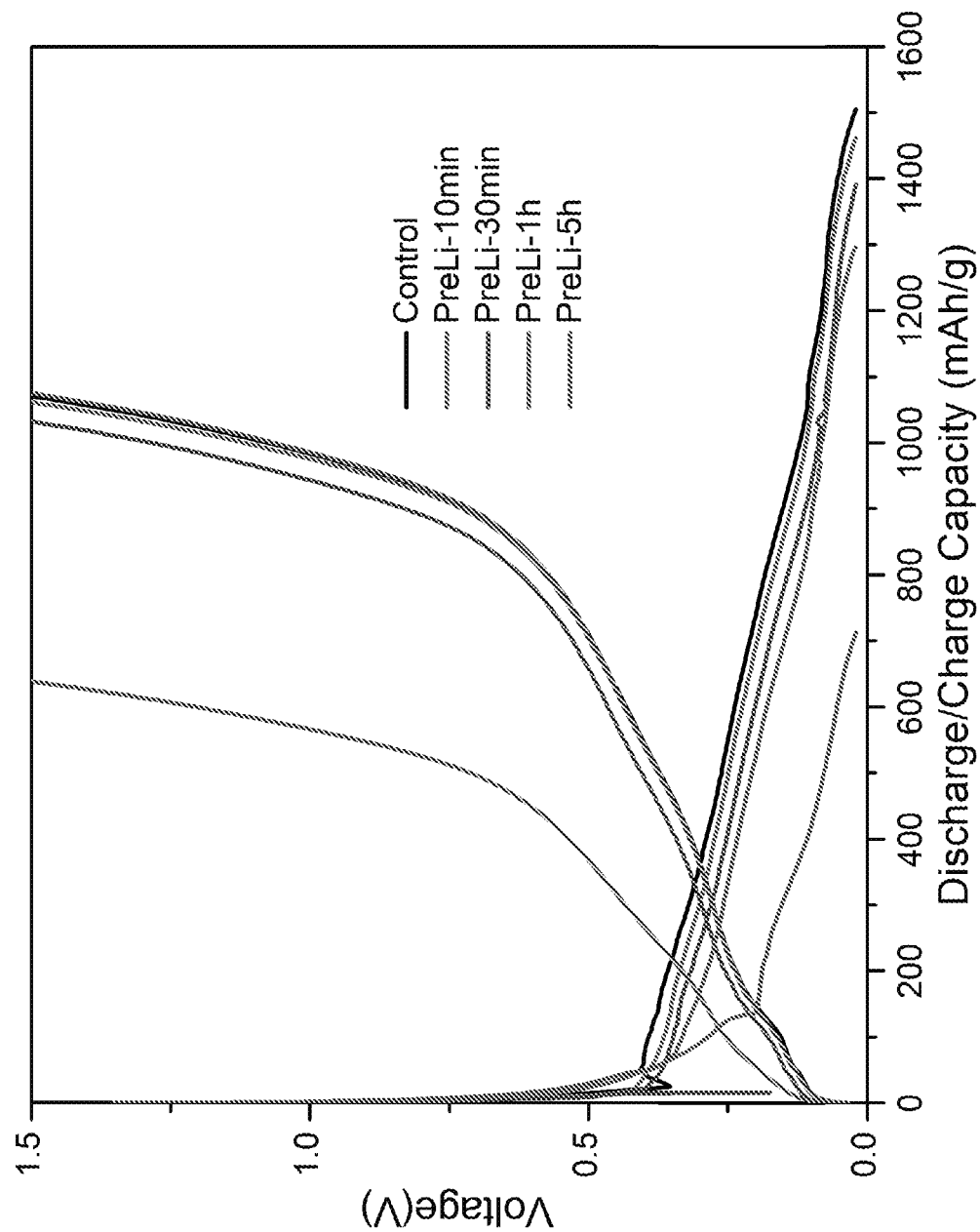
FIG. 22 is a plot showing 1st discharge (lithium insertion) and charge (lithium extraction) at 0.05C voltage profiles of control and prelithiated SiO/G composite (using 1 M Li-Nap THF reagent) half cells with different immersion time.

As shown in FIG. 21, the OCV of prelithiated samples decrease with increased immersion time, which indicates that lithium ions are pre-loaded into the silicon-based materials. The first 10 min prelithiation time results in a large decrease of OCV to ~1.1 V. FIG. 22 shows the typical voltage profiles of the control and prelithiated silicon-based electrodes with different prelithiation depth. The initial discharge (lithium insertion) and charge (lithium extraction) capacity of control sample were 1500 and 1070 mA h $g^{-1}$, respectively, indicating an initial CE of ~71%. As the prelithiated silicon-based electrode is in Li-rich state, it begins with Li-extraction in half cell test. With increased immersion time, the Li-extraction capacity increased, from 2 mAh $g^{-1}$ for 10 min prelithiation to ~140 mAh $g^{-1}$ for 5 h prelithiation. Meanwhile, the 1st discharge capacity decreases while the charge capacity remains almost unchanged, and thus the initial CE increases. The 5 h prelithiaion sample is an exception with both decreased discharge/charge capacity, which may come from the structure deformation due to the long time prelithiation. A minimum prelithiation time of 1 h is useful to obtain a satisfactory initial CE of ~83%, with lithiation and delithiation capacity of 1070 and 1300 mA h $g^{-1}$, respectively. The reduced irreversible capacity and increased CE after prelithiation can be attributed to the formation of SEI and prelithiation in advance during the prelithiation process, which transfers the lithium ions in the prelithiation reagent to the SiO/G composite.

Figure 23:
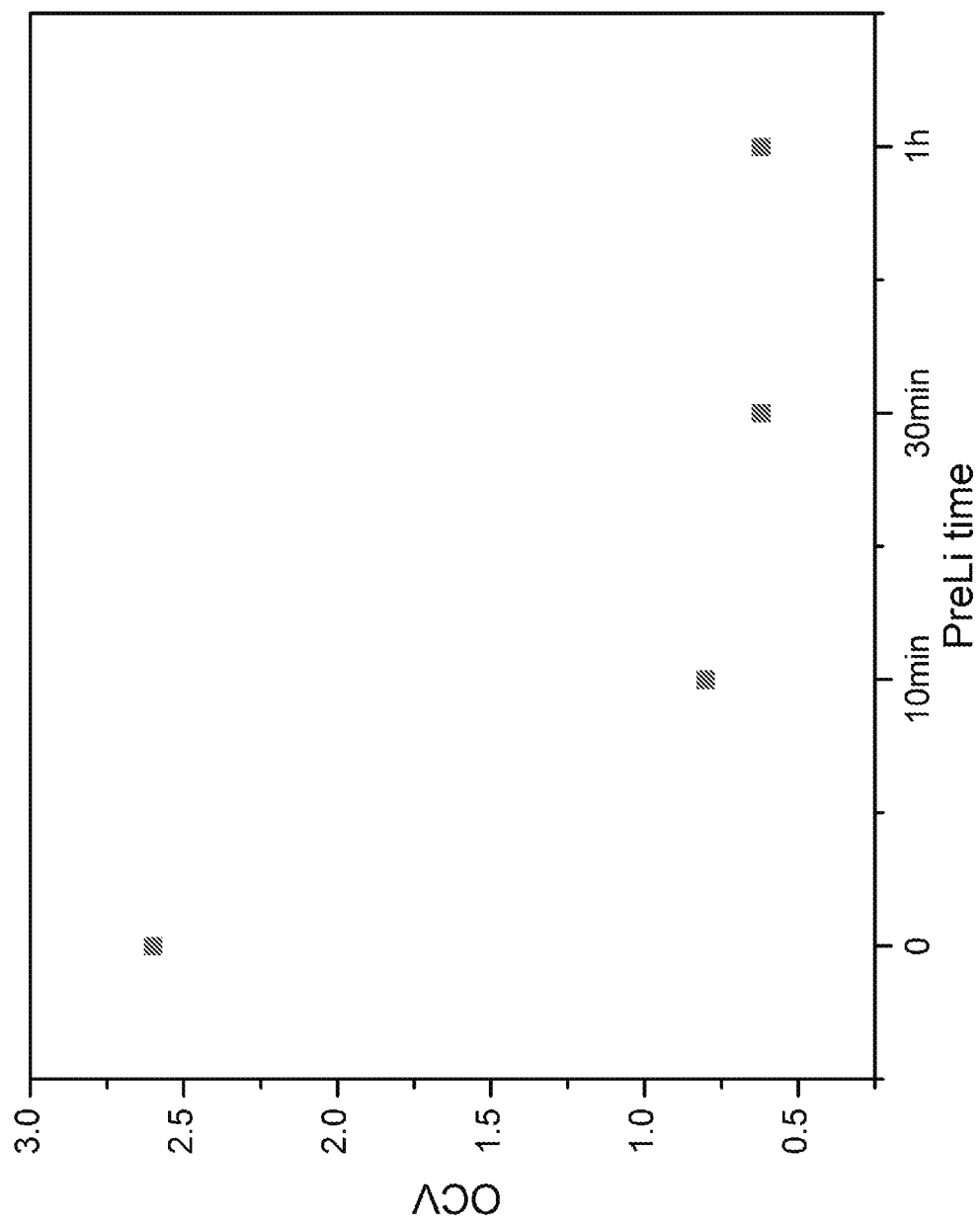
FIG. 23 is a plot showing OCV of control and prelithiated SiO/G composite half cells (using 1 M Li-Bp THF reagent) with different immersion time.
Figure 24:
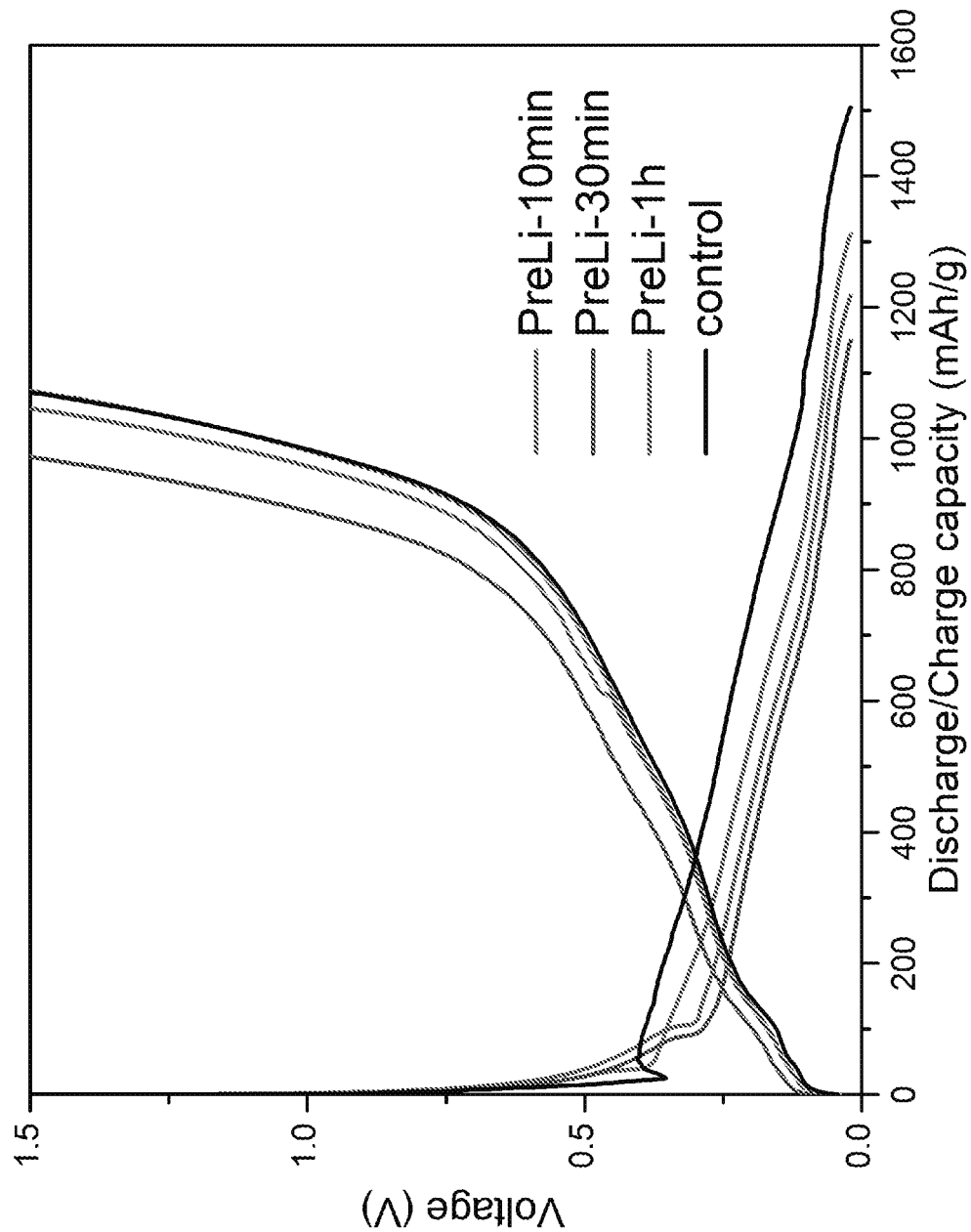
FIG. 24 is a plot showing 1st discharge (lithium insertion) and charge (lithium extraction) at 0.05C voltage profiles of control and prelithiated SiO/G composite half cells (using 1 M Li-Bp THF reagent) with different immersion time.
Figure 25:
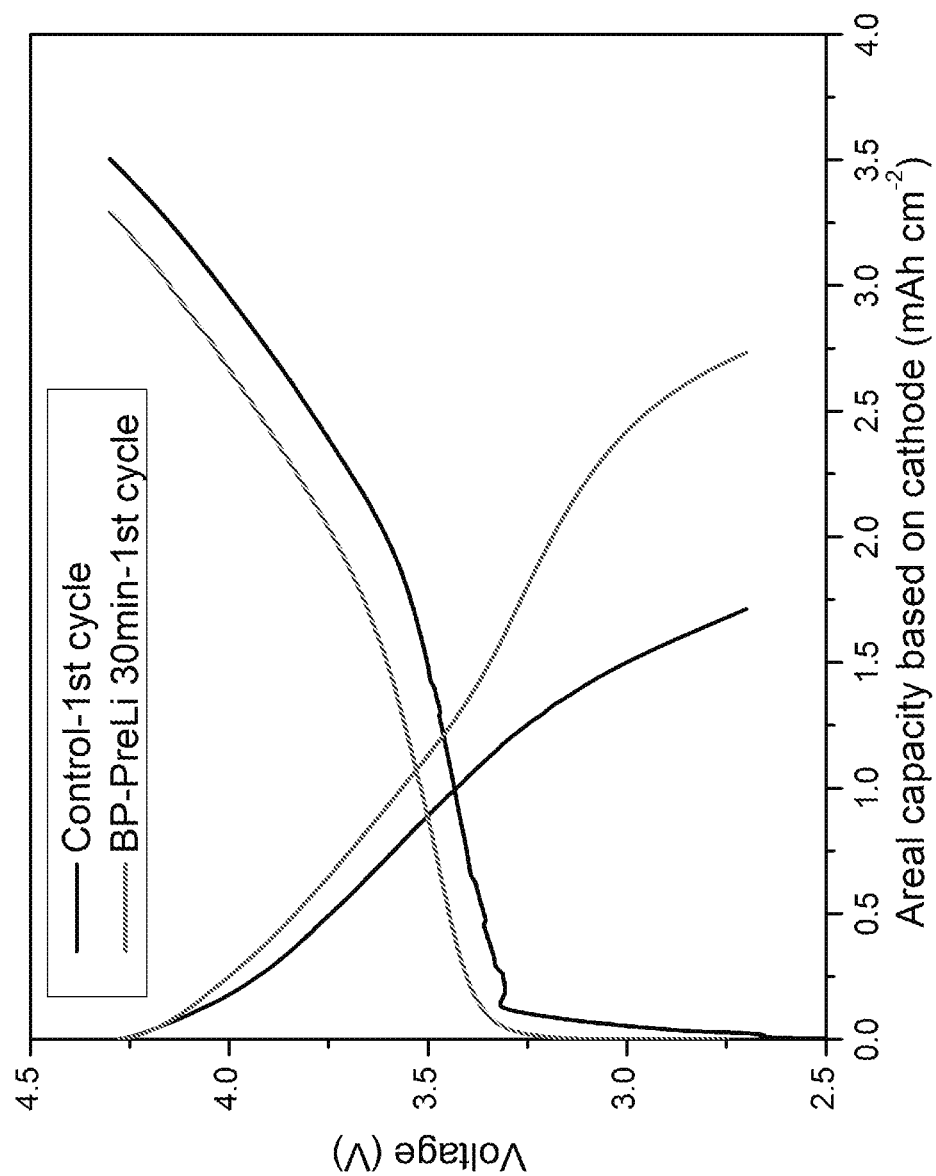
FIG. 25 is a plot showing 1st charge and discharge at 0.05C voltage profiles of control and prelithiated SiO/G composite (using 1 M Li-Bp THF reagent for 30 min) full cells (LiNi$_{0.6}$Co$_{0.2}$Mn$_{0.2}$ as the cathode for the full cell construction).
Figure 26:
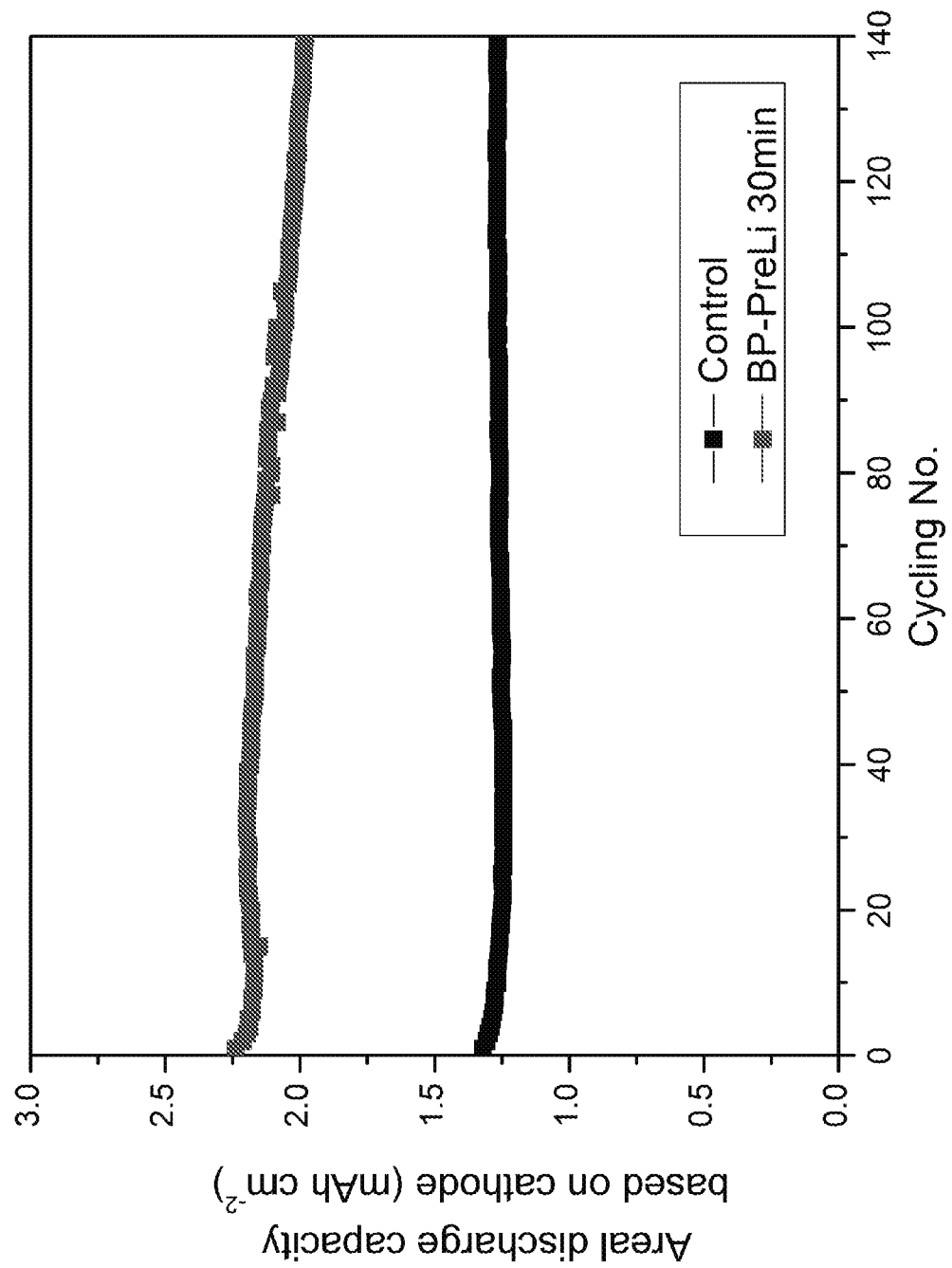
FIG. 26 is a plot showing full cell cycling performance at 0.5C of a control and a prelithiated SiO/G composite (using 1 M Li-Bp THF for 30 min).

Sample 2: Biphenyl (Bp) was used to prepare the prelithiation reagent. 1 M Li-Bp THF solution was prepared using the same process. As shown in FIG. 23, the OCV of the 10 min prelithiation sample is 0.8 V, indicating a better prelithiation effect than the Li-Nap THF reagent. Consequently, a shorter prelithiation time of 30 min led to a high initial CE of ~85%, with lithiation and delithiation capacity of 1150 and 980 mA h g$^{-1}$, respectively (FIG. 24). The full cell tests in FIG. 25 shows that the initial CE improved greatly by prelithiation, that is, 82.9% for 30 min prelithiation compared with 48.8% for control sample. Moreover, the prelithiation process does not appear to have a negative effect on the full cell cycling performance (FIG. 26).

Figure 27:
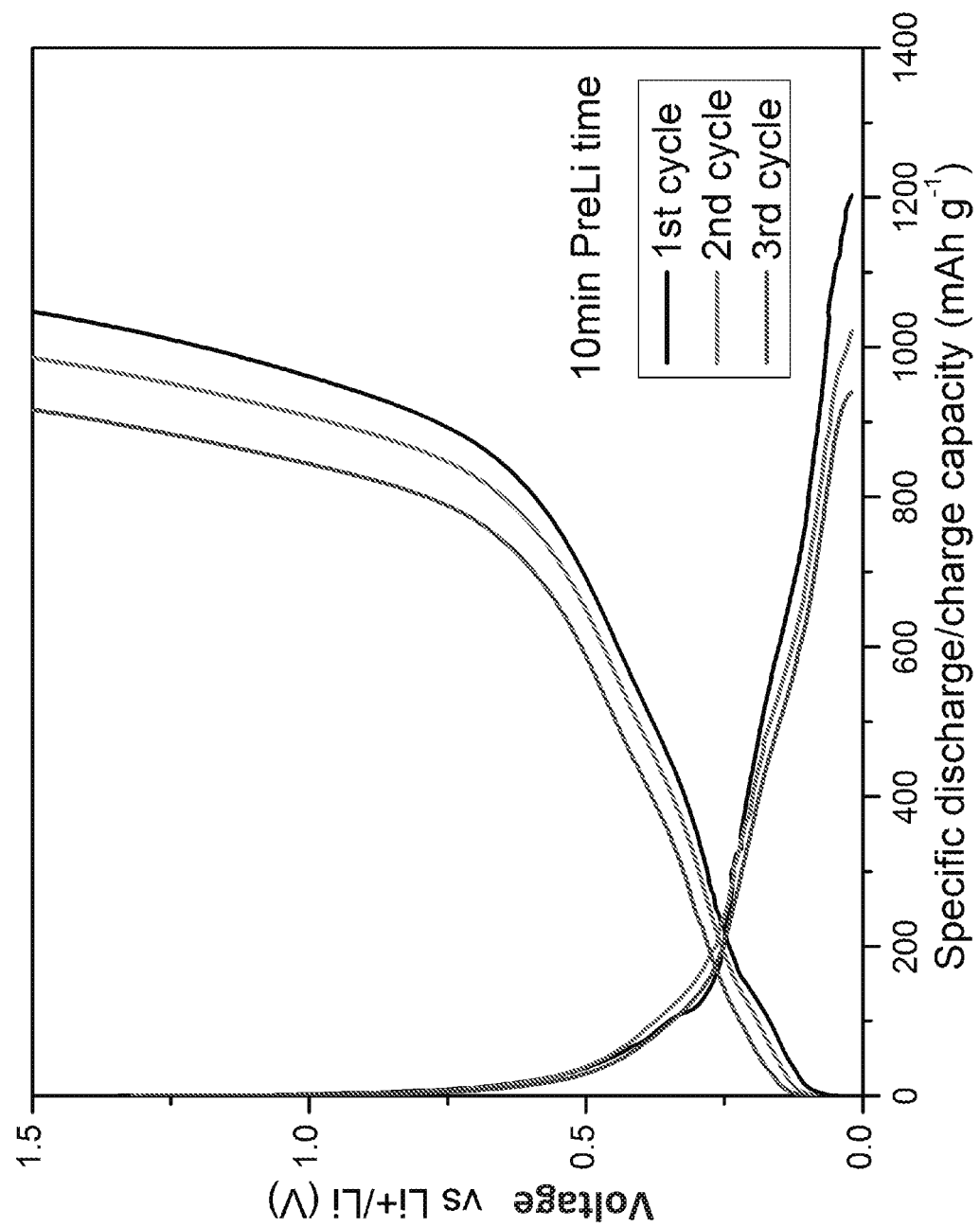
FIG. 27 is a plot showing voltage curves of a prelithiated SiO/G composite (using 1 M Li-99FL THF reagent for 10 min) half cells at 0.05C, 0.1C, and 0.2C for 3 cycles.
Figure 28:
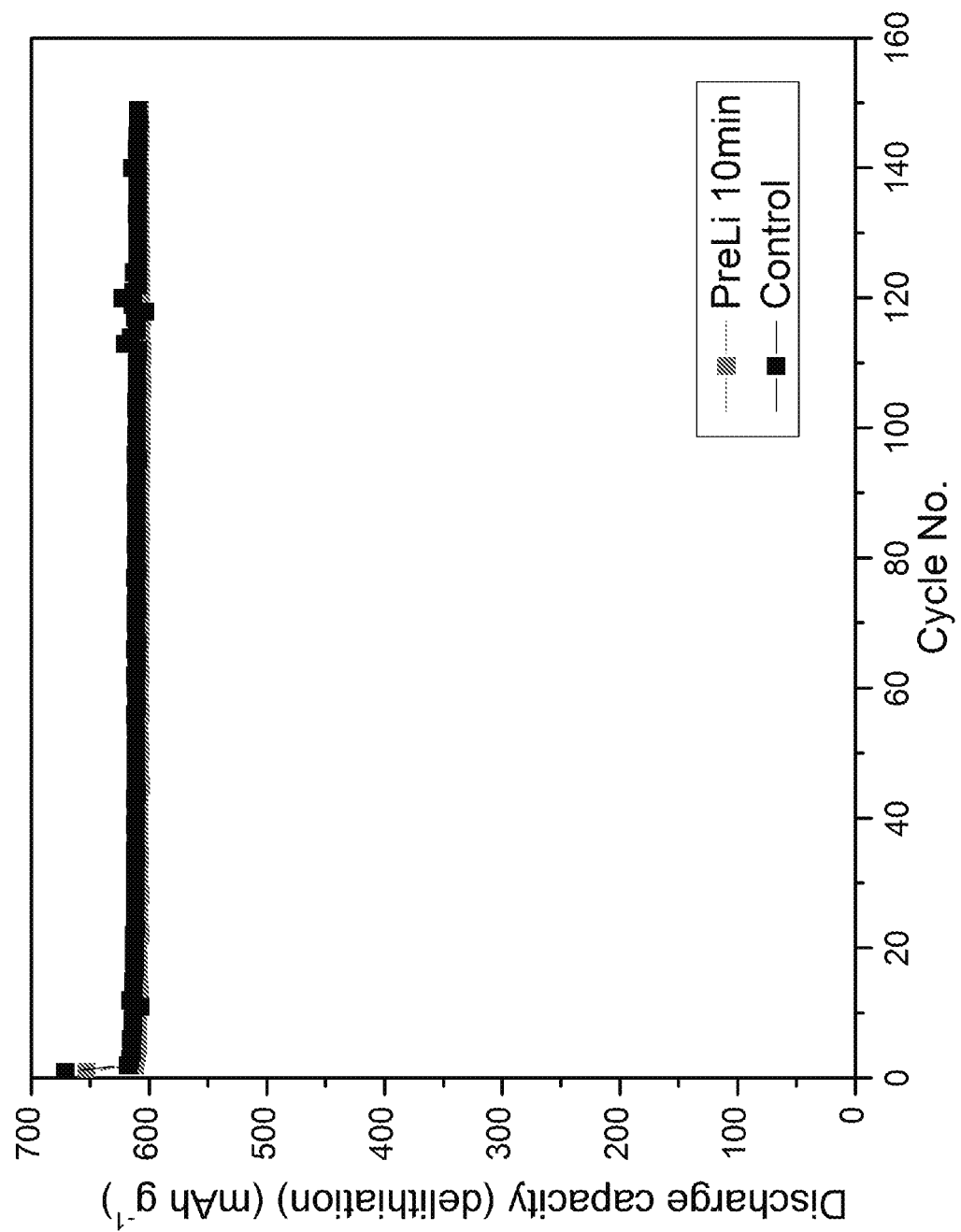
FIG. 28 is a plot showing half cell cycling performance at 0.5C of a control and a prelithiated SiO/G composite (using 1 M Li-99FL THF for 10 min).

Sample 3: 9,9-dimethylfluorene (99FL) was used to prepare 1 M Li-99FL THF solution for prelithiation. As shown in FIG. 27, the 1st lithiation and delithiation capacity of 10 min prelithiation sample were 1200 and 1045 mA h g$^{-1}$, respectively, showing a high initial CE of 87%. The shortest prelithiation time of 10 min had the best prelithiation effect of 99FL among all the three reagents. Similarly, the half-cell cycling performance of the prelithiated sample was unchanged compared with that of control sample (FIG. 28).

Example 3

Chemical Treatment of Sodium Battery Anodes

A presodiation reagent was prepared by dissolving an excess amount of metallic sodium into a biphenyl (Bp) and tetrahydrofuran (THF) solution. In a typical procedure, 1.54 g Bp was dissolved in 10 ml of THF to make a 1 M Bp THF solution and then a piece of sodium metal was dissolved in this solution to form a 1 M Na-Bp THF. The resulting presodiation reagent was utilized to presodiate hard carbon electrode. The degree of presodiation can be controlled via treatment time. Half cells were assembled using the presodiated hard carbon as cathode, metallic sodium as anode, 1 M NaClO$_4$ dissolved in EC/DMC (1:1 in volume) with 5 wt. % FEC additive as electrolyte, and glassfiber as separator. The first charge/discharge cycle was conducted at 0.05C (1 C=160 mA g$^{-1}$).

Figure 29:
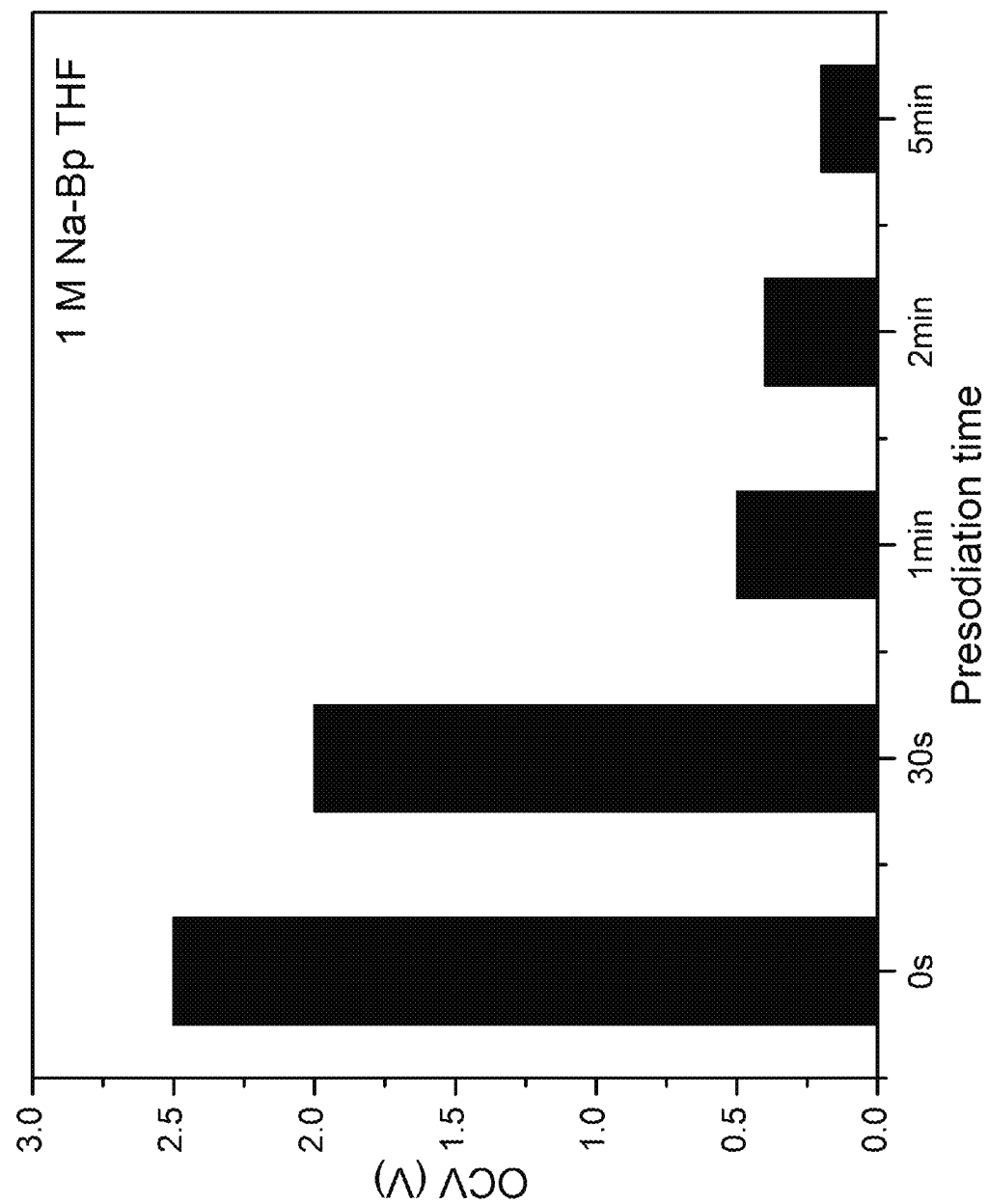
FIG. 29 is a plot showing OCV of pristine and presodiated hard carbon half cells (using 1 M Na-Bp THF as presodiation chemical reagent) with different treatment time.
Figure 30:
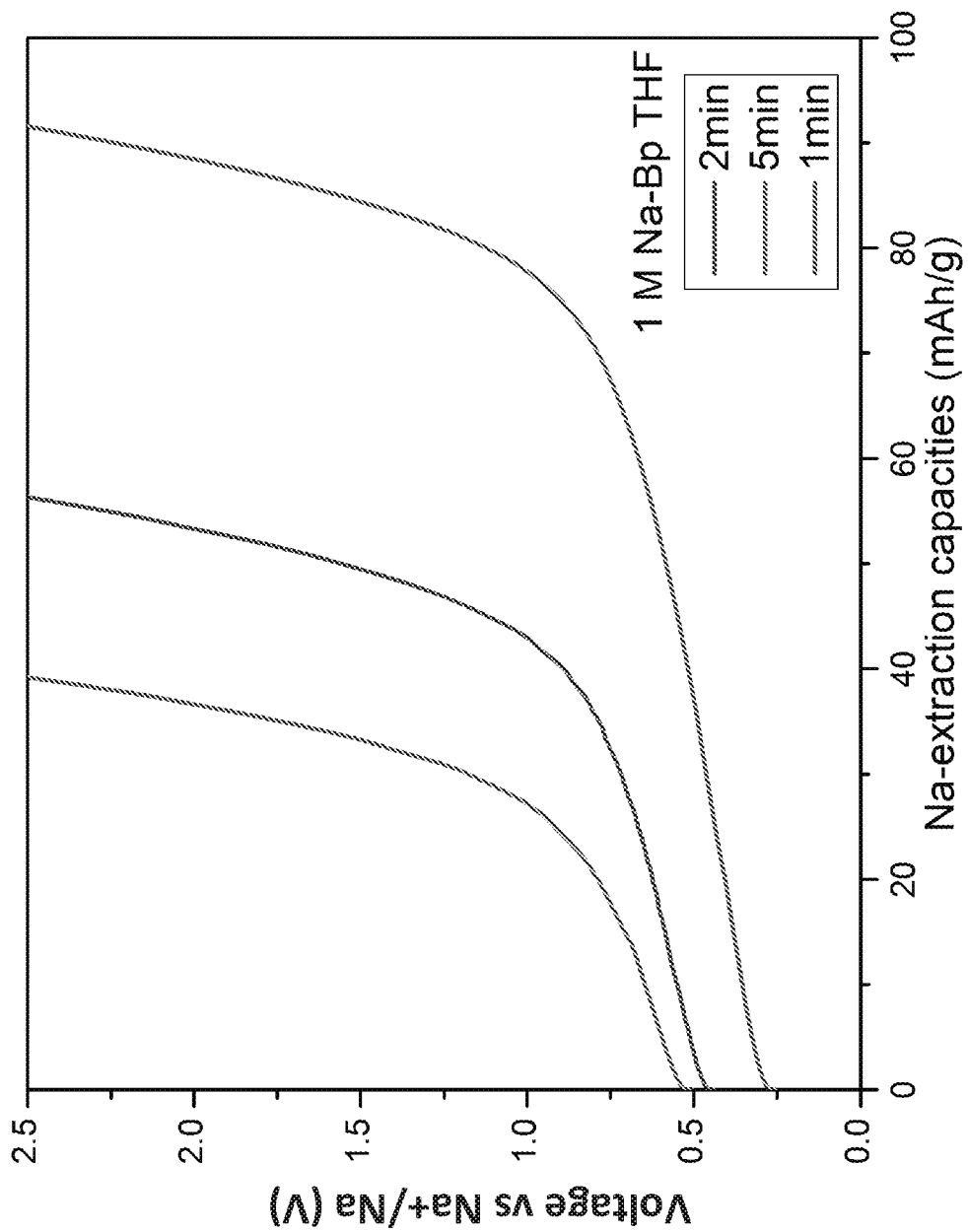
FIG. 30 is a plot showing the initial Na-extraction capacities of different presodiated hard carbon half cells (using 1 M Na-Bp THF as presodiation chemical reagent) at 0.05C.
Figure 31:
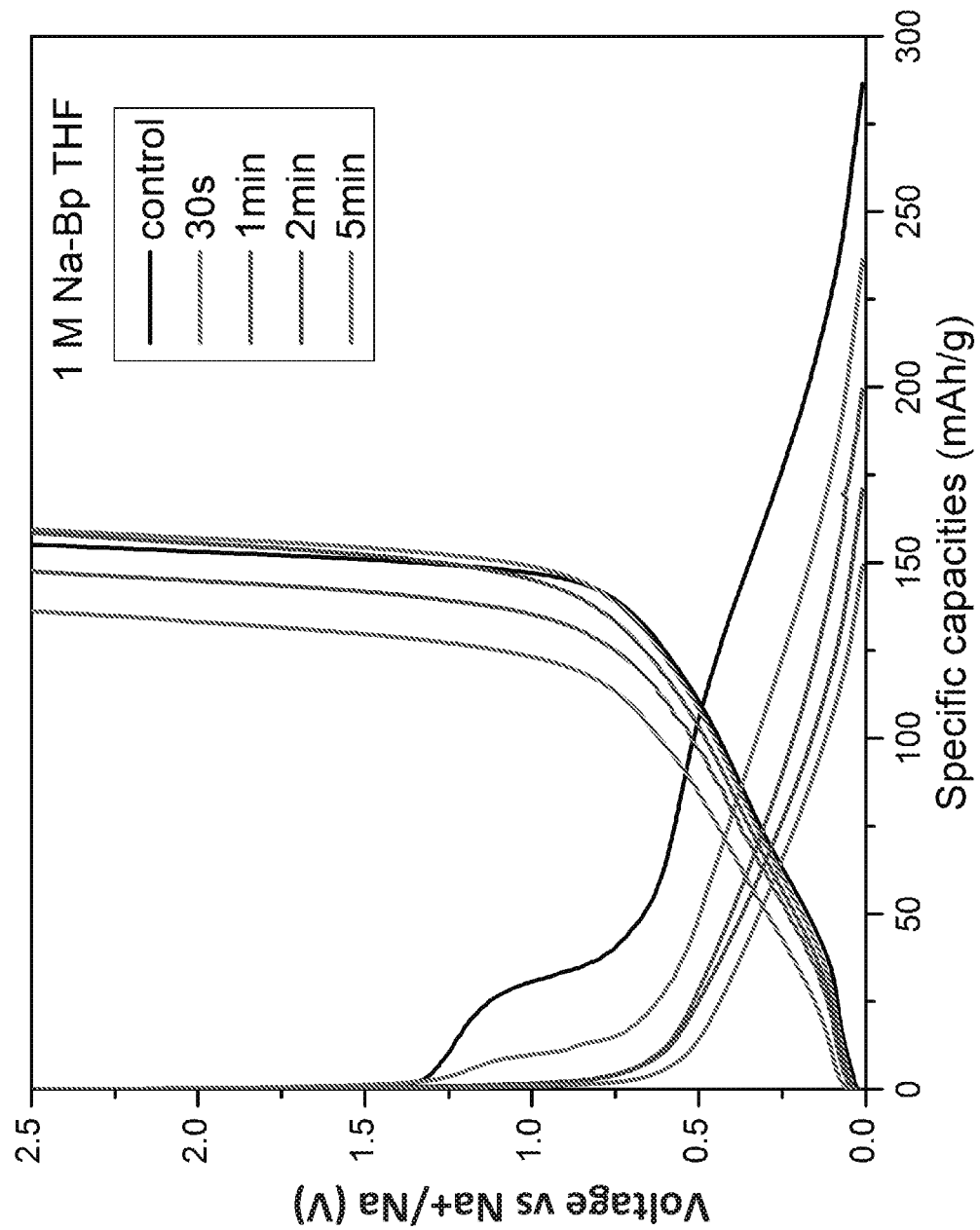
FIG. 31 is a plot showing voltage profiles of pristine and presodiated hard carbon half cells (using 1 M Na-Bp THF as presodiation chemical reagent) with different treatment time during the 1st discharge (sodium insertion) and charge (sodium extraction) cycle at 0.05C.

As shown in FIG. 29, the OCV of presodated samples decrease with increased treatment time. The pristine hard carbon electrode without presodiation exhibited an OCV of ~2.5 V, while the sample with 5 minutes presodiation time exhibited an OCV of ~0.24 V, indicating that sodium ions were inserted into the hard carbon materials. As the presodiated hard carbon electrode is in Na-rich state, it begins with Na-extraction. As shown in FIG. 30, with increasing presodiation time, the Na-extraction capacity increases. FIG. 31 shows the typical voltage profiles of the pristine and presodiated hard carbon electrodes with different presodiation depth. The initial discharge (sodium insertion) and charge (sodium extraction) capacity of pristine hard carbon electrode are 286.3 and 155 mA h g$^{-1}$, respectively, indicating an initial Coulombic efficiency of ~54%.

Meanwhile, the 1st discharge capacity decreases while the charge capacity remains almost unchanged, and thus the initial Coulombic efficiency increases. A short presodiation time of 2 min results in a high initial Coulombic efficiency of 92.8%, with sodiation and desodiation capacity of 170.8 and 158.5 mA h g$^{-1}$, respectively. The reduced irreversible capacity and increased Coulombic efficiency after presodiation can be attributed to the formation of SEI in advance during the presodiation process.

Figure 32:
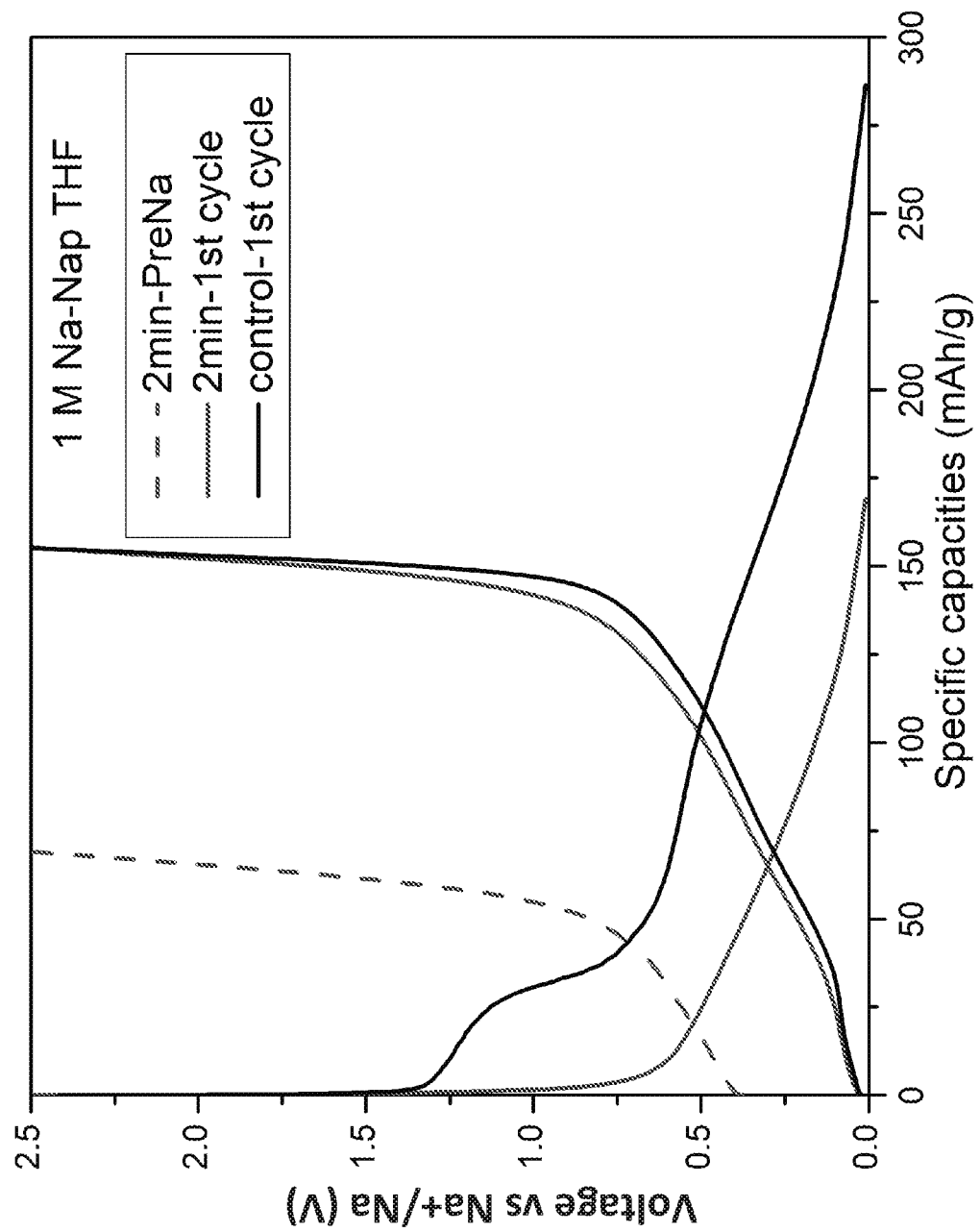
FIG. 32 is a plot showing the initial Na-extraction capacity and voltage profiles of pristine and presodiated hard carbon half cells (using 1 M Na-Nap THF as presodiation chemical reagent) with 2 min treatment time during the 1st discharge (sodium insertion) and charge (sodium extraction) cycle at 0.05C.

Naphthalene was also used to prepare a presodiation chemical reagent, that is, an excess amount of metallic sodium was dissolved into a naphthalene (Nap) and THF solution to make 1 M Na-Nap THF solution. The hard carbon electrode was immersed in the solution for 2 min at room temperature. Half cells were assembled using the same electrolyte and separator as described above. As shown in FIG. 32, the OCV of the presodiated sample is 0.37 V, indicating successful sodium insertion in the hard carbon materials. The initial Na-extraction capacity was ~69 mA h g$^{-1}$. The 1st sodiation and desodiation capacity of presodiated sample were 168.9 and 155.3 mA h g$^{-1}$, respectively, indicating a high initial Coulombic efficiency of 92%.

Example 4

Comparative Prelithiation Analysis

Different reagents and anode materials were analyzed for their ability in prelithiation. The results are presented below in Table 1.

TABLE 1

Prelithiation capability of different reagents for various anode materials.

| | Graphite (0.01~0.2V) | Si-based (0.01~0.5V) | Disordered carbon (0.01~1V) | Sn (0.4~0.8V) | Sb (0.8~1V) | P (0.8~1V) | S (2~2.5V) |
|---|---|---|---|---|---|---|---|
| tert-amylbenzene | x | x | √ | √ | √ | √ | √ |
| biphenyl | x | √ | √ | √ | √ | √ | √ |
| phenylcyclohexane | x | √ | √ | √ | √ | √ | √ |
| 1-phenyl-1-cyclohexene | x | √ | √ | √ | √ | √ | √ |
| 4-phenylcyclohexene | x | √ | √ | √ | √ | √ | √ |
| naphthalene | x | √ | √ | √ | √ | √ | √ |
| 1-methylnaphthalene | x | √ | √ | √ | √ | √ | √ |
| 2-methylnaphthalene | x | √ | √ | √ | √ | √ | √ |
| azulene | x | √ | √ | √ | √ | √ | √ |
| indane | x | √ | √ | √ | √ | √ | √ |
| isoindene | x | √ | √ | √ | √ | √ | √ |
| diphenylmethane | x | √ | √ | √ | √ | √ | √ |
| 2,2-diphenylpropane | x | √ | √ | √ | √ | √ | √ |
| anthracene | x | x | √ | x | √ | √ | √ |
| fluorene | x | x | √ | √ | √ | √ | √ |
| 9,9-dimethylfluorene | x | √ | √ | √ | √ | √ | √ |

TABLE 1-continued

Prelithiation capability of different reagents for various anode materials.

|  | Graphite (0.01~0.2V) | Si-based (0.01~0.5V) | Disordered carbon (0.01~1V) | Sn (0.4~0.8V) | Sb (0.8~1V) | P (0.8~1V) | S (2~2.5V) |
|---|---|---|---|---|---|---|---|
| acenaphthene | x | x | √ | √ | √ | √ | √ |
| acenaphthylene | x | x | √ | √ | √ | √ | √ |
| phenanthrene | x | x | √ | √ | √ | √ | √ |
| phenalene | x | x | √ | √ | √ | √ | √ |
| para-terphenyl | x | x | x | √ | √ | √ | √ |
| meta-terphenyl | x | x | √ | √ | √ | √ | √ |
| ortho-terphenyl | x | x | √ | √ | √ | √ | √ |
| tetracene | x | x | x | x | x | x | √ |
| chrysene | x | x | x | x | x | x | √ |
| triphenylene | x | x | x | x | √ | √ | √ |
| pyrene | x | x | x | x | √ | √ | √ |
| fluoranthene | x | x | x | x | √ | √ | √ |
| benzo[a]fluorene | x | x | x | x | x | x | √ |
| benzo[c]fluorene | x | x | x | x | x | x | √ |
| benz[a]anthracene | x | x | x | x | x | x | √ |
| benzo[c]phenanthrene | x | x | x | x | x | x | √ |
| pentacene | x | x | x | x | x | x | √ |
| perylene | x | x | x | x | x | x | √ |
| picene | x | x | x | x | x | x | √ |
| olympicene | x | x | x | x | x | x | √ |
| tetraphenylene | x | x | x | x | x | x | √ |
| benzo[a]pyrene | x | x | x | x | x | x | √ |
| benzo[e]pyrene | x | x | x | x | x | x | √ |
| benz[e]acephenanthrylene | x | x | x | x | x | x | √ |
| benzo[a]fluoranthene | x | x | x | x | x | x | √ |
| benzo[j]fluoranthene | x | x | x | x | x | x | √ |
| benzo[k]fluoranthene | x | x | x | x | x | x | √ |
| dibenz[a,h]anthracene | x | x | x | x | x | x | √ |
| dibenz[a,j]anthracene | x | x | x | x | x | x | √ |

For reasons of completeness, various aspects of the invention are set out in the following numbered clauses.

Clause 1. A method of making an electrode, the method comprising: contacting an electrode material with a mixture comprising an aromatic compound, an alkali metal, and an organic solvent to provide the electrode.

Clause 2. The method of clause 1, wherein the method is performed under ambient air.

Clause 3. The method of clause 1 or clause 2, wherein the aromatic compound comprises 1 to 5 rings.

Clause 4. The method of any of clauses 1-3, wherein the aromatic compound is of formula (I)

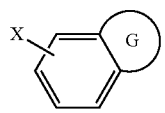

(I)

or a salt thereof, wherein: X is $C_1$-$C_{10}$ alkyl, $C_1$-$C_{10}$ alkylene-$G^1$, $G^2$, or H; $G^1$ is an aryl, or a $C_3$-$C_{12}$ carbocycle; $G^2$ is an aryl, or a $C_3$-$C_{12}$ carbocycle; and G is an optional monocyclic, bicyclic, tricyclic, or tetracyclic ring system.

Clause 5. The method of clause 4, wherein X is $C_1$-$C_5$ alkyl, $C_1$-$C_5$ alkylene-$G^1$, $G^2$, or H; $G^1$ is an aryl; $G^2$ is an aryl, or a $C_3$-$C_{12}$ carbocycle; and G is an optional monocyclic, bicyclic, or tricyclic ring system.

Clause 6. The method of clause 4, wherein X is $C_1$-$C_3$ alkylene-$G^1$, $G^2$, or H; $G^1$ is an aryl; $G^2$ is an aryl, or a $C_3$-$C_{12}$ carbocycle; and G is an optional monocyclic or bicyclic ring system.

Clause 7. The method of any of clauses 1-6, wherein the aromatic compound is selected from the group consisting of tert-amylbenzene; biphenyl; phenylcyclohexane; 1-phenyl-1-cyclohexene; 4-phenylcyclohexene; naphthalene; 1-methylnaphthalene; 2-methylnaphthalene; azulene; indane; indene; isoindene; diphenylmethane; 2,2-diphenylpropane; anthracene; fluorene; 9,9-dimethylfluorene; acenaphthene; acenaphthylene; phenanthrene; phenalene; para-terphenyl; meta-terphenyl; ortho-terphenyl; tetracene; chrysene; triphenylene; pyrene; fluoranthene; benzo[a]fluorene; benzo[c]fluorene; benz[a]anthracene; benzo[c]phenanthrene; pentacene; perylene; picene; olympicene; tetraphenylene; benzo[a]pyrene; benzo[e]pyrene; benz[e]acephenanthrylene; benzo[a]fluoranthene; benzo[j]fluoranthene; benzo[k]fluoranthene; dibenz[a,h]anthracene; dibenz[a,j]anthracene; and a combination thereof.

Clause 8. The method of any of clauses 1-7, wherein the organic solvent comprises an ether.

Clause 9. The method of any of clauses 1-7, wherein the organic solvent comprises tetrahydrofuran, 2-methyltetrahydrofuran, 1,4-dioxane, diethyl ether, dimethoxyethane, diethoxyethane, dimethylformamide, 1-methoxy-2-ethoxyethane, hexamethylphosphoramide, 1,3-dimethoxypropane, 1,2-dimethoxypropane, or a combination thereof.

Clause 10. The method of any of clauses 1-9, wherein the alkali metal comprises Li, Na, K, or a combination thereof.

Clause 11. The method of any of clauses 1-10, wherein the alkali metal is present in the mixture at a concentration of about 0.1 M to about 10 M.

Clause 12. The method of any of clauses 1-11, wherein the mixture has a redox potential of less than 1.2 V against the electrode.

Clause 13. The method of any of clauses 1-12, wherein the electrode material comprises C, Si, Sn, Sb, P, S, or a combination thereof.

Clause 14. The method of clause 13, wherein the electrode comprises C, SiO, SnO, or a combination thereof.

Clause 15. The method of clause 13 or clause 14, wherein C comprises graphite, disordered carbon, carbon black, expanded graphite, graphene, carbon nanotubes, or a combination thereof.

Clause 16. The method of any of clauses 1-15, wherein the electrode material further comprises a binder, a conductive material, or a combination thereof.

Clause 17. The method of any of clauses 1-16, wherein the electrode material and the mixture are contacted for about 1 minute to about 2 days.

Clause 18. The method of any of clauses 1-17, wherein the electrode has a coulombic efficiency of greater than or equal to 90%.

Clause 19. A method of making a battery, the method comprising: making an electrode as in clauses 1-18; arranging a separator such that it is between the electrode and a second electrode to provide a cell; and adding a non-aqueous electrolyte to the cell to provide the battery.

Clause 20. The method of clause 19, wherein the second electrode comprises $LiCoO_2$, $LiNiO_2$, $LiMn_2O_4$, $Li_{1+n}Ni_xMn_yCo_zO_2$, $LiFePO_4$, $LiNi_xCo_yAl_zO_2$, $V_2O_5$, Sulfur, $O_2$, or a combination thereof.

Clause 21. The method of clause 19 or clause 20, wherein the non-aqueous electrolyte comprises an alkali metal salt, a solvent, and optionally an additive.

What is claimed is:

1. A method of making an electrode, the method comprising:
   adding an aromatic compound and an alkali metal individually to an organic solvent to provide a mixture; and
   contacting an electrode material with the mixture comprising the aromatic compound, the alkali metal, and the organic solvent to provide the electrode,
   wherein the method is performed under ambient air.

2. The method of claim 1, wherein the aromatic compound comprises 1 to 5 rings.

3. The method of claim 1, wherein the aromatic compound is of formula (I)

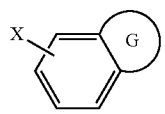

(I)

or a salt thereof, wherein:
X is $C_1$-$C_{10}$ alkyl, $C_1$-$C_{10}$ alkylene-$G^1$, $G^2$, or H;
$G^1$ is an aryl, or a $C_3$-$C_{12}$ carbocycle;
$G^2$ is an aryl, or a $C_3$-$C_{12}$ carbocycle; and
G is an optional monocyclic, bicyclic, tricyclic, or tetracyclic ring system.

4. The method of claim 3, wherein
X is $C_1$-$C_5$ alkyl, $C_1$-$C_5$ alkylene-$G^1$, $G^2$, or H;
$G^1$ is an aryl;
$G^2$ is an aryl, or a $C_3$-$C_{12}$ carbocycle; and
G is an optional monocyclic, bicyclic, or tricyclic ring system.

5. The method of claim 3, wherein
X is $C_1$-$C_3$ alkylene-$G^1$, $G^2$, or H;
$G^1$ is an aryl;
$G^2$ is an aryl, or a $C_3$-$C_{12}$ carbocycle; and
G is an optional monocyclic or bicyclic ring system.

6. The method of claim 1, wherein the aromatic compound is selected from the group consisting of
tert-amylbenzene;
biphenyl;
phenylcyclohexane;
1-phenyl-1-cyclohexene;
4-phenylcyclohexene;
naphthalene;
1-methylnaphthalene;
2-methylnaphthalene;
azulene;
indane;
indene;
isoindene;
diphenylmethane;
2,2-diphenylpropane;
anthracene;
fluorene;
9,9-dimethylfluorene;
acenaphthene;
acenaphthylene;
phenanthrene;
phenalene;
para-terphenyl;
meta-terphenyl;
ortho-terphenyl;
tetracene;
chrysene;
triphenylene;
pyrene;
fluoranthene;
benzo[a]fluorene;
benzo[c]fluorene;
benz[a]anthracene;
benzo[c]phenanthrene;
pentacene;
perylene;
picene;
olympicene;
tetraphenylene;
benzo[a]pyrene;
benzo[e]pyrene;
benz[e]acephenanthrylene;
benzo[a]fluoranthene;
benzo[j]fluoranthene;
benzo[k]fluoranthene;
dibenz[a,h]anthracene;
dibenz[a,j]anthracene;
and a combination thereof.

7. The method of claim 1, wherein the organic solvent comprises an ether.

8. The method of claim 1, wherein the organic solvent comprises tetrahydrofuran, 2-methyltetrahydrofuran, 1,4-dioxane, diethyl ether, dimethoxyethane, diethoxyethane, dimethylformamide, 1-methoxy-2-ethoxyethane, hexamethylphosphoramide, 1,3-dimethoxypropane, 1,2-dimethoxypropane, or a combination thereof.

9. The method of claim 1, wherein the alkali metal comprises Li, Na, K, or a combination thereof.

10. The method of claim 1, wherein the alkali metal is present in the mixture at a concentration of about 0.1 M to about 10 M.

11. The method of claim 1, wherein the mixture has a redox potential of less than 1.2 V against the electrode.

12. The method of claim 1, wherein the electrode material comprises C, Si, Sn, Sb, P, S, or a combination thereof.

13. The method of claim 12, wherein the electrode comprises C, SiO, SnO, or a combination thereof.

14. The method of claim 12, wherein C comprises graphite, disordered carbon, carbon black, expanded graphite, graphene, carbon nanotubes, or a combination thereof.

15. The method of claim 1, wherein the electrode material further comprises a binder, a conductive material, or a combination thereof.

16. The method of claim 1, wherein the electrode material and the mixture are contacted for about 1 minute to about 2 days.

17. The method of claim 1, wherein the electrode has a coulombic efficiency of greater than or equal to 90%.

18. A method of making a battery, the method comprising:
    making an electrode as in claim 1;
    arranging a separator such that it is between the electrode and a second electrode to provide a cell; and
    adding a non-aqueous electrolyte to the cell to provide the battery.

19. The method of claim 18, wherein the second electrode comprises $LiCoO_2$, $LiNiO_2$, $LiMn_2O_4$, $Li_{1+n}Ni_xMn_yCO_zO_2$, $LiFePO_4$, $LiNi_xCo_yAl_zO_2$, $V_2O_5$, Sulfur, $O_2$, or a combination thereof.

20. The method of claim 18, wherein the non-aqueous electrolyte comprises an alkali metal salt, a solvent, and optionally an additive.

\* \* \* \* \*